US009569076B2

(12) United States Patent
Van Ryswyk et al.

(10) Patent No.: US 9,569,076 B2
(45) Date of Patent: Feb. 14, 2017

(54) SYSTEMS AND METHODS FOR CONFIGURING TILES IN A USER INTERFACE

(71) Applicant: Accenture Global Services Limited, Dublin (IE)

(72) Inventors: Ronald Van Ryswyk, Adelaide (AU); Jon Mann, Marden (AU)

(73) Assignee: Accenture Global Services Limited, Dublin (IE)

( * ) Notice: Subject to any disclaimer, the term of this patent is extended or adjusted under 35 U.S.C. 154(b) by 468 days.

(21) Appl. No.: 14/156,345

(22) Filed: Jan. 15, 2014

(65) Prior Publication Data

US 2015/0199112 A1    Jul. 16, 2015

(51) Int. Cl.
G06F 3/0484 (2013.01)
G06F 9/44 (2006.01)
G06F 3/0481 (2013.01)

(52) U.S. Cl.
CPC ......... *G06F 3/04842* (2013.01); *G06F 3/0481* (2013.01); *G06F 9/4443* (2013.01)

(58) Field of Classification Search
None
See application file for complete search history.

(56) References Cited

U.S. PATENT DOCUMENTS

| | | | |
|---|---|---|---|
| 7,890,972 B2 * | 2/2011 | Matsubayashi | H04N 5/44543 725/38 |
| 2006/0086022 A1 | 4/2006 | Would et al. | |
| 2006/0224992 A1 | 10/2006 | Rossi et al. | |
| 2008/0144107 A1 | 6/2008 | Lieb | |
| 2010/0011316 A1 | 1/2010 | Sar et al. | |
| 2011/0219297 A1 | 9/2011 | Oda | |
| 2013/0124981 A1 * | 5/2013 | Chao | G06T 11/60 715/243 |
| 2013/0167072 A1 | 6/2013 | Ari et al. | |
| 2014/0258849 A1 * | 9/2014 | Chung | G06F 17/212 715/243 |

FOREIGN PATENT DOCUMENTS

EP    1491990 B1    2/2010

OTHER PUBLICATIONS

European Search Report corresponding to EP 14 00 1041, mailed Oct. 16, 2014, 7 pages.
Australian Patent Examination Report No. 1, AU201500132, mailed Feb. 26, 2015, 3 pages.
"iGoogle", en.wikipedia.org/wiki/Igoogle, Jun. 19, 2014.

* cited by examiner

*Primary Examiner* — Tuan S Nguyen
(74) *Attorney, Agent, or Firm* — Harrity & Harrity, LLP

(57) ABSTRACT

Methods and systems are disclosed for configuring a plurality of tiles displayed in a graphical user interface. In some embodiments, the method comprises receiving an initial state of the tiles, wherein the initial state includes two overlapping tiles; deriving, via the one or more computer processors, one or more secondary states from the initial state by rearranging the tiles in the initial state; calculating one or more scores for the initial state and the secondary states; and determining, based on the scores, a selected state from among the initial state and the one or more secondary states as a display state to be displayed on the user interface.

20 Claims, 55 Drawing Sheets

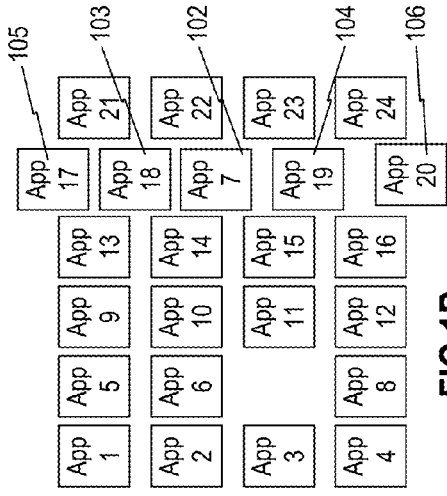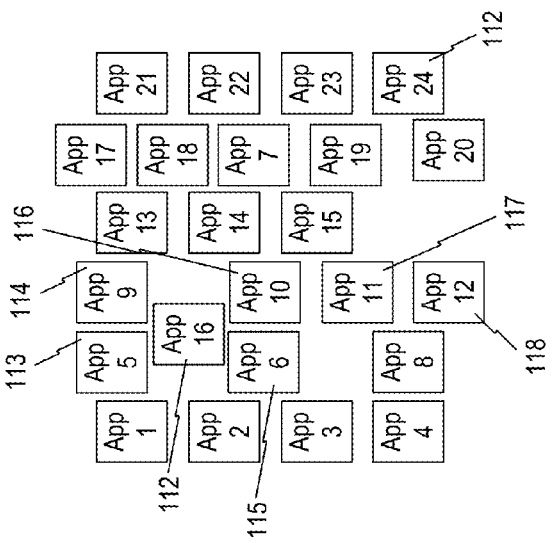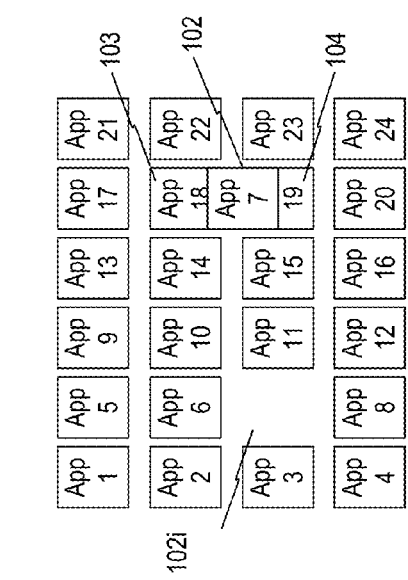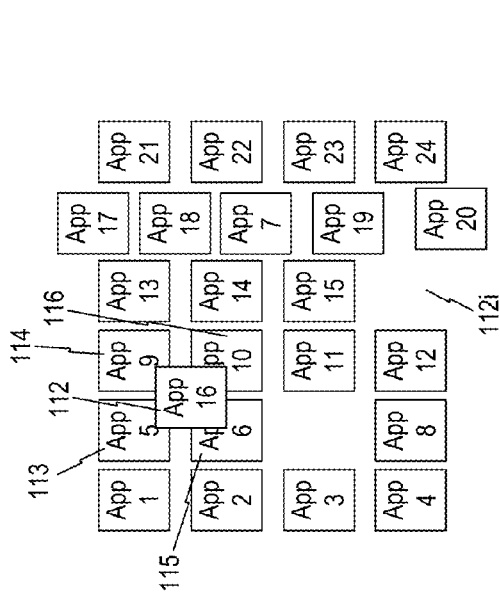

FIG 3A
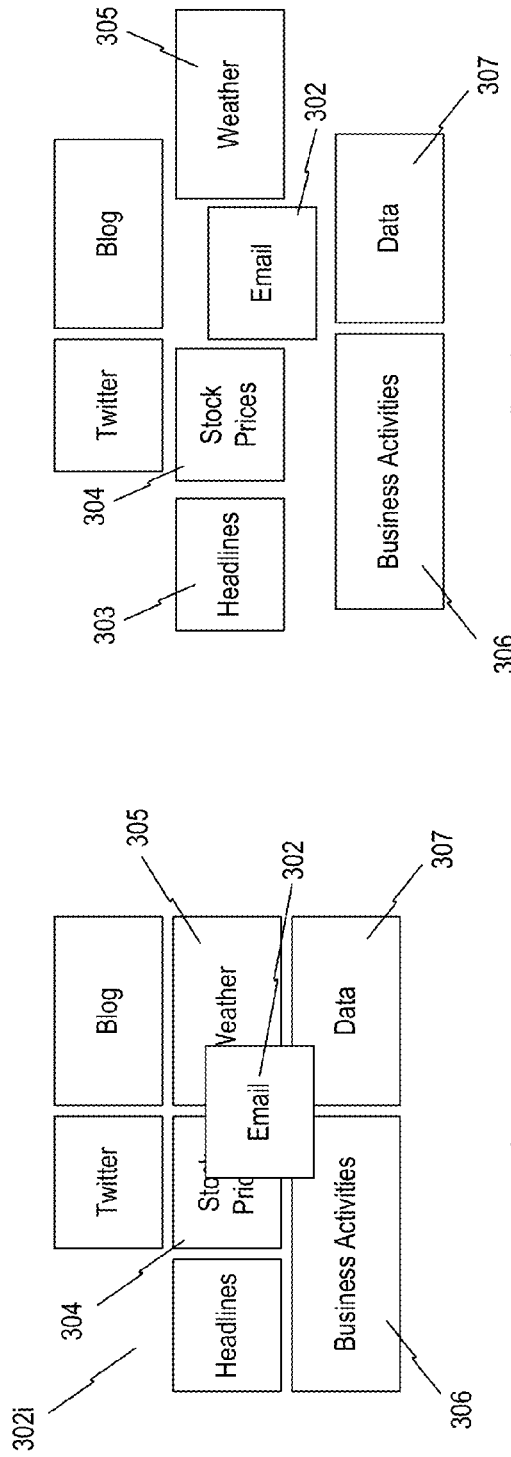
FIG 3C
FIG 3B

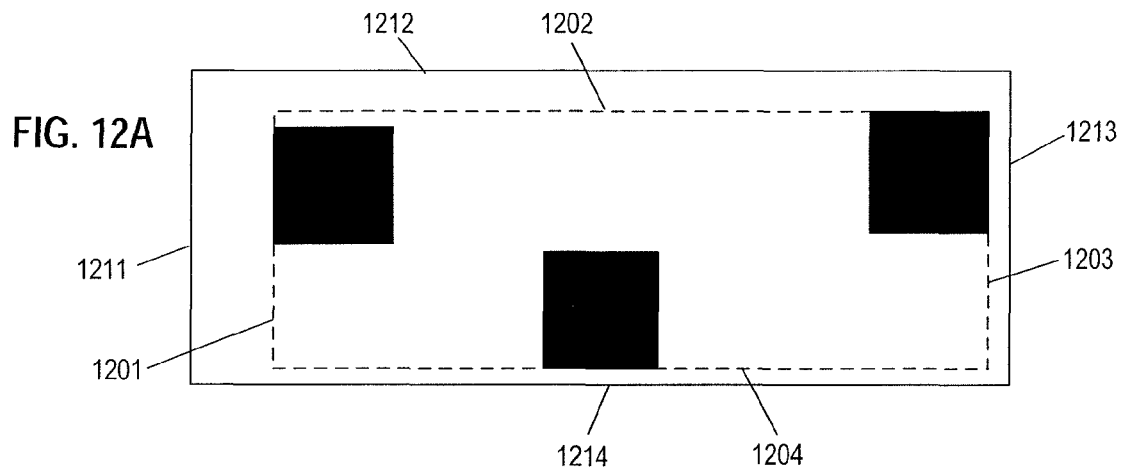
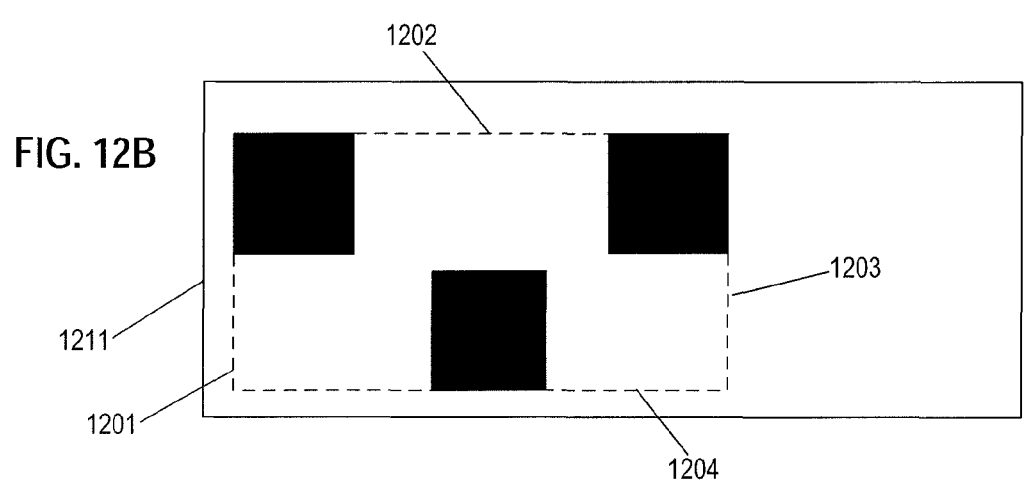
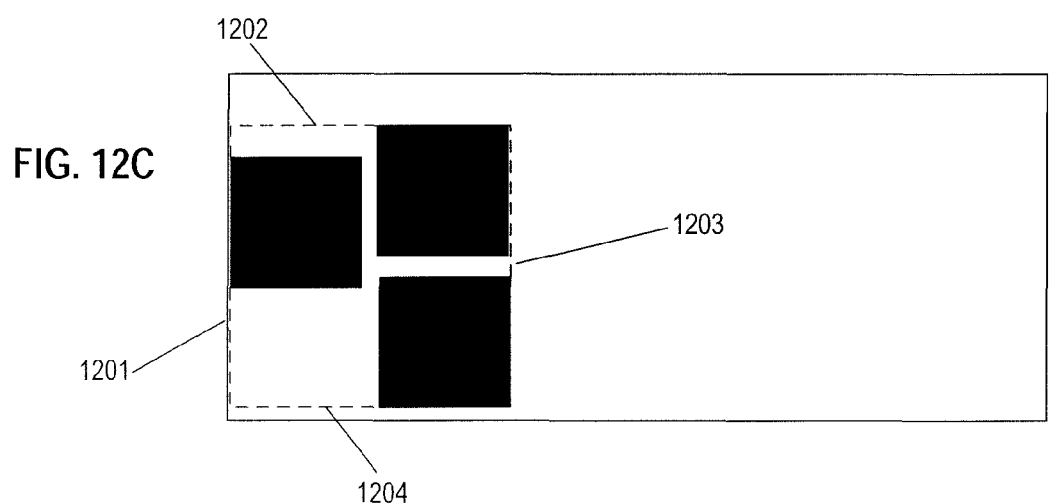

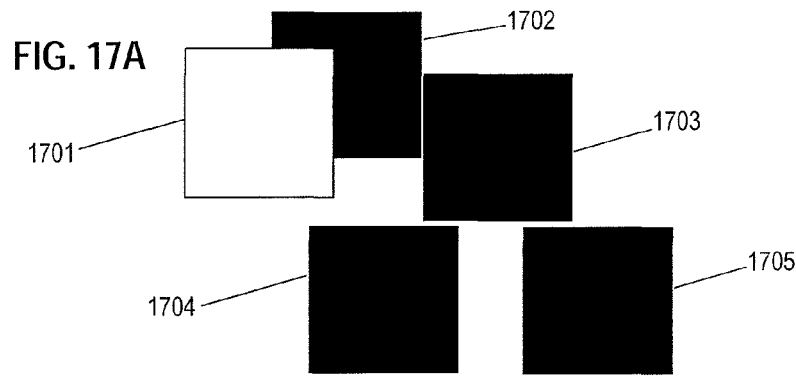
FIG. 17A
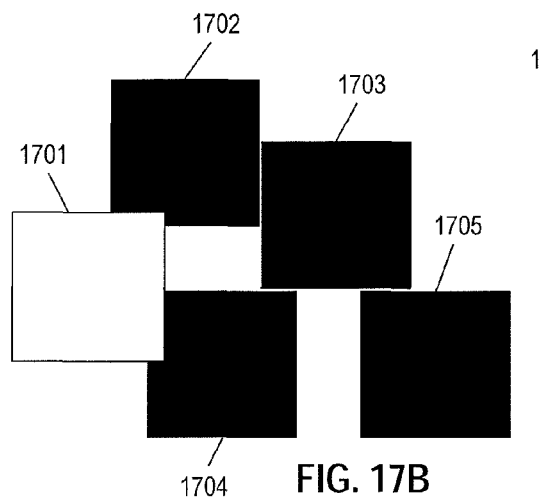
FIG. 17B
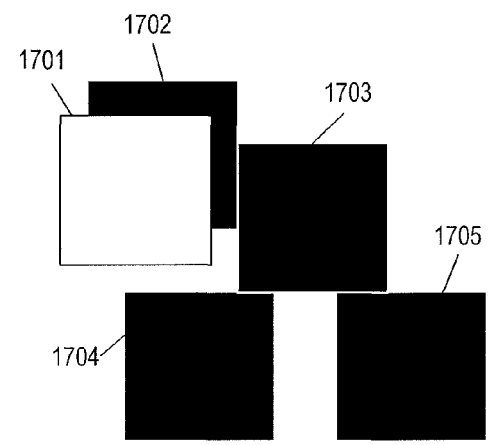
FIG. 17C
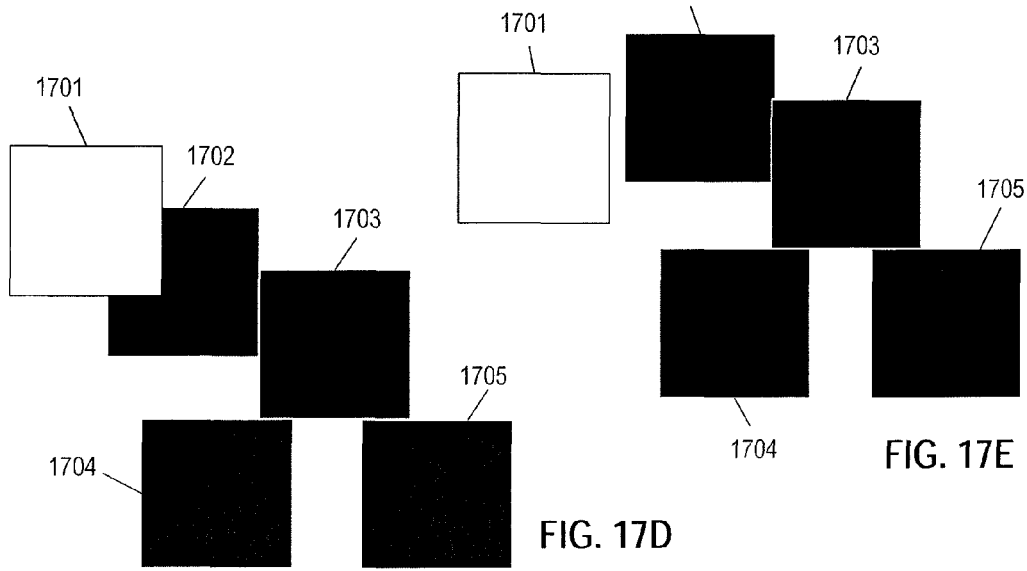
FIG. 17D
FIG. 17E

FIG. 24D

| FACEBOOK | San Fancisco 25 | 2013 45 |
| --- | --- | --- |
| 5.4334996896 | | |

TOTAL GRPS display | bottom 5

DMA
San Francisco  -32%  [Detailed Information]
Los Angeles  -27%  [Detailed Information]
Chicago  -21%  [Detailed Information]

Media
National TV  -32%  [Detailed Information]
Loca TV  -27%  [Detailed Information]
Circulars  -21%  [Detailed Information]

Media Item  25%  [Detailed Information]  [Detailed]
Item  25%  [Detailed Information]  [Detailed]
Item  25%  [Detailed Information]  [Detailed]

1.3379322807

| San Fancisco 25 | 2013 45 |
| --- | --- |

National TV 30
San Fancisco 25

USA
3.97452

| | | |
|---|---|---|
| SALES | | 45 |
| 3.74137 | | |

TOTAL GRPS display | bottom 5

| DMA | | Media | |
|---|---|---|---|
| San Francisco | -32% | National TV | -32% | Media Item 25% |
| Detailed Information | | Detailed Information | | Detailed Information | Detailed |
| Los Angeles | -27% | Loca TV | -27% | Item 25% |
| Detailed Information | | Detailed Information | | Detailed Information | Detailed |
| Chicago | -21% | Circulars | -21% | Item 25% |
| Detailed Information | | Detailed Information | | Detailed Information | Detailed |

| USA | REGIONAL | REGIONAL |
|---|---|---|
| | National TV | 7.75143 |
| | 30 | |

Stock

FIG. 24E

SYSTEMS AND METHODS FOR CONFIGURING TILES IN A USER INTERFACE

TECHNICAL FIELD

The present disclosure relates in general to methods and systems for reconfiguring objects in user interfaces and in particular for reorganizing tiles in a user-created configuration to enhance utility of the configuration.

BACKGROUND

User interfaces are one of the most common ways in which a user interacts with a device. A user interface may be, for example, the main display of a mobile device or the desktop display of computer, the dashboard of an information sharing or monitoring application, or the display of an interactive game.

In many cases a user interface includes many display objects, and the interface enables the user to rearrange those objects by moving them around. The objects, however, may be tightly packed. Thus, when a user moves a first object next to a second object, the user also needs to rearrange other objects to make room for the moved object. When there are many objects, such rearrangement may be cumbersome, time consuming, or even very complex. Moreover, even after the rearrangement, some objects may still overlap each other, thus causing difficulty for the user to fully utilize all the objects. Thus, a user may decide not to reorganize the objects or may have to work with an interface in which some of the objects are not fully visible. Such problems make a user interface less user-friendly.

SUMMARY

In some embodiments, a method for configuring a plurality of tiles displayed in a graphical user interface comprises receiving an initial state of the tiles, wherein the initial state includes two overlapping tiles; deriving, via the one or more computer processors, one or more secondary states from the initial state by rearranging the tiles in the initial state; calculating one or more scores for the initial state and the secondary states; and determining, based on the scores, a selected state from among the initial state and the one or more secondary states as a display state to be displayed on the user interface.

In some embodiments, the method further comprises defining one or more heuristics used for calculating the score for the initial state or the one or more scores for the secondary states. In some embodiments, the heuristics is based on at least one of area of overlap, tile displacement, boundary stretch, compression, and embedding. In some embodiments, deriving the one or more secondary states includes a hierarchical sequence of generating a child state from a parent state by shifting one or more tiles in the parent state.

In some embodiments, the one or more tiles of the parent state are shifted in one or more of four directions of up, down, left, and right to generate the child state. In some embodiments, the method further comprises generating a state list that includes the initial state and the secondary states sorted in increasing order of their scores.

In some embodiments, generating the secondary states includes generating one or more child states from a parent state that is closest to a head of the state list and that has not been previously used for generating child states. In some embodiments, the method further comprises adding the generated child states to the state list based on their scores.

In some embodiments, the one or more secondary states include a secondary state that is generated from a parent state by shifting a plurality of tiles together. In some embodiments, the plurality of tiles includes a group of two or more tiles that have overlapping boundaries. In some embodiments, generating a child state from a parent state includes shifting a first tile in the parent state that overlaps with a second tile in the parent state. In some embodiments, generating a child state from a parent state includes shifting a first tile in the parent state that is within a radius of a second tile in the parent state.

In some embodiments, the selected state is selected from among the initial state and the one or more secondary states as a state for which the score is the lowest.

In some embodiments, a tile configuration system for configuring a plurality of tiles displayed in a graphical user interface comprises a state generator module implemented by one or more computer processors and configured to: receive an initial state of the tiles, wherein the initial state includes two overlapping tiles, and derive one or more secondary states from the initial state by rearranging the tiles in the initial state; a score calculator module configured to calculate one or more scores for the initial state and the secondary states; and a database configured to store the scores, wherein the state generator module is further configured to determine, based on the scores, a selected state from among the initial state and the one or more secondary states as a display state to be displayed on the user interface.

In some embodiments, the state generator module is further configured to generate a state list that includes the initial state and the secondary states sorted in increasing order of their scores. In some embodiments, the state generator module is further configured to add the generated child states to the state list based on their scores.

In some embodiments, a non-transitory computer readable medium stores a computer program, wherein the computer program, when executed by one or more computers, causes the one or more computers to execute a method for configuring a plurality of tiles displayed in a user interface, wherein the method comprises receiving an initial state of the tiles, wherein the initial state includes two overlapping tiles; deriving, via the one or more computer processors, one or more secondary states from the initial state by rearranging the tiles in the initial state; calculating one or more scores for the initial state and the secondary states; and determining, based on the scores, a selected state from among the initial state and the one or more secondary states as a display state to be displayed on the user interface.

BRIEF DESCRIPTION OF THE DRAWINGS

The drawings are not necessarily to scale or exhaustive. Instead, emphasis is generally placed upon illustrating the principles of the inventions described herein. The accompanying drawings, which are incorporated in and constitute a part of this specification, illustrate several embodiments consistent with the disclosure and together with the description, serve to explain the principles of the disclosure. In the drawings:

FIGS. 1A-1F demonstrate an application of the disclosed systems and methods in a display interface, according to one such embodiment.

FIGS. 3A-3E demonstrate an application of the disclosed systems and methods in a dashboard according to some embodiments.

FIGS. 12A-12C illustrate an example for calculating a maximize-compression heuristic according to an embodiment.

FIGS. 17A-17E illustrate examples of group shifts according to an embodiment.

Figure 1F:
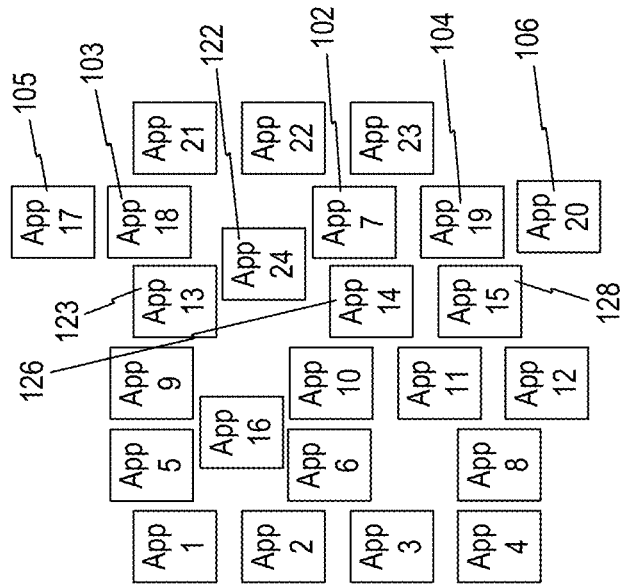

FIGS. A-22G, 23A-23O, 24A-24G, and 25A-25C illustrate snapshots for a reshuffle application according to various embodiments.

DETAILED DESCRIPTION

The following detailed description refers to the accompanying drawings. Wherever possible, the same reference numbers are used in the drawings and the description to refer to the same or similar parts. Also, similarly named elements may perform similar functions and may be similarly designed, unless specified otherwise. While several exemplary embodiments and features are described here, modifications, adaptations, and other implementations may be possible, without departing from the spirit and scope of the invention. Accordingly, unless stated otherwise, the descriptions relate to one or more embodiments and should not be construed to limit the invention as a whole. Instead, the proper scope of the invention is defined by the appended claims.

In various embodiments, the disclosed system and methods rearrange tiles in a user interface to improve the utility of a configuration for being displayed. In some embodiments, the utility of a configuration of tiles is improved if the overlap among the tiles is reduced, if the tiles fit a smaller total area, or if the tiles are grouped according to some criteria determined by the user or by a system. Also, in some embodiments, of two different configurations that are derived from a user-generated configuration of tiles, the more useful configuration is the one that presents the least amount of change compared to the original configuration.

The disclosed systems and methods can be used in a variety of display-related applications. In various embodiments, the user interface may be a display of a computer or a mobile device, an interface of a game or browser, or a dashboard of a monitoring application. Further, in various embodiments such as those described below, the tiles may represent graphical user interface objects such as installed applications, websites, status data summaries, game pieces, or other items.

In some embodiments, the tiles correspond to representations of applications shown on a user display. FIGS. 1A-1F demonstrate an application of the disclosed systems and methods according to one such embodiment. FIGS. 1A-1F each include 24 tiles displayed on a user interface. In some embodiments, the user interface is a display of a user's mobile device and the tiles represent different application (app) installed on the user's mobile device. In this example, the tiles are equal-sized squares, each showing an icon representing the corresponding app. In various embodiments, the tiles may have other shapes such as rectangles, diamonds, circles, or other two or three dimensional shapes. Moreover, the tiles in the same interface may differ in shape or in size.

Returning to FIGS. 1A-1F, in various embodiments, one or more tiles may be moved by a user or by other means, such as, by the display system. For example, a user may use a touch screen or a mouse to move one or more tiles to rearrange the order and design in which the tiles appear on the display of a computer or a mobile device. Such rearrangement may be based on the user's aesthetic preferences or on ease of use. For example, a user may wish to bring tiles for related apps next to each other, or may wish to move tiles that are more frequently used to specific positions that are more visible. In doing the rearrangement, the user may move the tiles to new positions. In some embodiments, a user moves a tile by a drag-and-drop method such as by positioning the pointer over the tile, pressing and holding a mouse button, moving the pointer to a new location, and releasing the mouse button. Alternatively, the display system may rearrange the tiles based on one or more criteria, such as sorting named tiles alphabetically, by installation dates, or by other criteria.

FIG. 1A shows the result of one such rearrangement in which the user has started from an initial arrangement of the twenty-four tiles, tightly packed in four rows of six tiles (not shown), to a new arrangement in which tile 102 has been moved from its initial position 102*i* to the new position of tile 102 shown in FIG. 1A. In FIG. 1A location 102*i* thus does not include any tiles. Instead, tile 102 is located in its new position in which tile 102 overlaps (or intersects) two other tiles 103 and 104.

In the embodiment shown in FIG. 1B, the disclosed systems and methods have rearranged the tiles to make room for tile 102. In particular, tiles 103 and 105 have shifted up and tiles 104 and 106 have shifted down to create space for the present location of tile 102. As a result, in FIG. 1B, the twenty-four tiles have been rearranged such that tile 102 is located in its new position and no two tiles overlap, such that all tiles are fully visible.

FIGS. 1C-1F demonstrate consecutive other arrangements in which a tile is first moved to a new location and then other tiles are shifted to make room for the moved tile. In FIG. 1C, for example, tile 112 of FIG. 1B has moved from its original location 112*i* in FIG. 1B into its new position shown in FIG. 1C. In this new position, tile 112 overlaps four other tiles 113-116. FIG. 1D shows a new arrangement of the tiles in which the tiles have shifted to make room for the 112 in its new positions. In particular, in FIG. 1D, tiles 113 and 114 have shifted up and tiles 115-118 have shifted down to make room for tile 112. As a result of these shifts, in FIG. 1D no two tiles overlap.

Figure 1E:
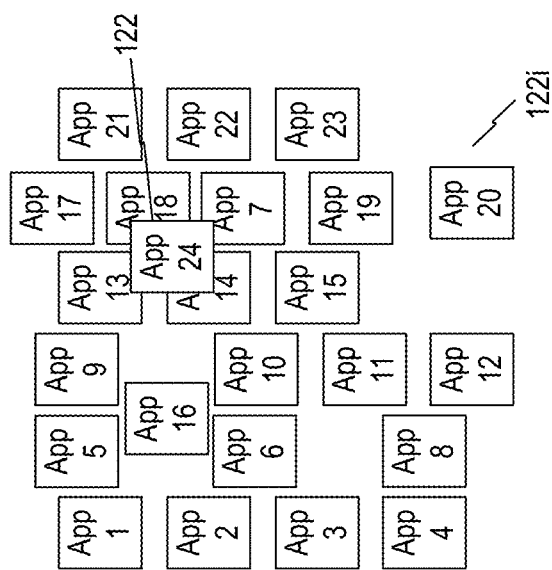

Another situation is demonstrated in FIGS. 1E and 1F. In FIG. 1E, the 122 of FIG. 1D has moved from its initial position 122*i* to its new position shown in FIG. 1E in which it overlaps four other tiles. In FIG. 1F, on the other hand, to make room for tile 122, tiles 103, 105, and 123 have shifted up, and tiles 102, 104, 106, 126, and 128 have shifted down. As a result of these shifts, in FIG. 1F no two tiles overlap.

Figure 2A:
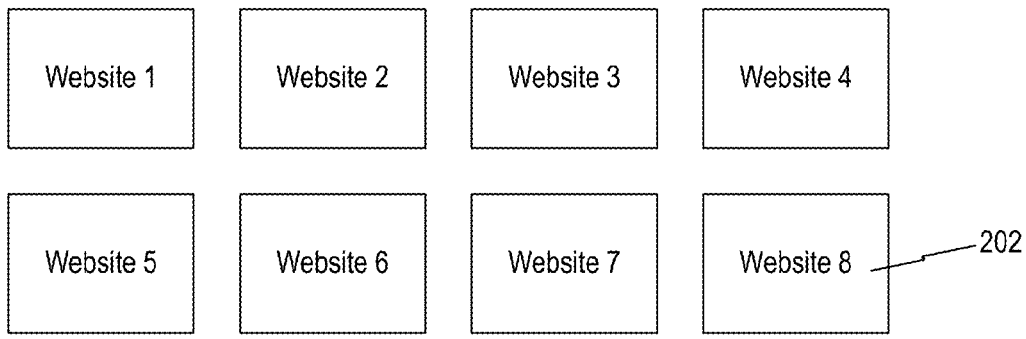
FIGS. 2A-2C demonstrate an application of the disclosed systems and methods in a browser interface according to some embodiments.
Figure 2B:
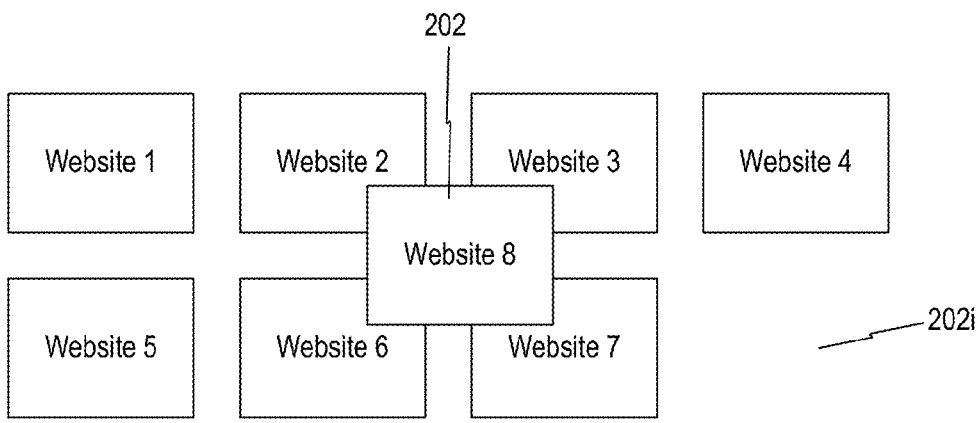
Figure 2C:
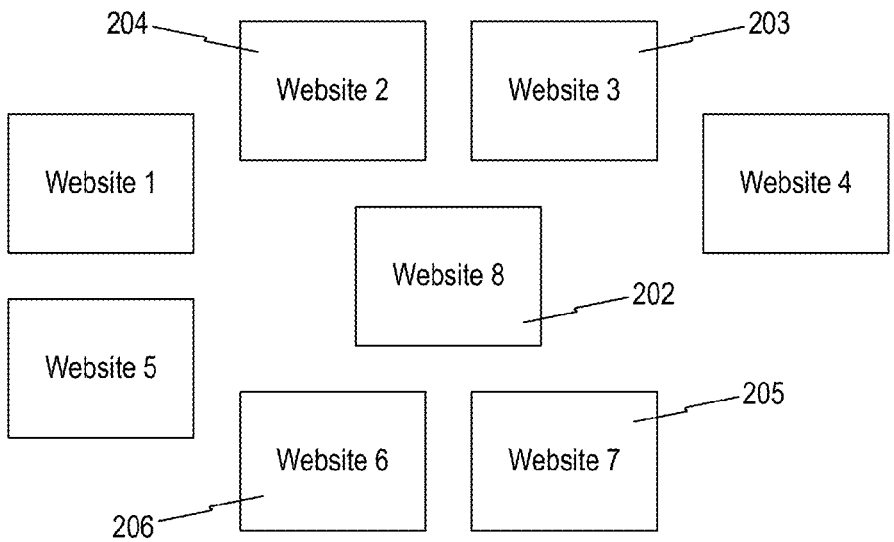

In some embodiments the tiles may correspond to representations of different websites browsed by a user. FIGS. 2A-2C demonstrate such an application of the disclosed systems and methods according to some embodiments. FIGS. 2A-2C each include eight tiles displayed on a user interface. In some embodiments, the user interface in these figures is an initial display of a web browser and the tiles represent different suggested websites to browse. In some embodiments, the suggested websites represent websites recently visited by the user and are sorted based on the time they were visited. In FIGS. 2A-2C, the eight tiles are equal-sized rectangles, each showing an icon representing the corresponding website.

FIG. 2A shows an initial arrangement of the eight tiles tightly packed in two rows of four tiles. FIGS. 2B and 2C demonstrate consecutive rearrangements in which a tile is first moved from its initial location in FIG. 2A to a new location and then other tiles have shifted to make room for the moved tile. In particular, in FIG. 2B, tile 202 has moved from its initial location 202*i* in FIG. 2A to the new location in FIG. 2B, in which it overlaps four other tiles. In FIG. 2C, tiles 203 and 204 have shifted up and tiles 205 and 206 have shifted down to make room for tile 202. Thus, in FIG. 2C, no two tiles overlap.

In some embodiments the tiles may correspond to representations of different types of data shown on a status dashboard. FIGS. 3A-3E demonstrate one such application of the disclosed systems and methods according to some embodiments. FIGS. 3A-3E each show eight tiles displayed on a user interface. In some embodiments, the user interface of these figures may be a status dashboard displayed on a computer screen. The status dashboard may show a summary of the status of various data that are of interest to the user. Each of the tiles may show a detailed or a summary update related to various types of data, applications, or activities; these may include updates of, for example, an email account, a twitter account, a weblog, news headlines, stock prices, weather broadcasts, business activities, or alike. In the example of FIGS. 3A-3E, the eight tiles are variously sized rectangles and squares, each showing an icon including the corresponding data. In some embodiments, a user can expand each tile by, for example, a double click, to show the corresponding data in more details. Moreover, in some embodiments, the user can move the tiles to rearrange them. In some embodiments, after the user moves one or more tiles, the disclosed systems and methods may further shift the tiles to reduce overlap among the tiles and thus maximize the amount of data that the user can see on the dashboard.

Figure 3E:
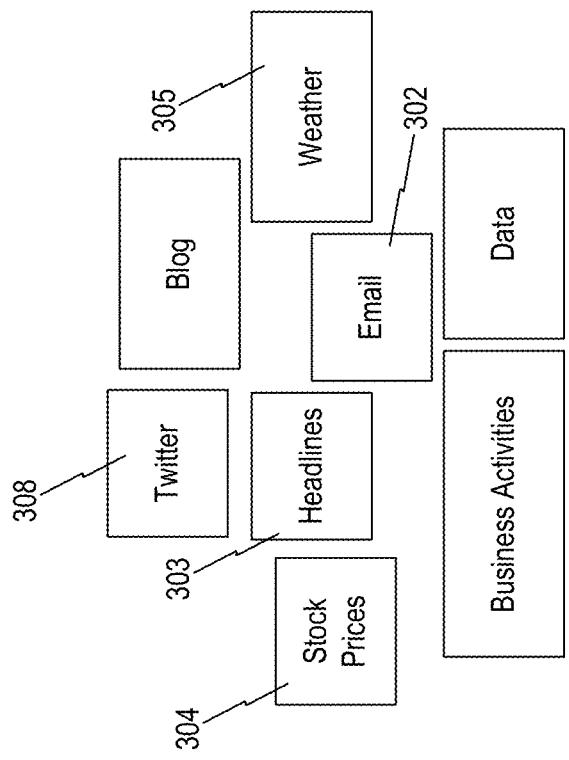

FIG. 3A shows an initial arrangement of the eight tiles tightly packed in three rows that respectively consist of, from top to bottom, three, three, and two tiles. FIGS. 3B-3E demonstrate consecutive rearrangements in which a tile is first moved from one location to another in which it overlaps some other tiles and then other tiles have shifted to make room for the moved tile and reduce or remove the overlap.

In particular, in FIG. 3B, tile 302 has moved from its initial location 302*i* in FIG. 3A to the new location in FIG. 3B, in which it overlaps four other tiles 304-307. In FIG. 3C, tiles 303 and 304 have shifted left, tile 305 has shifted right, and tiles 306 and 307 have shifted down to make room for tile 302. Thus, in FIG. 3C, no two tiles overlap.

Figure 3D:
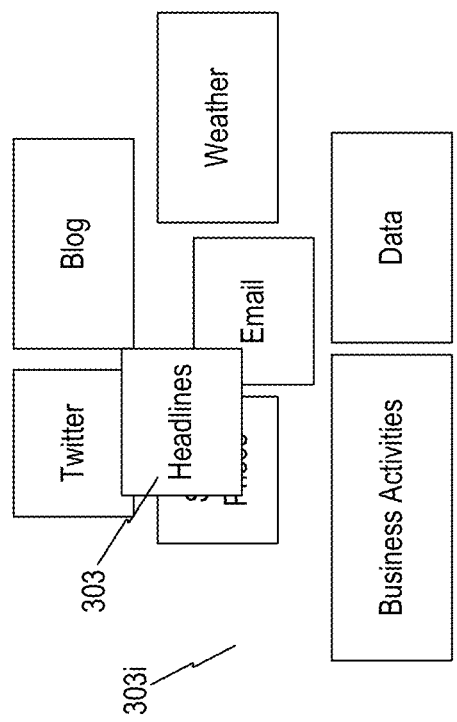

Similarly, in FIG. 3D, the 303 has moved from its initial location 303*i* in FIG. 3C to the location shown in FIG. 3D, in which it overlaps three other tiles. In FIG. 3E, to make room for tile 303 and reduce the overlap, tile 304 has shifted left, tiles 302 and 305 have shifted right, and tile 308 has shifted up. These shifts are such that in FIG. 3E no two tiles overlap.

Figure 4A:
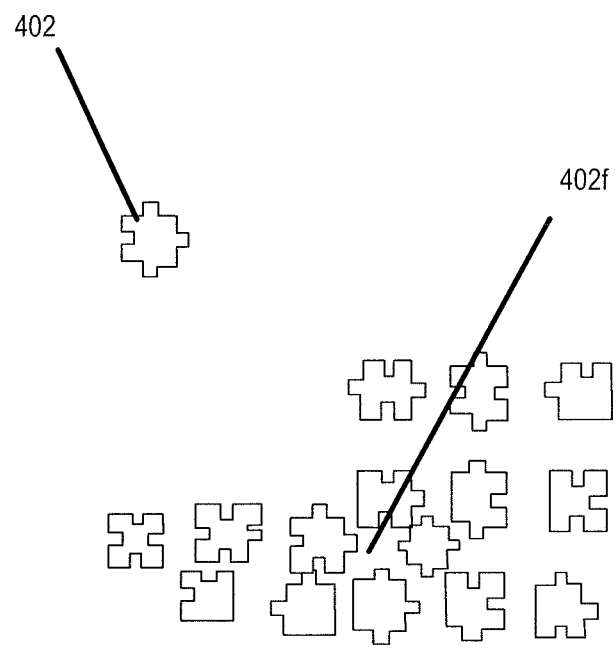
FIGS. 4A and 4B demonstrate an application of the disclosed systems and methods in a jigsaw puzzle according to some embodiments.
Figure 4B:
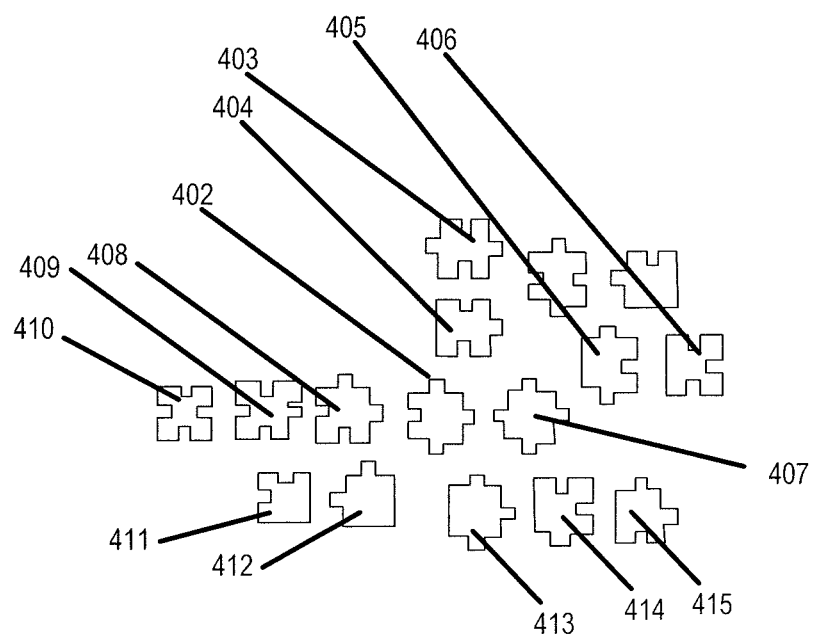

In some embodiments the tiles may correspond to pieces of a picture or a puzzle, or a game that the user is assembling. FIGS. 4A and 4B demonstrate such an application of the disclosed systems and methods according to some embodiments. In particular, these figures show two displays of an on-screen jigsaw puzzle. In these figures, a user is presented with sixteen tiles, each being a piece of the puzzle. During the process, the user rearranges the pieces by moving them around and changing their location on the display. In this example, the tiles are sixteen variously shaped and sized pieces, each of which includes some tabs or blanks that are configured to interlock with blanks or tabs of neighboring pieces.

FIG. 4A shows an initial arrangement of the sixteen pieces in which the user has picked piece 402 and intends to place it at location 402*f*. In this location, piece 402 will overlap with four other tiles around it. FIG. 4B shows that, after the user has moved tile 402 to its new location, the system has shifted twelve other tiles to make room for tile 402 and reduce the overlap. In particular, in FIG. 4B, tiles 403 and 404 have been shifted up, tiles 405-407 have shifted right, tiles 408-410 have shifted left, tiles 411 and 412 have shifted down and left, and tiles 413-415 have shifted down and right. As a result of the shifts, in FIG. 4B no two pieces overlap.

Figure 5:
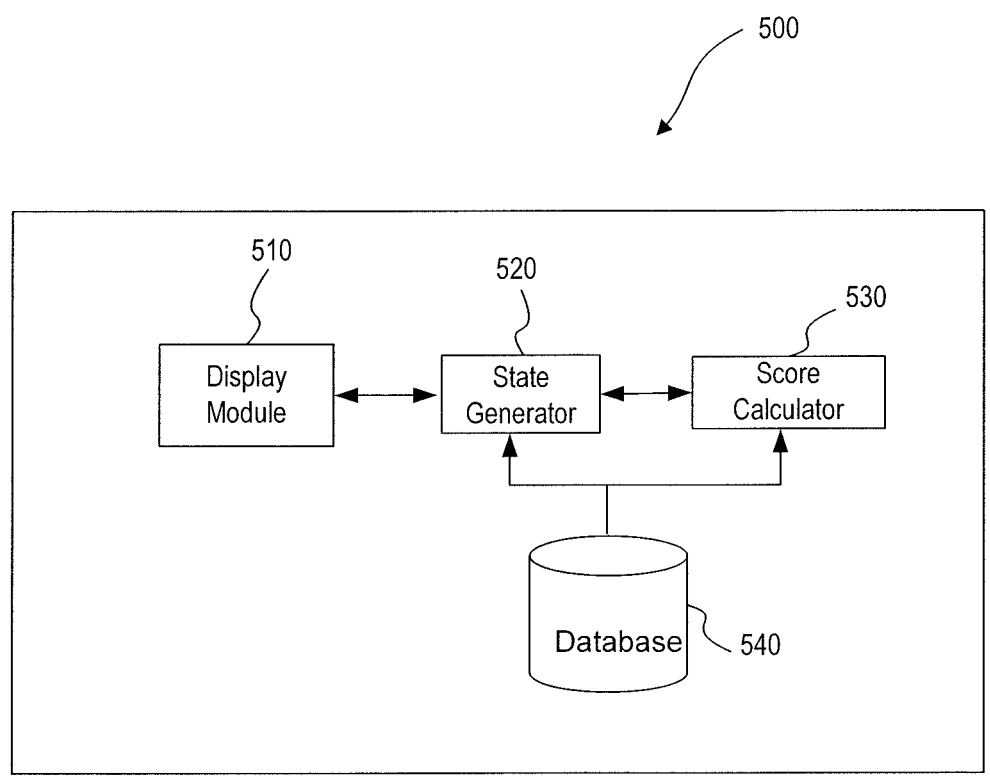
FIG. 5 shows a tile configuration system according to some embodiments.

In various embodiments, a tile configuration system generates and displays states corresponding to different arrangement of the tiles. FIG. 5 shows a tile configuration system 500 according to some embodiments. System 500 includes a display module 510, a state generator module 520, a score calculator module 530, and a database 540.

Display module 510 is configured to display one or more configurations of the tiles to the user. In various embodiments, display module 510 includes a display of a computer system or a mobile device. In some embodiments, display module 510 also represents one or more processors and memories that are connected to the display and are utilized for generating signals to display various objects.

State generator module 520 is configured to receive one or more initial states from display module 510. In some embodiments, an initial state represents an initial configuration of the tiles. In some embodiments, in the initial configuration two or more tiles overlap. Moreover, state generator module 520 is configured to start from a first state and generate one or more other states by shifting one or more tiles from their positions in the starting state. In this process, the starting state is called a "parent" state, and the generated state is called a "child" state or a secondary state. The parent state can be an initial state or a secondary state previously generated. In some embodiments, state generator 520 also places the initial state and the secondary states in the form of a sorted list, a tree, a vector, or other arrangements. State generator 520 may select and transmit to display module 510 one or more of those secondary states to be displayed.

Score calculator module 530 is configured to calculate one or more scores for one or more of the initial state or secondary states. In some embodiments, score calculator 530 uses various characteristics of a state to calculate its score. In some embodiments, the characteristics include the location and the size of the tiles. Moreover, in some embodiments, score calculator 520 uses one or more heuristics to calculate a score. The heuristics may depend on amounts of overlaps among tiles, movement of tiles compared to another state, overall packing or spread of tiles, or other parameters.

Database 540 stores different types of data utilized by various sections in system 500. These data include state arrangement data, scores of states, heuristics, and rules for calculating scores. In various embodiments, a state may be represented and stored in different ways such as a list recording the location and the orientation of the tiles; or a list recording the differences between the configuration and a reference configuration.

In some embodiments, a disclosed module is implemented via one or more computer processors executing one or more software programs for performing the functionality of the corresponding module. In some embodiments, the disclosed module may be implemented via one or more hardware modules executing firmware for performing the functionality of the module. In some embodiments, the disclosed module includes storage media for storing data or databases used by the module, or software or firmware programs executed by the module. In some embodiments, one or more of the disclosed module or disclosed storage media are internal or external to the disclosed systems. In some embodiments, one or more of the disclosed modules or storage media are implemented via a computing "cloud", to which the disclosed system connects via a communication system and accordingly uses the external module or storage medium. In some embodiments, the disclosed storage media for storing information include non-transitory computer-readable media, such as a CD-ROM, a computer storage, e.g., a hard disk, or a flash memory. Further, in some embodiments, one or more of the storage media are non-transitory computer-readable media that store information or software programs executed by various modules or implementing various methods or flowcharts disclosed herein.

Figure 6:
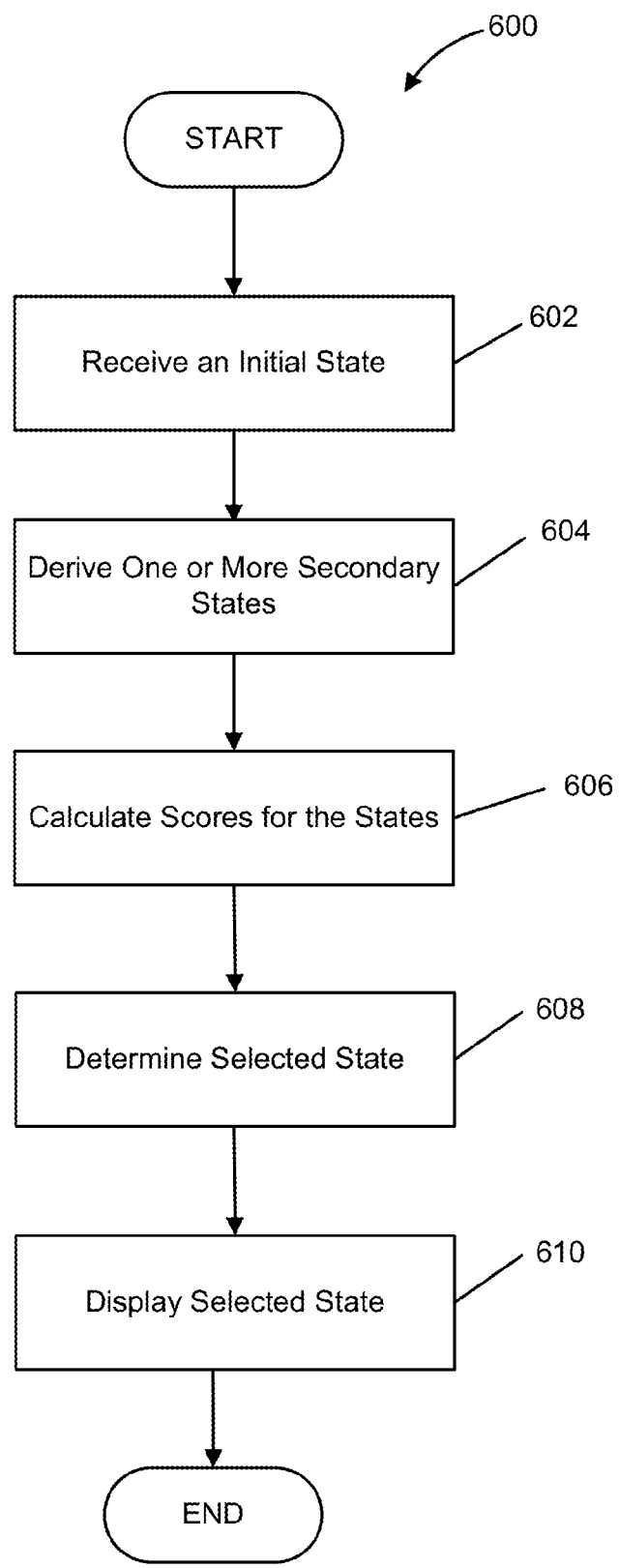
FIG. 6 shows a tile configuring method according to some embodiments.

In some embodiments, the tile configuration system per a tile configuring method for selecting a configuration to be displayed. FIG. 6 shows a tile configuring method 600 according to some embodiments. Method 600 may be performed by a tile configuration system. Moreover, various steps of method 600 may be performed by one or more of the modules in a tile configuration system.

In block 602, the system receives an initial state, in various embodiments, the initial state corresponds to an initial configuration of the tiles, in this initial state, one or more tiles may overlap. In the embodiments shown in FIGS. 1A-1E, for example, the initial state may correspond to the configuration of tiles shown in FIG. 1A, 1C, or 1E. Similarly, in the embodiments shown in FIGS. 2A-2C, the initial state may correspond to the configuration of tiles in FIG. 2B; in FIGS. 3A-3E the initial state may correspond to the configuration of tiles in FIG. 3B or 3D; and in FIGS. 4A and 4B, the initial state may correspond to the configuration of tiles in FIG. 4A, when tile 402 is placed at location 402f. An initial state may correspond to a configuration of tiles after a user moves one or more tiles to a new location, as described before in relation to the above-mentioned initial states.

Returning to FIG. 6, in block 604, the system derives one or more secondary states. In some embodiments, the system derives a secondary state by shifting one or more tiles in a parent state that may be an initial state or another secondary state. For example, in the embodiments shown FIGS. 1A-1F, FIG. 1B can correspond to a secondary state derived from the initial state shown FIG. 1A; FIG. 1D can correspond to another secondary state derived from the state shown in FIG. 1C; and FIG. 1F can correspond to a third secondary state derived from the state shown in FIG. 1E. Similarly, in the embodiments shown in FIGS. 2A-2C, the state shown in FIG. 2C can correspond to a secondary state derived from the state in FIG. 2B; in the embodiments shown in FIGS. 3A-3E, FIGS. 3C and 3F each can correspond to a secondary state derived from the states shown in FIGS. 3B and 3D, respectively; and in FIGS. 4A and 4B the state shown in FIG. 4B can correspond to a secondary state derived from the state shown in FIG. 4A. In various embodiments, one or more than one secondary states may be derived from an initial state or another secondary state. In some embodiments, the system stores initial states or secondary states in a state list and uses members of the state list for deriving additional secondary states. A secondary state may include two or more overlapping tiles or may not include any overlapping tiles.

Returning to FIG. 6, in block 606, the system calculates configuration scores for the initial or secondary states. In some embodiments the system stores in the state list the score for each state along with the state. In some embodiments, the system searches for states with lower configuration scores. In some embodiments, a lower configuration score represents a stat that is more useful to the user. A lower configuration score may for example, indicate that the state is more usable to the user in one or more ways, such as, having less overlap, having less spread of the tiles, or being reached from an initial state via the least amount of tile shifts.

In some embodiments, the system populates the state list in a recursive manner and in multiple stages. In each stage, the system may generate some new secondary states, calculate their scores, and update the state list. The system may then use the updated state list for generating new secondary states in the next stage.

FIGS. 7A-7E illustrate a sequence of stages for updating a state list for a two-tile configuration according to an embodiment. These figures relate to generating various states and their corresponding state lists for different configurations of two square tiles, one white and one black. In particular, FIGS. 7A-7E show the five consecutive stages for generation of secondary states and FIGS. 8A-8E illustrate the corresponding state list for each stave. The state list corresponding to each stage includes one or more states that can be used in the future stages for generation of secondary states. In each stage, the system generates one or more secondary states from one or more states in the previously generated state list. Moreover, the system calculates the configuration scores for the generated states and stores all or a subset of the states in a new state list and in an increasing order of their scores. Also, the system keeps track of the best state among all previously considered or generated states.

Figure 7A:
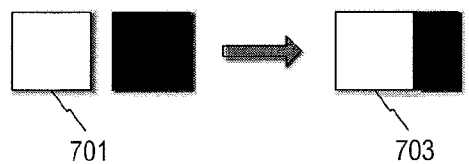
FIGS. 7A-7E illustrate a sequence of stages for updating a state list for a two tile configuration according to an embodiment.
Figure 8A:
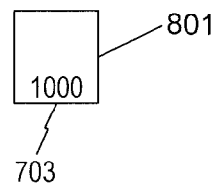
FIGS. 8A-8E illustrate a state list updated through a sequence of stages for a two tile configuration according to an embodiment.

FIG. 7A includes two consecutive states 701 and 703. In state 701, the two tiles are located next to each other. In state 703, a user has moved the white tile to the right, such that it covers almost half of the black tile. Thus, in state 703, the two tiles are overlapping. The system may store state 701 as an initial state in a state list 801. Moreover, in FIG. 8A, the system calculates for state 701 a configuration score of 1000. The details of calculating a score is described later. FIG. 8A shows state list 801, which the system generates after receiving the initial state 701. State list FIG. 8A includes one member, state 801 and also shows its score, 1000. Up to this point, the best state is the only considered state, that is, initial state 701, with a score of 1000.

Figure 7B:
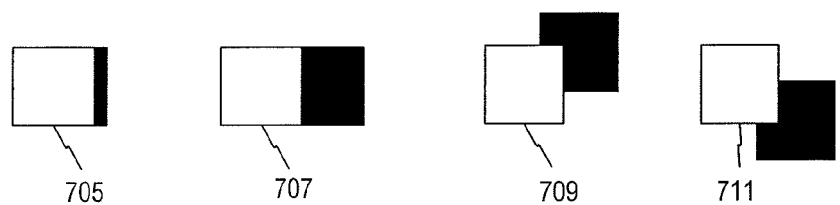
Figure 8B:
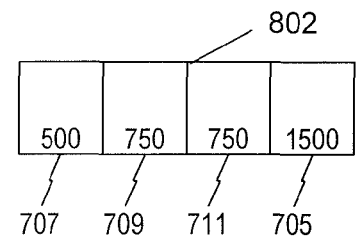

FIG. 7B depicts to generation of four secondary states 705, 707, 709, and 711 from the initial state 701. In particular, the system generates states 705, 707, 709, and 711 by shifting the black tile in four directions of left, right, up, and down, respectively. In some embodiments, in each shift, the system moves one or more tiles by a unit of distance in one of four or more directions. In some embodiments, the system performs different shifts by moving different tiles by different amounts. In some embodiment, a unit of distance is determined as a number of pixels or as a fraction of a dimension of a tile. In FIG. 7B, for example, the amount of shift for states 705 and 707 is around one fourth of one side of the tiles and the amount of shift for states 709 and 711 is about one half one side of the tiles. The system further calculates scores of the states 705, 707, 709, and 711 to be respectively 1500, 500, 750, and 750. The system stores in a state list the generated states in an increasing order of their scores. FIG. 8B shows such an exemplary state list 802 as generated after the completion of the steps show in FIG. 7B. In some embodiments, upon generating secondary states from a parent state, the system removes the parent state from the state list. Moreover, when two or more different states in the state list have equal scores, the system may position them next to each other based on different rules, for example, in a random order or based on the order by which they are generated. Following the steps shown in FIG. 7B, the system selects state 707 as the best state considered so far.

In some embodiments, the best state is a state with the lowest configuration score. In some other embodiments, an alternative score may be defined such that the selected state is the one with the highest alternative score. One such alternative score for a state may be defined as, for example, the negative of the configuration score for the state, or the difference between a maximum configuration score and the configuration score.

In some embodiments, in addition to a score, the system may also consider other factors in choosing the best state. For example, to decide whether to choose a specific state, the system may also consider the cost of the intermediate states for reaching that specific state. In some embodiments, the system may define a revised score for a specific state as the sum of the configuration score for that specific state and a factor multiplied by the sum of the configuration scores of intermediate states that are generated to reach the specific state. In some of such embodiments, thus, a first state with a higher configuration score may be selected over a second state with a lower configuration score, if the revised score for the first state is lower.

Figure 7C:
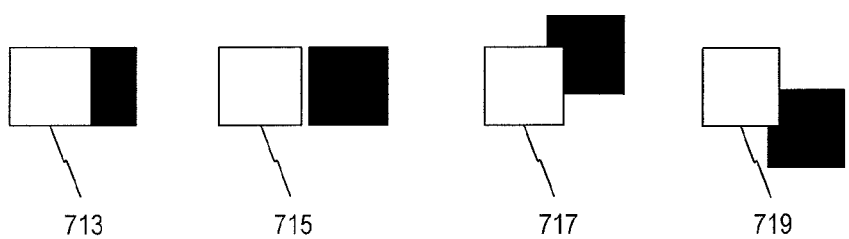
Figure 8C:
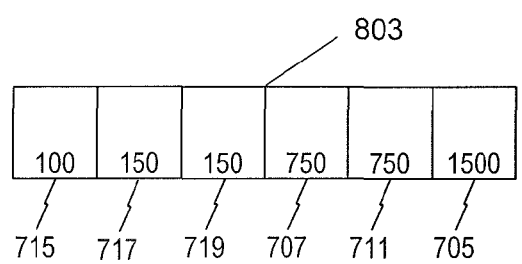

As shown in FIG. 7C, the system generates four additional secondary states 713, 715, 717, and 719 from state 707. In particular, the system selects the first state in state list 802 as a parent state and generates secondary states as child states of the parent state. This first state, state 707, generated as shown in FIG. 7C, has the lowest score among the states in state list 802. In stage FIG. 7C, the system starts from the selected state 707 and generates secondary states 713-719 by further shifting the tiles. In particular, the system generates child states 713-719 by shifting the black tile in parent state 707 in four directions of left, right, up, and down, respectively. Of the newly generated states 713-719, state 713 is a duplicate to initial state 701 and thus the system does not consider it any further. The system further calculates the scores for the new states 715, 717, and 719 to be, respectively, 100, 150, and 150. Thus, as shown in FIG. 8C, the system removes state 707 from the state list and adds the newly generated states to generate state list 803. State list 803 thus includes states 715, 717, 719, 709, 711, and 705 in that order, for which the scores are, respectively, 100, 150, 150, 750, 750, and 1500. At the end of the steps shown in FIG. 7C, the system selects state 715 as the best state considered so far, as it has had the lowest score of 100.

Figure 7D:
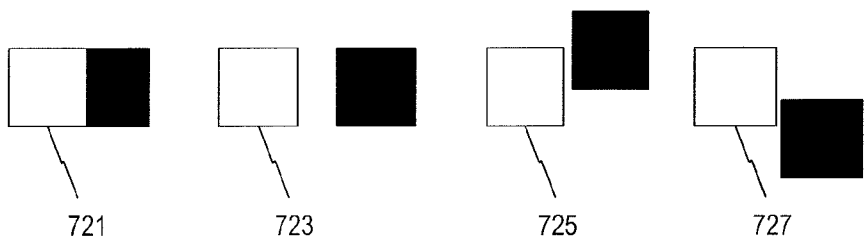
Figure 8D:
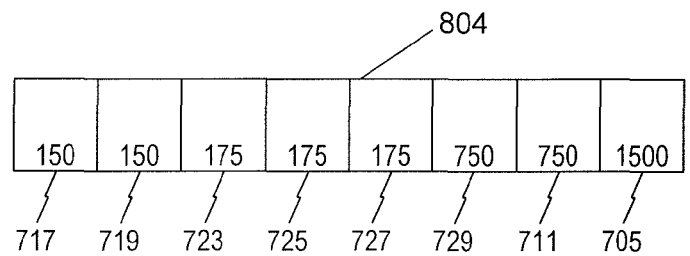

As shown in FIG. 7D, the system generates four additional secondary states 721, 723, 725, and 727 from state 715. In particular, the system selects the first state in state list 803, that is, state 715, as a parent state and generates secondary states as child states of state 715. As shown in FIG. 7D, the system starts from the selected state 715 and generates secondary states 721, 723, 725, and 727 by further shifting the tiles. In particular, the system generates child states 721, 723, 725, and 727 by shifting the black tile in parent state 715 in four directions of left, right, up, and down, respectively. Of the newly generated states 721-727, state 721 is a duplicate to previously considered state 707 and thus the system does not consider it any further. The system further calculates the scores for all new states 723, 725, and 727 to be 175. Thus, as shown in FIG. 8D, the system removes state 715 from the state list and adds the newly generated states 723, 725, and 727 to generate state list 804. State list 804 thus includes states 717, 719, 723, 725, 727, 709, 711, and 705 in that order, for which the scores are, respectively, 150, 150, 175, 175, 175, 750, 750, and 1500. At the end of the steps shown in FIG. 7D, the system retains state 715 as the best state considered so far, as it has had the lowest score of 100.

Figure 7E:
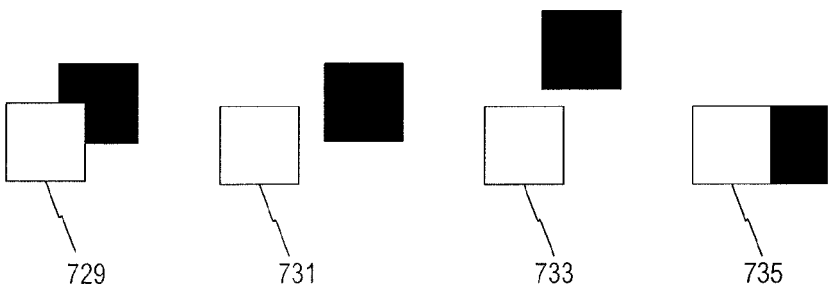
Figure 8E:
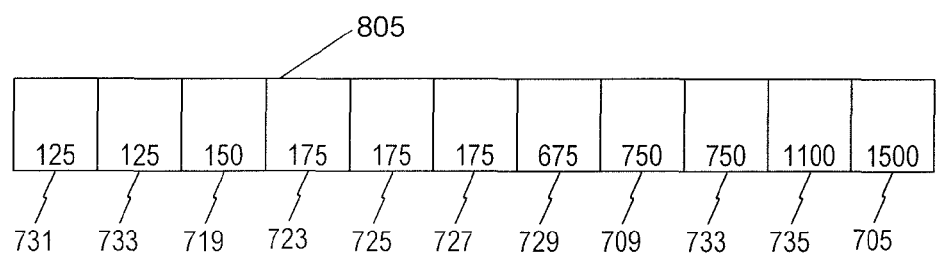

As shown in FIG. 7E, the system generates four additional secondary states 729, 731, 733, and 735 from state 717. In particular, the system selects the first state in state list 804, that is, state 717 as a parent state and generates secondary states as children states of state 717. As shown in FIG. 7E, the system starts from the selected state 717 and generates secondary states 719-735 by further shifting the tiles. In particular, the system generates child states 719-735 by shifting the black tile in parent state 717 in four directions of left, right, up, and down, respectively. The system further calculates the scores for all new states 729, 731, 733, and 735 to be respectively 675, 125, 125, and 1100. Thus, as shown in FIG. 8E, the system removes state 717 from the state list and adds the newly generated states 729, 731, 733, and 735 to generate state list 804. State list 804 thus includes states 731, 733, 719, 723, 725, 727, 729, 709, 711, 735, and 705 in that order, for which the scores are, respectively, 125, 125, 150, 150, 175, 175, 175, 675, 750, 750, 1100, and 1500. At the end of the steps shown in FIG. 7D also, the system retains state 715 as the best state considered so far, as it has had the lowest score of 100.

Returning to FIG. 6, in step 608, the system determines a selected state for display. In some embodiments, a selected state may be the best state found by the system. In some embodiments, the system determines the best state as the state with the lowest score. The system may use a time limit to stop the search process: upon reaching the time limit, the system may determine the selected state as the state with the lowest score, as found up to that time. In the embodiment illustrated in FIG. 7, for example, if the system reaches the time limit after the completion of the steps shown in FIG. 7D, the system may determine that state 715 is the selected state, as state 715 is the best state found at the end of the steps shown in FIG. 7D. In some embodiments, the system stops the generation of secondary states upon finding a desired state that satisfies a threshold criterion. The system may then choose that desired state as the selected state. The desired state may, for example, have a score that is the minimum possible score or below a low-threshold score. In some embodiments, the minimum possible score is zero. Alternatively, the desired state may be defined as a state that does not include any overlapping tiles.

Returning to FIG. 6, in step 610 the system displays the selected state. The selected state may be a state that improves upon the initial state. In particular, the selected state may be a state that results from the initial state after one or more shifts, and in which there is no overlap or less overlap among the tiles compared to the initial state. For example, in the embodiments shown FIGS. 1A-1F, the states shown in FIG. 1B, FIG. 1D, and FIG. 1F can correspond to selected states that have been chosen and displayed after one or more shifts were performed on the tiles in FIGS. 1A, 1C, and 1E, respectively. Similarly, in the embodiments shown in FIGS. 2A-2C, the state shown in FIG. 2C may correspond to a selected state that has been chosen and displayed after performing one or more shifts in the initial state in FIG. 2B; in the embodiments shown in FIGS. 3A-3E, the states shown in FIGS. 3C and 3E each may correspond to a selected state chosen and displayed after one or more shifts were performed in the initial states shown in FIGS. 3B and 3D, respectively; and in FIGS. 4A and 4B the state shown in FIG. 4B may be a selected state resulting from one or more shifts of the tiles in the initial state shown in FIG. 4A.

In various embodiments, the system calculates a configuration score for each state. In some embodiments, the system uses one or more heuristics or rules to determine the configuration score of a state. The heuristics may quantify one or more characteristics of a configuration of tiles that relate to its utility for display. Each heuristic may result in a heuristic-related score for the state. In some embodiments, the overall score of a state is a simple sum, a weighted sum, or another function of the one or more heuristic-related scores of the state. In some embodiments, a state with a lower score is more usable for being displayed.

In some embodiments, one such heuristic is an intersection heuristic. The intersection heuristic quantifies the overlap among the tiles. In some embodiments, the intersection heuristic is an increasing function of the total overlap among different tiles in the configuration. In various embodiments, the intersection heuristic increases as the overall overlap among tiles increases. Those tiles that do not overlap do not contribute to this heuristic. Those tiles that do overlap may contribute to this heuristic in proportion to the area of their overlap. The intersection heuristic for a state may thus be proportional to the sum of the areas of the overlap among the tiles. The intersection heuristic thus penalizes states that have more overlaps and awards those that have less overlaps.

Figure 9A:
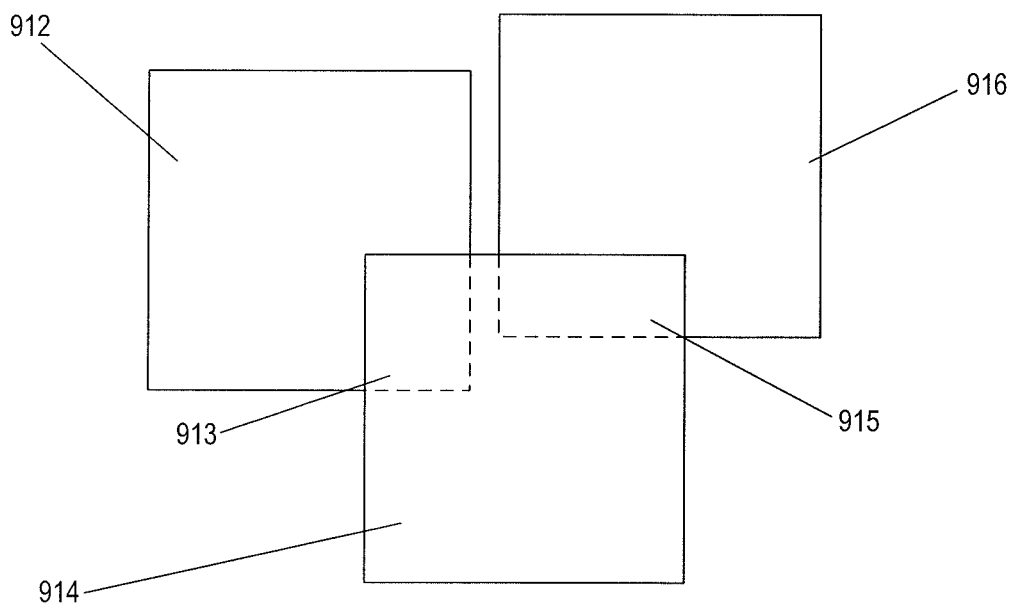
FIGS. 9A and 9B illustrate examples for calculating an intersection heuristic according to an embodiment.
Figure 9B:
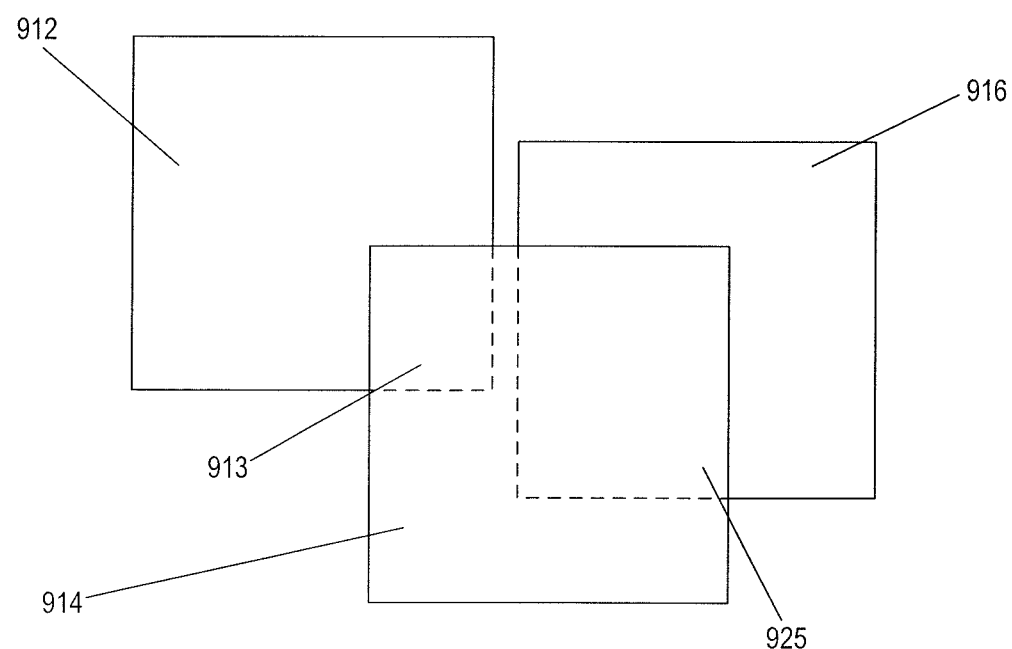

FIGS. 9A and 9B illustrate two examples for calculating the intersection heuristic according to an embodiment. FIG. 9A shows a first state and FIG. 9B shows a second state for three square-shaped tiles 912, 914, and 916 that overlap with each other. The states shown in FIGS. 9A and 9B each can be an initial state or a secondary state.

In FIG. 9A, the 914 partially overlaps with tile 912 in an overlap section 913, and the area of overlap section 913 is 17,500 pixels. Similarly, tile 914 partially overlaps with tile 916 in an overlap section 915 and the area of overlap section 915 is 20,000 pixels. The intersection heuristic for this configuration of the three tiles is a function of the overlap areas. In one embodiment, the intersection heuristic is proportional to the sum of the overlap areas, that is, 37,500 pixels. In one embodiment, the intersection heuristic is the total overlap areas, measured in pixels, divided by 100. In this embodiment, thus, the intersection heuristic for the configuration of FIG. 9A is 37,500 divided by 100, that is, 375.

In FIG. 9B, tile 916 has slightly moved down, such that its overlap with tile 914 has enlarged to an overlap section 925. The area of overlap section 925 is 50,000 pixels. Thus, in the embodiment discussed above, the intersection heuristic is proportional to the sum of the increased overlap areas, that is, 67,500 pixels, and in particular is 67,500 divided by 100, that is, is 675.

In some embodiments, one heuristic is a "tile move" heuristic. The tile move heuristic for a secondary state relates to the amount that the system moves one or more tiles to reach from the initial state to the secondary state. In some embodiments, the tile move heuristic is an increasing function of the total move distances of different tiles. In various embodiments, the tile move heuristic increases as the total movement increases. Tiles that do not move do not contribute to this heuristic. The tiles that move may contribute to this heuristic in proportion to the amount of their movement. The tile move heuristic for a state may thus be proportional to the sum of the movement of different tiles in the system. Tile move heuristic thus penalizes a state based on the number of shifts that are needed to reach that state.

Figure 10A:
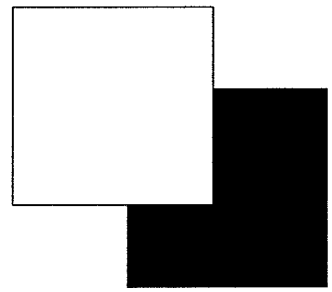
FIGS. 10A-10D illustrate an example for calculating a tile move heuristic according to an embodiment.
Figure 10B:
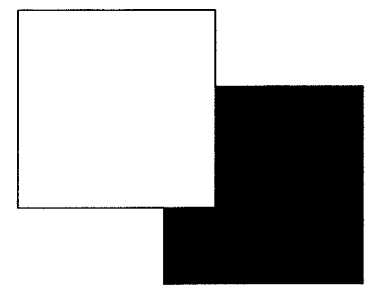
Figure 10C:
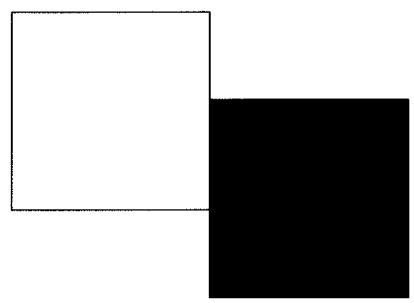
Figure 10D:
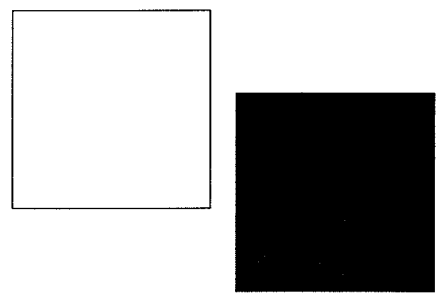

FIGS. 10A-10D illustrate one example for calculating the tile move heuristic according to an embodiment. FIG. 10A shows one initial state of a configuration of two tiles, one white and one black. Three secondary states shown in FIGS. 10B to 10D are consecutively derived from the initial state. In the initial state shown in FIG. 10A, the white tile overlaps the black tile. In the secondary states shown in FIGS. 10B, 10C, and 10D, the black tile has consecutively shifted up three times and by 75 pixels each time. Thus, with respect to the initial state shown in FIG. 10A, the total movement distances of the black tile in the secondary states shown in FIGS. 10B, 10C, and 10D are respectively 75, 150, and 225 pixels. In one embodiment, the tile move heuristic for the secondary states shown in FIGS. 10B, 10C, and 10D are respectively 75, 150, and 225, that is, equal to the total movement distance measured in pixels. In other embodiments, the tile move heuristic may be equal to the total movement distance of all tiles as measured in other units, or may be a product of that total movement distance in pixels multiplied by a proportionality factor. In various embodiments in which more than one tile moves, the tile move heuristic is proportional to the sum of the movement distances of those tiles.

In some embodiments, the tile move heuristic is a weighted sum of the movement distances of tiles. The weighted sum of movement distances may, for example, differentiate between movements in different directions by, for example, giving different weights to movements in different directions. The system may, for example, turn on a "horizontal move preference" or "leftward move preference" mode by respectively giving a lower weight to horizontal movements or to leftward movements compared to other movements, thus giving preference to horizontal or leftward movements. Alternatively, the system may give a lower weight to the movement distances of a first set of tiles compared to the movement distances of other tiles, thus giving preference to the movements of the first set of tiles.

In some embodiments, one heuristic is a boundary move heuristic. The boundary move heuristic for a secondary state relates to the distance that one or more sides of the boundary of the overall configuration moves when the initial state changes to the secondary state. In various embodiments, the boundary of a configuration is defined as a geometric shape that encompasses the configuration. In some embodiments, the boundary of a configuration is the smallest rectangle that encompasses all tiles in the configuration.

Figure 11A:
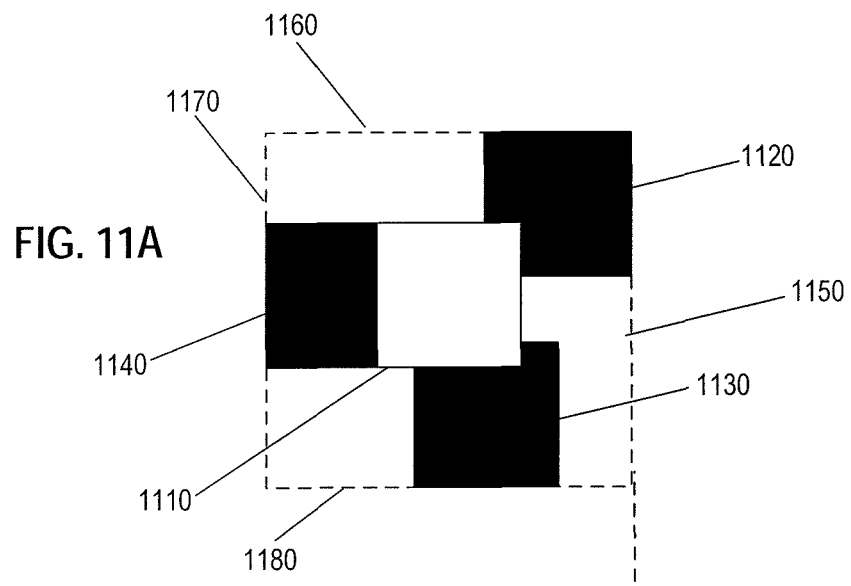
FIGS. 11A-11C illustrate an example for calculating a boundary move heuristic according to an embodiment.
Figure 11B:
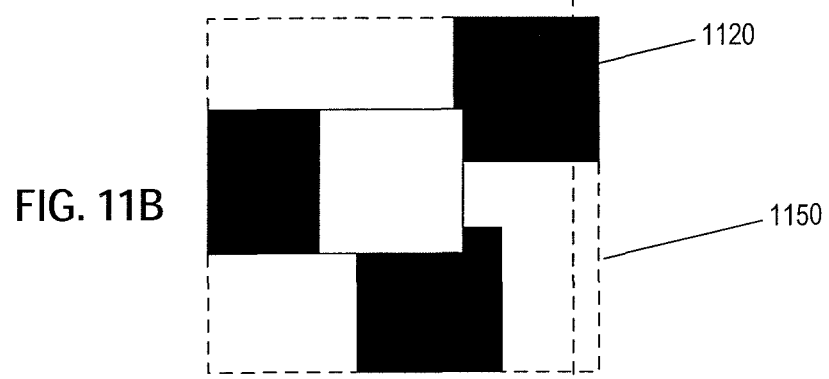
Figure 11C:
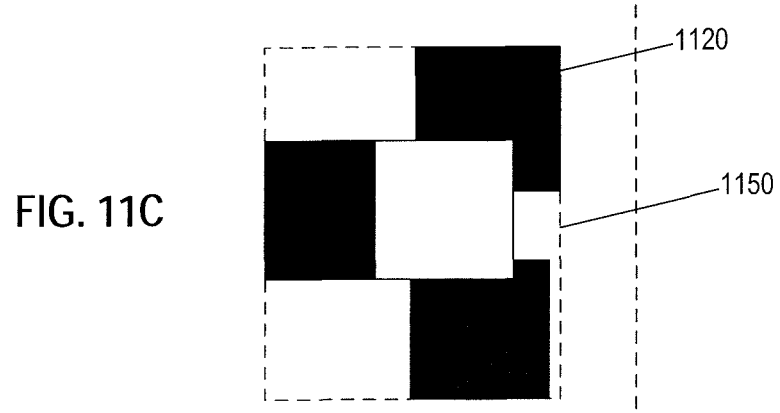

FIGS. 11A-11C illustrate one example for calculating the boundary move heuristic according to an embodiment. FIG. 11A shows one initial state of a configuration of four tiles, one white tile 1110 and three black tiles 1120, 1130, and 1140; and two secondary states are shown in FIGS. 11B and 11C that are consecutively derived from the initial state. In the initial state shown in FIG. 11A, the white tile overlaps the three black tiles. Moreover, for the state shown in FIG. 11A, the boundary of the configuration is shown as a rectangle with four sides 1150, 1160, 1170, and 1180.

In the secondary state shown in FIG. 11B, black tile 1120 has moved to the right by 50 pixels with respect to the initial state. As a result of this move, the right side 1150 of the boundary has moved to the right by 50 pixels. Such a movement that increases the area defined by the boundary is a stretching movement.

In the secondary state shown in FIG. 11C, black tile 1120 has moved to the left by 150 pixels with respect to the initial state. As a result of this move, the right side 1150 of the boundary has moved to the left by 150 pixels. Such a movement that decreases the area defined by the boundary is a compressing movement.

In various embodiments, the boundary move heuristic is a function of the total boundary movement. Moreover, in some embodiments, the total boundary movement is measured based the movements of each of the sides of the boundary. In some situations, to reach the secondary state, some of the boundaries may not move, some may have a stretching move and some may have a compressing move. In some embodiments, the system may penalize stretching movements and award compressing movements. In some of such embodiments, the total boundary movement is an algebraic sum of the boundary movements, with the stretching moves being positive and the compressing moves being negative. In such embodiments, thus, the total boundary movement for the state shown in FIG. 10B is 50 and for the state shown in FIG. 10C is 150.

In some other embodiments, the system may penalize both stretching and compressing movements. In some of such embodiments, the total boundary movement is the sum of the absolute values of the boundary movements, that is, with both the stretching moves and compressing moves contributing by a positive amount. In such embodiments, thus, the total boundary movement for the state shown in FIG. 10B is 50 and for the state shown in FIG. 10C is 150.

In yet some other embodiments, the system may only penalize stretching movements and may not take into account compressing movements. In some of such embodiments, the compressing movement is not taken into account and the total boundary movement is the sum of the stretching movements only. In such embodiments, thus, the total boundary movement for the state shown in FIG. 10B is 50 and for the state shown in FIG. 10C is 0.

In some embodiments, the boundary move heuristic is an increasing function of the total boundary movement. In various embodiments, the boundary move heuristic increases as the total boundary movement increases. In some embodiments, the boundary move heuristic is proportional to the total boundary movement. In one embodiment, for example, when the boundary move heuristic is a boundary stretching heuristic, the value of the heuristic for the state shown in FIG. 10A is 50 or proportional to 50, and that value for the state shown in FIG. 10B is 0.

In some embodiments, one heuristic is a compression heuristic. The compression heuristic is defined for any state, whether initial or secondary, and quantifies the tight packing of the tiles. The more tightly packed tiles are awarded by receiving a lower compression heuristic. In some embodiments, the compression heuristic is based on the area defined by the boundary of the state or the location of the sides of the boundary. In some embodiments, the compression heuristic is activated when the overall display gets resized through, for example, a window resize event.

FIGS. 12A-12C illustrate one example for calculating the compression heuristic according to an embodiment. These figures show three states for three black tiles. The configuration boundary in each state is a rectangle with four sides 1201 to 1204. Further, the display boundary is another rectangle with four sides 1211 to 1214. As observed qualitatively, in the states shown in FIGS. 12A to 12C, the tiles are progressively more tightly packed. The compression heuristic, thus, reflects this progression by calculating progressively lower values for these states.

In some embodiments, the compression heuristic of a state is proportional to the area of the configuration boundary for the state, in some other embodiments, the compression heuristic of a state is a function of the distance between the sides of the boundary and some reference points or lines. For the states shown in FIGS. 12A-12C, for example, in one embodiment the compression heuristic is proportional to the sum of the distances of side 1211 of the display with the vertical sides of the boundary, which are sides 1201 and 1203. In the state shown in FIG. 12A, the distances between side 1211, and sides 1201 and 1203 of the boundary are 200 and 1500 pixels, respectively. The compression heuristic of the state shown in FIG. 12A is thus equal or proportional to the sum of these values, that is, 1700. In one embodiment, the compression heuristic is proportional to this sum by a factor of 0.1 and is thus 170 for the state shown in FIG. 12A.

For the state shown in FIG. 12B, in which the tiles are more tightly packed compared to the state shown in FIG. 12A, the distances between side 1211, and sides 1201 and 1203 of the boundary are 50 and 900 pixels, respectively; and the compression heuristic is thus equal or proportional to 950. In particular, in the one embodiment mentioned above, the compression heuristic for the state shown in FIG. 12B is 95, which is lower than that of the state shown in FIG. 12A.

For the state shown in FIG. 12C, in which the tiles are most tightly packed compared to both previous states, the distances between side 1211, and sides 1201 and 1203 of the boundary are 0 and 700 pixels, respectively; and the compression heuristic is thus equal or proportional to 700. In particular, in the one embodiment mentioned above, the compression heuristic for the state shown in FIG. 12C is 70, which is lower than those of both other states.

In some embodiments, one heuristic is an embedded heuristic, which is non-zero for a tile that is fully embedded in another tile. The purpose of this heuristic is to drive the system to move the embedded tile out of the embedding tile. The embedded heuristic measures the level to which the embedded tile is close to exiting the embedding tile. In particular, the embedded heuristic results in a lower value when the embedded tile is closer to exiting the embedding tile.

Figure 13A:
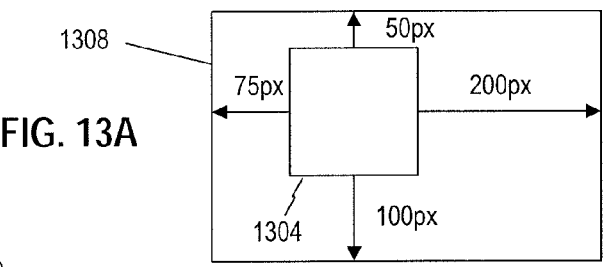
FIGS. 13A-13G illustrate an example for calculating an embedded heuristic according to an embodiment.
Figure 13B:
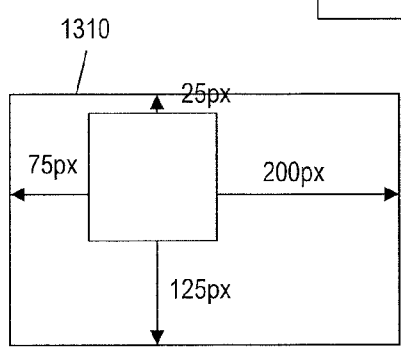
Figure 13C:
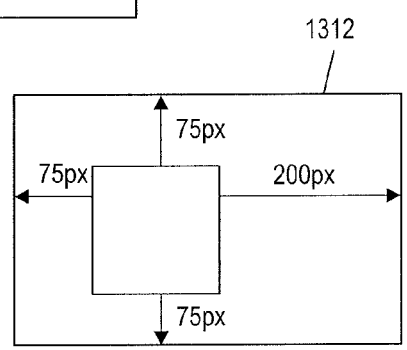
Figure 13D:
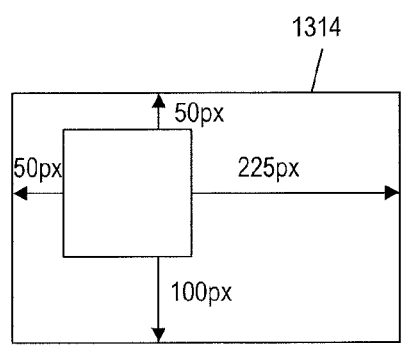
Figure 13E:
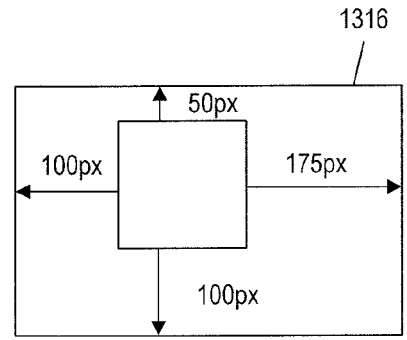
Figure 13F:
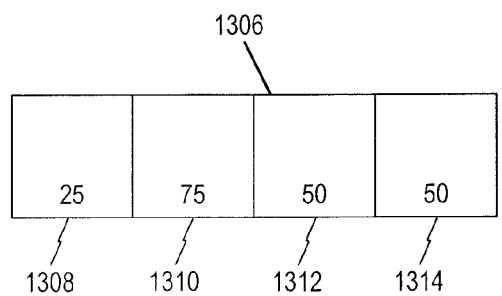
Figure 13G:
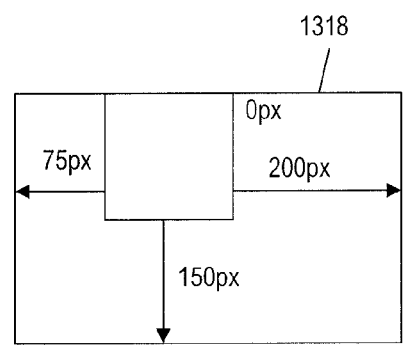

FIGS. 13A-13G illustrate one example for calculating the embedded heuristic according to an embodiment. Six states are shown for two tiles, one larger rectangular tile 1302 and one smaller square tile 1304 that is fully embedded in the tile 1302. FIG. 13F also shows a state list 1306, FIG. 13E shows state 1308, a parent state, which may be an initial state or a secondary state. The states 1310-1318 shown in FIGS. 13B-13E are four secondary states that are derived from state 1308. FIG. 13F shows state 1310, a secondary state derived from state 1310. The state list 1306 shown in FIG. 13F lists the states 1310-1318 and sorts them according to their score derived solely from the embedded heuristic, as detailed below.

In some embodiments, the embedded heuristic is an increasing function of the least distance between the boundaries of the embedded and the embedding tiles. In some embodiments, the embedded heuristic is proportional to this distance. In state 1308 of FIG. 13A, for example, the distance between the top sides of the embedded tile 1304 and embedding tile 1302 is 50 pixels, the distance between the leftmost sides of the two tiles is 75 pixels, the distance between the bottom sides is 100 pixels, and the distance between the rightmost sides is 200 pixels. The embedded heuristic in state 1308 is thus proportional to the smallest of these four distances, that is, 50 pixels, in one embodiment, used here, the proportionality factor is one. The embedded heuristic for state 1308 is thus 50.

States 1310-1318, shown in FIGS. 13B-13E, are derived from state 1308 by shifting the gray tile with respect to the black tile by an amount of 25 pixels in the four directions of up, down, left, and right, respectively. In state 1310, thus, the above listed four distances between the top, left, bottom, and right pairs of sides are 25, 75, 125, and 200, respectively. The embedded heuristic for this state is thus 25, the smallest of these four distances. Similarly, as shown in FIG. 13C for state 1312, the four distances are 75, 75, 75, and 200, and the embedded heuristic is 75; as shown in FIG. 13D for state 1314, the four distances are 50, 50, 100, and 225, and the embedded heuristic is 50; and as shown in FIG. 13E for state 1316, the four distances are 50, 100, 100, 175, and the embedded heuristic 50.

State list 1306 lists the four child states 1310 to 1316 and configuration scores based on embedded heuristic only. As noted, state 1310 has the lowest score of 25 compared to the other three scores. That is the system, based on embedded heuristic, awards an upward shift of tile 1304 in state 1308, resulting in state 1310, because an upward shift is the closest way for tile 1304 to exit tile 1302. More generally, the embedded heuristic awards the configuration that shifts the tiles such that the embedded tile moves towards exiting the embedding tile. Other heuristics may not have such an effect. In particular, the intersection heuristic does not distinguish among different embedded configurations: in all these configurations, the area of overlap is equal to the area of the embedded tile and is thus the same. For states 1308-1316, for example, the intersection heuristic, is the same and proportional to the area of tile 1304 that is fully overlapped by tile 1302.

Returning to FIG. 13B, in the next stage the system may derive from state 1308 a child state by shifting the gray tile up by 25 pixels. Such a shift will bring the upper side of the gray tile to overlap with the upper side of the black tile. In the child state shown in FIG. 13G, thus, the smallest distance between the corresponding sides of the two tiles is 0. Therefore, in above-discussed embodiment, the embedded heuristic for the child state is 0.

In various embodiments, the system may apply one or more heuristics to determine the configuration score of different states. The configuration score may be based on the sum or a weighted sum of one or more of the heuristics, such as those discussed above or others. Moreover, at different stages of the process, the system may vary the effect of one or more heuristics by varying the values of their weights in the weighted sum; or may even deactivate some of them by setting their weights to zero. The system may, for example, reduce the effect of a heuristic or deactivate it when, for example, its usage is counterproductive because it lengthens the process or generates unnecessary states. The system may, on the other hand, raise the effect of a heuristic or activate a previously deactivated heuristic when it is necessary to overcome a specific change in the configuration and derive the necessary states.

For example, the system may set the weight of the embedded heuristic to a non-zero value, in effect activate this heuristic, only when a tile becomes fully embedded in another tile and also may calculate this heuristic only for those tiles. As another example, if a tile extends such that its size increases by a large factor, e.g., 1000%, and thus overlaps or embeds many tiles, the system may deactivate the move heuristic or the boundary move heuristic, and may at the same time increase the weight of the intersection heuristic by a large factors, e.g., 100. The system may make such changes to facilitate the movement of the overlapped or embedded tiles away from the extended tile, in yet another example, if a tile extends or moves such that its breadth blocks the entire or most of the horizontal breadth of the screen, the system may change the weights for horizontal movements, turning on the horizontal move preference mode described above, to facilitate movements that are horizontal. The changes in the weights may be performed by a user or triggered automatically due to some events, such as the above-mentioned events of a tile getting fully embedded in another tile or a tile area expanding by a large factor such as 10.

As described earlier, in some embodiments, the system stops generating new secondary states and chooses a selected state upon reaching a time limit or upon generating a state that satisfies a threshold criterion. If the system reaches a time limit, the system may choose the selected state as the state with lowest score up to that point. Depending on the mechanism and order that the system uses for generating the secondary states, the system may arrive at different states with different scores within the time limit. Similarly, more than one state may satisfy the threshold criterion and the system may reach different ones of them first based on the mechanism and order by which it generates the secondary states. Thus, the mechanism and order of generating new secondary states may determine the outcome of the process. The system provides better selected states if it uses a mechanism that arrives at states with lower scores faster and through fewer steps. In other words, in deriving secondary states, ordering them in a state list, and deriving the next generation of secondary states, the system explores the space of possible states in search of the selected state. The system may benefit from mechanisms that shorten its path towards favorable states and avoid less favorable states.

In various embodiments, the system improves its mechanism of generating secondary states and searching for the selected state by using one or more criteria and techniques for moving the tiles or for deriving secondary states. In various embodiments, to derive secondary states from a parent state, the system should determine which tiles to shift and by what amount to shift them.

Figure 14A:
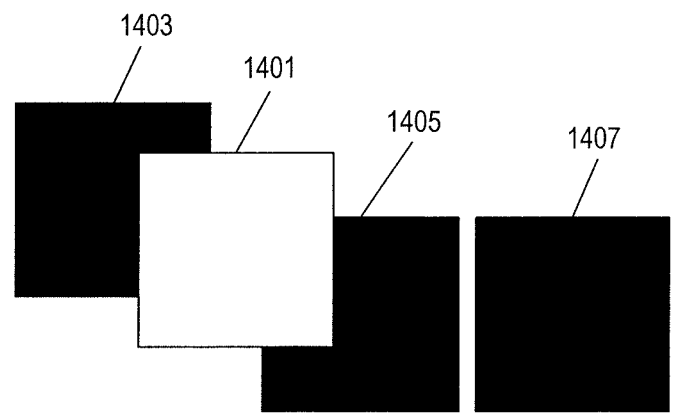
FIGS. 14A-14C illustrate an example for determining moveable tiles according to some embodiments.
Figure 14B:
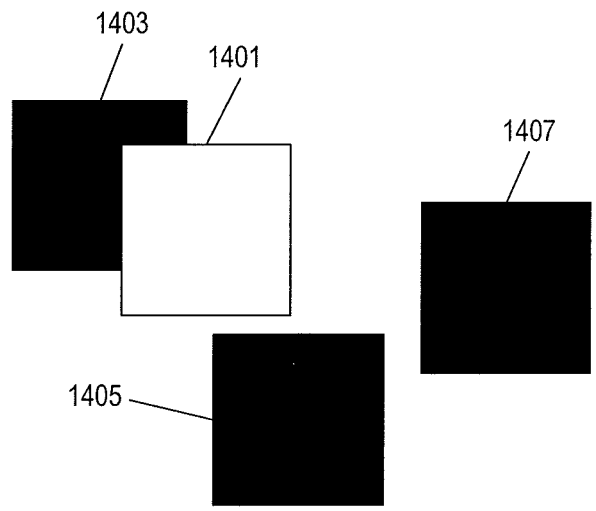
Figure 14C:
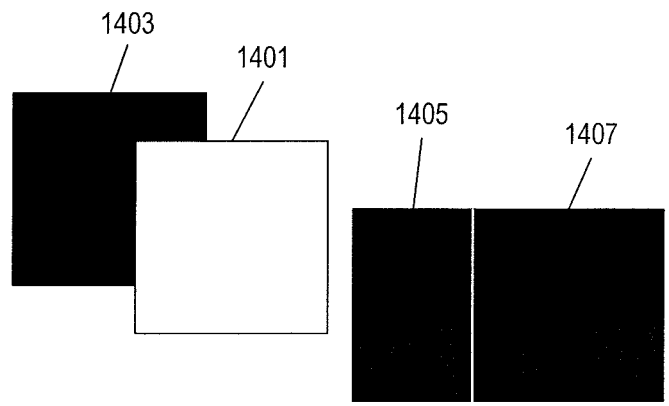

In some embodiments, the system determines that some tiles are moveable, that is, they are candidates for shifting; then, to derive a secondary state, the system shifts one or more of the moveable tiles. In some embodiments, the system determines as moveable the tiles that are overlapping with other tiles or have been previously deemed moveable in a parent state. FIGS. 14A-14C illustrates an example of such determinations according to some embodiments. FIGS. 14A-14C show three states for four tiles: one white tile marked 1401, and three black tiles marked 1403, 1405, and 1407. As shown in FIG. 14A, the white tile overlaps black tiles 1403 and 1405. Black tile 1407 does not overlap any tile. To derive secondary states from the state shown in FIG. 14A, the system may thus determine that the moveable tiles are the white tile and black tiles 1403 and 1405.

In the examples shown in FIGS. 14B-14C, the system derives two states from the state shown in FIG. 14A by shifting moveable black tile 1405 down and right, respectively. In these states, the white tile still overlaps black tile 1403, but it no longer overlaps black tile 1405. Black tiles 1405 and 1407, on the other hand, do not overlap any tiles in the state shown in FIG. 14B, but overlap each other in the state shown in FIG. 14C. Thus, based on the above rule, in the state shown in FIG. 14B, the white tile and the black tile 1403 are moveable, as they overlap. Moreover, in the state shown in FIG. 14B, black tile 1405 is also moveable, as it has been deemed moveable in the parent state shown in FIG. 14A. As shown in FIG. 14C, on the other hand, each of the four tiles is moveable, as each overlap another tile.

Figure 15:
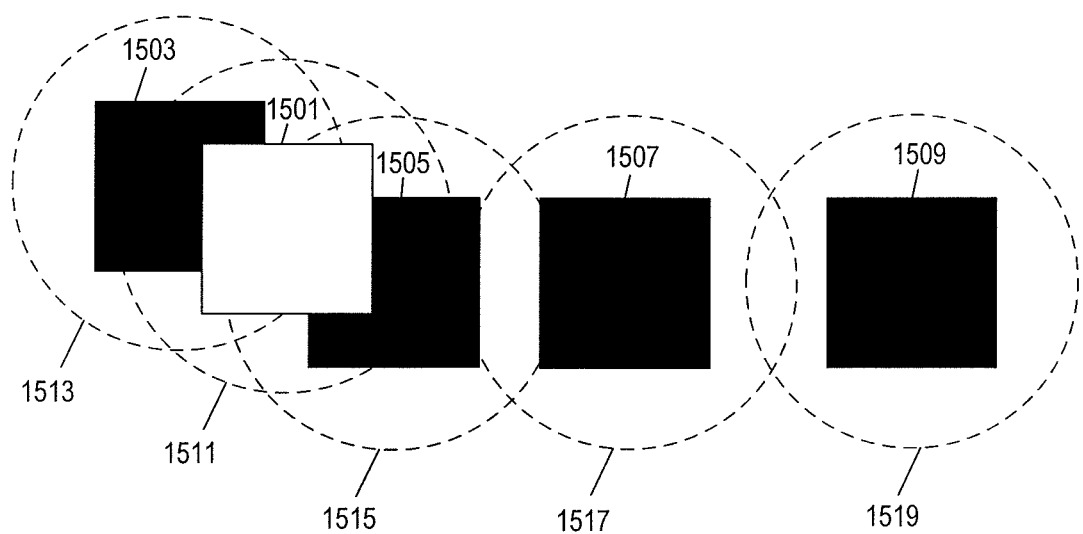
FIG. 15 illustrates a mechanism for determining two classes of moveable tiles according to some embodiments.

In some embodiments, the system may employ a mechanism that determines two classes of moveable tiles. According to this two-class mechanism, a first class of moveable tiles includes those tiles that overlap other tiles and a second class of moveable tiles includes those tiles that are within a specific distance of a tile in the first class. FIG. 15 illustrates this mechanism according to some embodiments. FIG. 15 shows a configuration of five tiles, one gray tile and four black tiles labeled 1501-1509. Moreover, FIG. 15 shows a movability circle 1511-1519 around each tile. The movability circle for each tile shows the area that is within the specific distance mentioned above. In FIG. 15, black tiles 1503 and 1505 overlap the white tile, while black tiles 1507 and 1509 do not overlap any tiles. Thus, in FIG. 15, the gray tile and black tiles 1503 and 1505 are first class moveable. Moreover, in FIG. 15, tile 1507 intersects the movability circle of the first class tile 1505. Thus, tile 1507 is also moveable as it belongs to the second class. Tile 1509, on the other hand, is not moveable, as it neither overlaps any other tiles, nor is within the movability circle of a first class tile.

In some embodiments, the radius of the movability circle for a tile depends on the tile itself. Larger tiles, for example, may have larger movability circles. Moreover, in various embodiments, the radius of the circle extends from the geometrical center of the tile. In some embodiments, for example, the diameter of the circle is a factor, e.g., twice, of the largest dimension of the tile. In such a case, a rectangular 200 by 100 pixel tile will have a movability circle with a radius of 200 pixels (and thus diameter of 400 pixels), and a center that is at the center of the rectangle.

In some embodiments, the system starts from a parent state and moves the moveable tiles one at a time to derive each secondary state. In some embodiments, each move is a shift in one of the four directions up, down, left, and right.

Referring now to FIGS. 16A-16D, in some embodiments, the system may move groups of tiles together. In some embodiments, the system moves a group of tiles together by moving them in one step, by the same amount, and in the same direction. In some embodiments, the selected group of tiles is an abutting-group, which consists of two or more tiles that are abutting each other. Two tiles abut each other if all or part of the perimeter of one tile overlaps with all or part of the perimeter of the second tile. In some embodiments, if a tile belongs to such an abutting group, any tile that abuts it also belongs to the same abutting group. Belonging to the abutting group is thus a transitive property that is transferred from a first tile to a second tile, if the two tiles share at least one portion of their sides.

Figure 16A:
FIGS. 16A-16D illustrate examples of grouped tiles according to an embodiment.
Figure 16B:
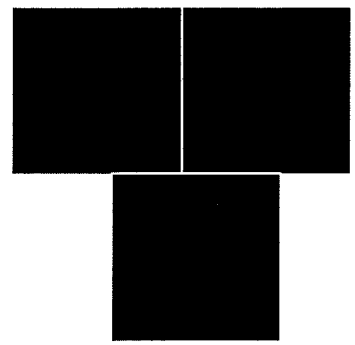
Figure 16C:
Figure 16D:

FIGS. 16A-16D illustrate four examples of grouped tiles according to an embodiment. In FIG. 16A, two tiles are abutting side by side and thus belong to the same abutting group. In FIG. 16B, three tiles are shown that belong to the same abutting group, because the upper two share one full side, while the lower tile abuts with each of the two other tiles along half of its upper side. In FIG. 16C, six tiles belong to the same abutting group, because every one of those six tiles abuts another tile in the abutting group along all or a portion of one of its sides. Similarly, in FIG. 16D, five tiles belong to the same abutting group, because every one of those fives tiles abuts another tile in the abutting group along a portion of one of its sides.

Referring now to FIGS. 17A-17E, in some embodiments, instead of shifting one tile at a time, each time the system shifts an abutting group of tiles together to derive a secondary state. FIGS. 17A-17E illustrate examples of such group shifts according to one embodiment. These figures illustrate five states of five tiles 1701-1705. In FIG. 17A, tile 1701 overlaps tile 1702. Moreover, tile 1702 abuts tile 1703, and tile 1703 abuts both tiles 1704 and 1705. Thus, the four tiles 1702-1705 belong to the same abutting group of tiles.

As shown in FIGS. 17B-17E, the system generates four secondary states by shifting the abutting group together. In particular, to generate these states, the system has shifted tiles 1702-1705 together in the directions of up (FIG. 17B), left (FIG. 17C), down (FIG. 17D), and right (FIG. 17E), respectively. The states depicted in FIGS. 17B-17D still include some overlapping tiles, but the state depicted in FIG. 17E does not include any overlapping tiles. Thus, the system is able to reach a non-overlapping state via one group shift from the state depicted in FIG. 17A to the state depicted in FIG. 17E and one stage. If the system performs shifts of single tiles only, it will require multiple shifts of different tiles and significantly larger number of stages to reach from the state depicted in FIG. 17A to the state depicted in FIG. 17E. Under such circumstances, the system may not be able to reach the state depicted in FIG. 17E within the time limit and may thus chose a selected state that is less favorable or has a higher score compared to the state depicted in FIG. 17E.

In some embodiments, the system may utilize more advanced moves to accelerate the search mechanism and shorten the path to a favorable state. In these embodiments, to perform more advanced moves, the system may select a group of multiple tiles and shift them together, even when those tiles do not belong to an abutting group. One such multiple shift may be an n-tuple anywhere in the configuration with respect to each other. In some embodiments, when considering n-tuple shifts, the system chooses different or sometimes all groups of n tiles and shifts them together.

In a 2-tuple shift, for example, the system may choose a subset (or all) of tiles and then shift every possible pair of tiles in that subset to create new states: the system may choose a subset of four tiles labeled a, b, c, and d for 2-tuple shifts, and then choose, in six different stages, pairs ab, ac, ad, bc, bd, and cd as 2-tuples and shift the chosen 2-tuple together. Alternatively, for the same subset of tiles, the possible 3-tuples are abc, abd, acd, and bcd. Selecting a larger n for the n-tuple shift may affect the search time in opposite ways. On the one hand, a larger n may reduce the number of stages needed to reach a selected state. On the other hand, a larger n may increase the number of secondary states that are generated in each stage because a larger number of n-tuples need to be considered. In some embodiments, the system decreases the number of n-tuples by only considering a subset of all possible n-tuples in which the n tiles in the n-tuples are within a movability circle of each other.

Figure 18A:
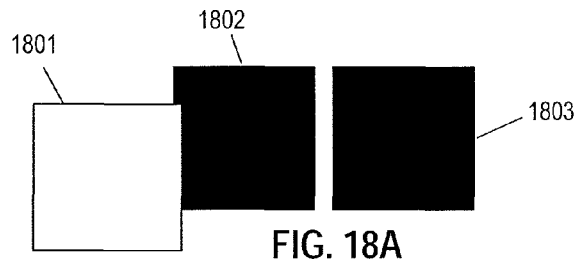
FIGS. 18A-18G illustrate examples n-tuple shifts according to an embodiment.
Figure 18B:
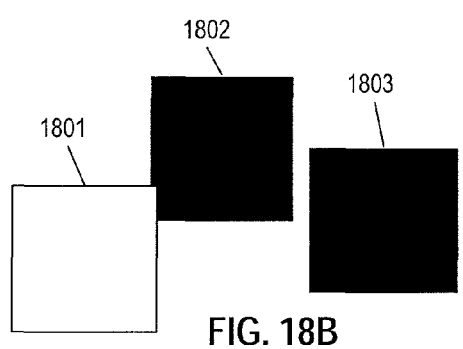
Figure 18C:
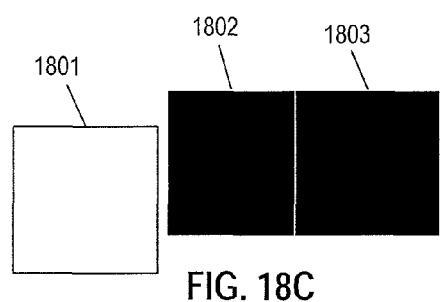
Figure 18D:
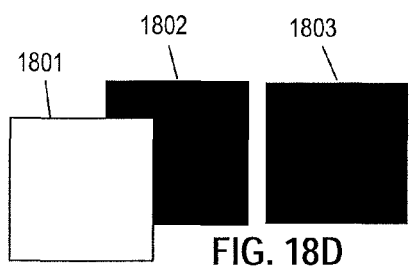
Figure 18E:
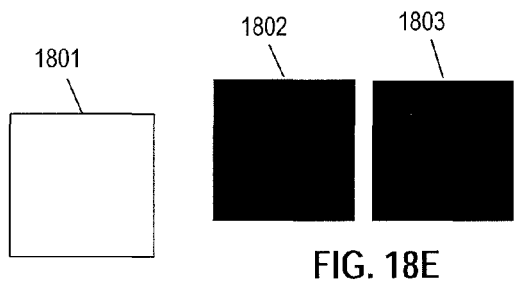
Figure 18F:
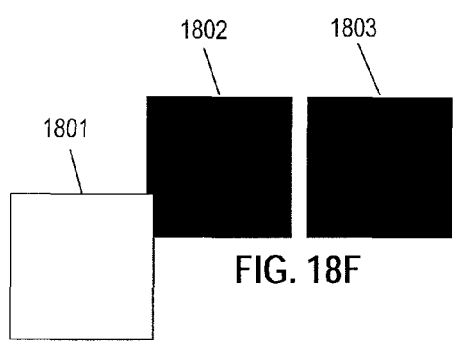
Figure 18G:
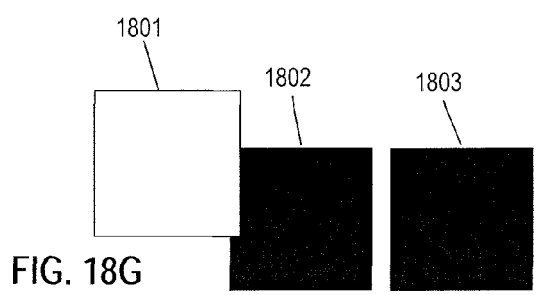

FIGS. 18A-18G illustrate examples of such n-tuple shifts according to one embodiment, showing seven states of three tiles 1801 to 1803. FIG. 18A depicts a parent state, and the states shown in FIGS. 18B-18G are each derived from the state shown in FIG. 18A as secondary states. As shown in FIG. 18A, tile 1801 overlaps tile 1802. Under single tile movement mechanisms, the system may determine tile 1802 to be moveable. The system may thus generate the states shown in FIGS. 18B-18C by shifting tile 1802 up and left, respectively. As shown in FIG. 18B, the 1802 overlaps tile 1801 in an amount that is less than their overlap in the state shown in FIG. 18A. In the state shown in FIG. 18C, on the other hand, tile 1802 does not overlap tile 1801, but overlaps tile 1803 by an amount that is more than the overlap in the state shown in FIG. 18B. Thus, in some embodiments in which the score is calculated based on the intersection heuristics, the state shown in FIG. 18B has a lower score than the state shown in FIG. 18C. To generate the next set of secondary states, therefore, the system may start from the state shown in FIG. 18B. The state shown in FIG. 18B however, may be less favorable compared to the state shown in FIG. 18C, because it lacks the original alignment between tiles 1802 and 1803 in the parent state shown in FIG. 18A.

In the above situation, the system may use an n-tuple shift mechanism to move the tiles, as shown in FIGS. 18D-18G. In particular, the system has chosen tiles 1802 and 1803 as an n-tuple and shifts them together and by the same amount. In particular, to generate the states shown in FIGS. 18D-18G from the state shown in FIG. 18A, the system has shifted tiles 1802 and 1803 together in the directions of right (FIG. 18D), left (FIG. 18B), up (FIG. 18F) and down (FIG. 18G), respectively. Using this shift mechanism enables the system to derive the state shown in FIG. 18E in this first set of secondary states. The state shown in FIG. 18E may be more desirable than the state shown in FIG. 18B, as it does not include any overlaps, and also maintains the alignment between tiles 1802 and 1803.

In some embodiments, the system improves the search mechanism by generating "composite" states that are combinations of different parts of previous secondary states. The system may, for example, record beneficial moves of different tiles and then combine those moves to generate the composite state. A composite state, thus, may be a hybrid of two or more secondary states.

Figure 19A:
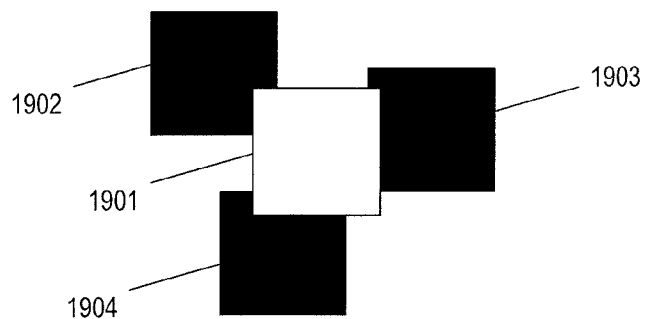
FIGS. 19A-19E illustrate an example of deriving a composite state according to an embodiment.
Figure 19B:
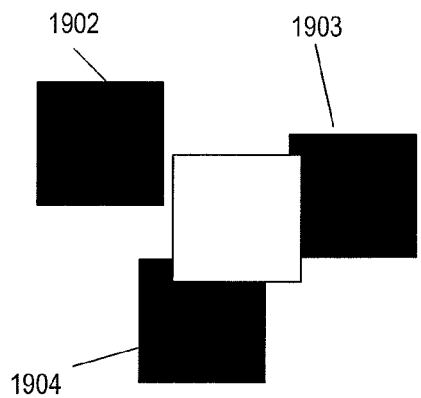
Figure 19C:
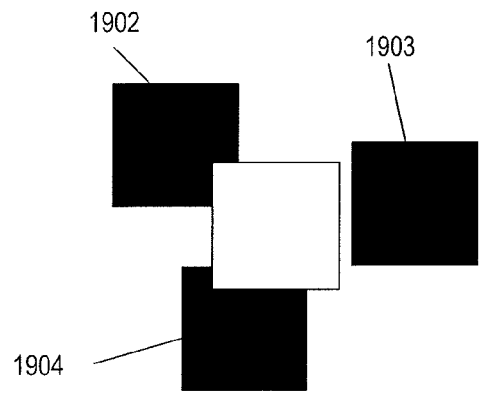
Figure 19D:
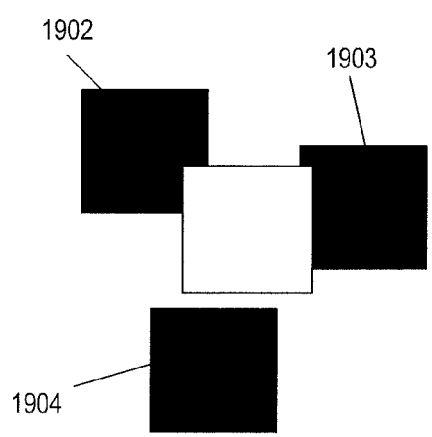
Figure 19E:
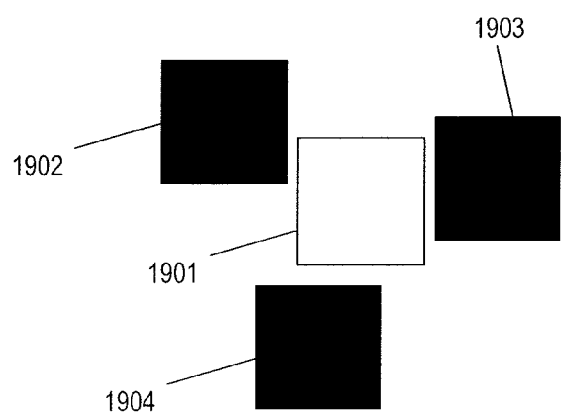

FIGS. 19A-19E illustrate one example of deriving such a composite state according to one embodiment, showing five states of four tiles 1901 to 1904. The state shown in FIG. 19A is a parent state, and the states shown in FIGS. 19B-19D are each derived from the state shown in FIG. 19A as secondary states. Further, the state shown in FIG. 19E is a secondary state that is derived from the states shown in FIGS. 19B-19B as a composite state.

In parent state shown in FIG. 19A, the central tile 1901 overlaps each of the three peripheral tiles 1902 to 1904. The system generates the states shown in FIGS. 19B-19D by respectively shifting tile 1902 to the right, shifting tile 1903 to the left, and shifting tile 1904 down. Due to each of the shifts, the score of the state is lower than the parent state, because the shift removes the overlap between the shifted tile and the central tile, tile 1901. The system may record the shifted tile and mark the shift as beneficial, as the shift lowers the overall score. The system may then generate the state shown in FIG. 19E as a composite state by combining those beneficial shifts. In particular, in the composite state shown FIG. 19E and as compared to the initial state shown in FIG. 19A, tile 1902 has shifted left, in the manner seen in the state shown in FIG. 19B; tile 1903 has shifted right, in the manner seen in the state shown in FIG. 19C; and tile 1904 has shifted down, in the manner seen in the state shown in FIG. 19D. In the state shown in FIG. 19E, therefore, none of the tiles overlap. Using a composite state mechanism may thus enable the system to reach a favorable state with no overlap within two generations. Generating simple secondary states by performing single tile shifts from any one of the secondary states shown in FIGS. 18B-18D may require more generations of secondary states and thus a longer path to arrive at the state shown in FIG. 18E.

In some embodiments, the system improves the search mechanism by generating "evolutionary" states that are random combination of previous secondary states. The system may, for example, select two more states from among secondary states and combine different tiles from each to generate an evolutionary state.

Figure 20A:
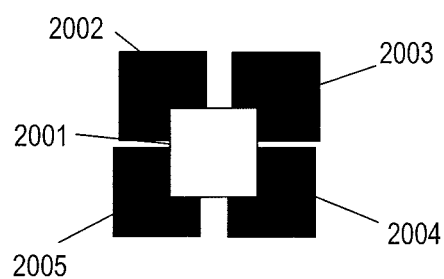
FIGS. 20A-20B illustrate an initial state in an example of generating an evolutionary state according to an embodiment.
Figure 20B:
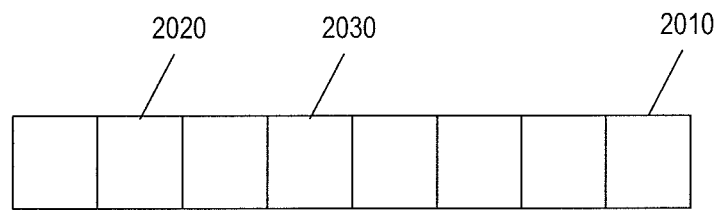
Figure 21A:
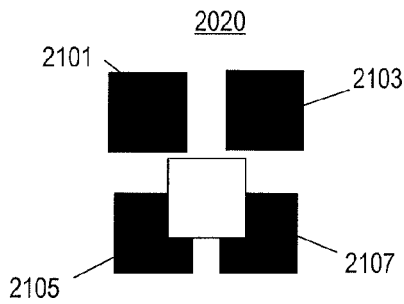
FIGS. 21A-21G illustrate an initial state in an example of generating an evolutionary state according to an embodiment.
Figure 21B:
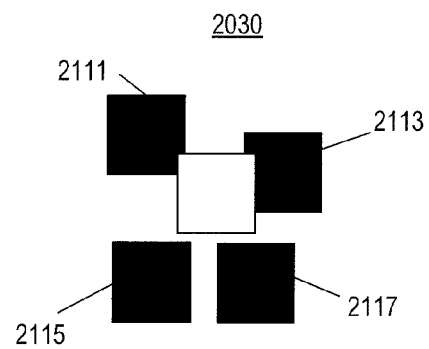

FIGS. 20A-20B and 21A-21F illustrate one example of generating such an evolutionary state according to an embodiment. These figures illustrate eight states of five tiles 2001 to 2005. The eight states are shown in FIGS. 20A and 21A-21F, among which the state shown in FIG. 20A is a parent state, the states shown in FIGS. 21A-21B are secondary states, and the states shown in FIGS. 21C-21F are evolutionary states generated from the states shown in FIGS. 21A-21B. In the state shown in FIG. 20A, the central tile 2001 overlaps each of the four peripheral tiles 2002 to 2005. In the states shown in FIGS. 21A-21F the tiles are shifted by different amounts from their positions in the state shown in FIG. 21A, and in some of them one or more of the four peripheral tiles does not overlap with the central tile.

FIG. 20A also shows a state list 2010 listing eight states that are generated from the state shown in FIG. 20A. State list 2010 as shown in FIG. 20B, lists those states in increasing order of scores, including states 2020 and 2030. Of these secondary states, FIGS. 21A and 21B show the configurations of states 2020 and 2030. In state 2020, as compared to the parent state shown in FIG. 20A, tile 2101 has shifted up and left, and tile 2103 has shifted up and right, such that none of them do not overlap the central tile. In state 2030, as compared to the parent state shown in FIG. 20A, tile 2111 has shifted up and left but still overlaps the central tile, tile 2113 has shifted down and right and still overlaps the central tile, and tiles 2117 and 2115 have shifted down and right in a way that they do not overlap the central tile, in these states, the position of the central tile is the same as that shown in FIG. 20A.

Figure 21C:
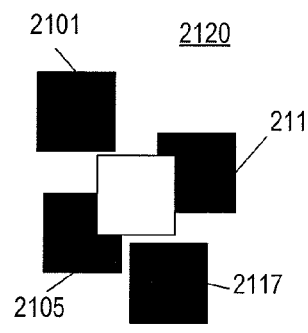
Figure 21D:
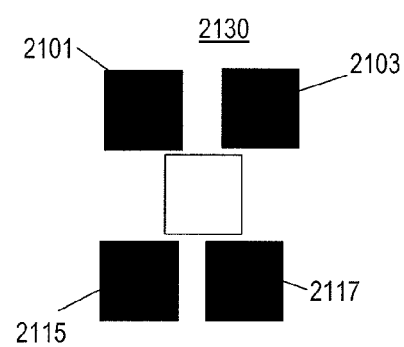
Figure 21E:
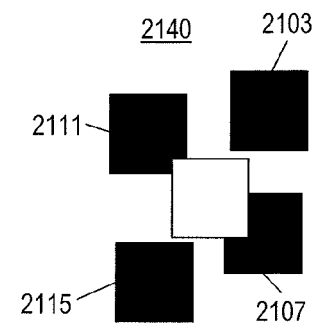
Figure 21F:
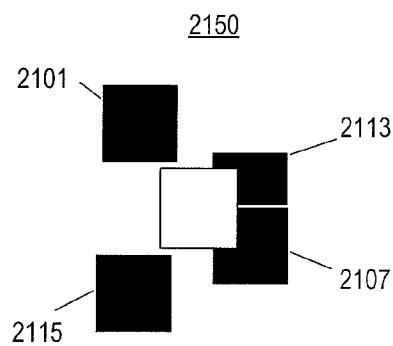
Figure 21G:
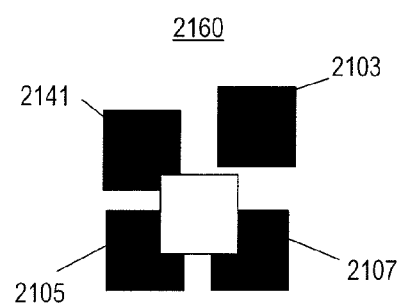

To generate the evolutionary states shown in FIGS. 21C-21F, the system has chosen states 2150 and 2160 from among the secondary states. The system has then generated states shown in FIGS. 21C, 21D, 21E, 21F, and 21G by randomly combining positions of some of the tiles from state 2020 with the positions of the remaining tiles from state 2030. For example, in state 2120, as shown in FIG. 21C, the system has chosen the positions of tiles 2101 and 2105 from state 2020, and the positions of tiles 2113 and 2117 from state 2030. In state 2130, as shown in FIG. 21D, on the other hand, the system has chosen the positions of tile 2101 and 2103 from state 2020, and the positions of tiles 2117 and 2115 from state 2030. As another example, in state 2160, as shown in FIG. 21G, the system has chosen the position of tile 2111 from state 2030, and the positions of tiles 2103 to 2107 from state 2020. Thus, by generating these evolutionary states, the system is able to generate a favorable state such as 2130, in which no two tiles overlap. By performing single tile shifts the system may require more generations of secondary states to reach state 2130 or may not reach it at all.

In various embodiments, the system chooses two or more states at random to generate evolutionary states. In some embodiments, for the random choice, the system gives a higher weight to the states that are closer to the start of the state list to increase the possibility that they are chosen as parents of an evolutionary state. In some embodiments, the system chooses the parent states as the states closest to the start of the state list.

FIGS. 22A-25C illustrate a reshuffle application, which utilizes the disclosed systems and method in a user interface to reshuffle displayed tiles according to various embodiments. The user interface is a display that shows multiple square or rectangular tiles to a user. Each tile includes one or more words or numbers and presents to the user some information of interest. When utilizing the interface, the user may change the display by selecting a tile and relocating, resizing, or expanding that tile. Each of these actions may cause the selected tile to overlap one or more other tiles. Upon such overlap, the reshuffle application may reshuffle, i.e., shift the tiles to reduce or remove the overlap. The reshuffled state may be a favorable state of the tiles that the system selects and displays according to various embodiments. Each of FIGS. 22A-25C shows a sequence of snapshots of the display, which includes the display after the user's action and after the reshuffle.

Figure 22A:
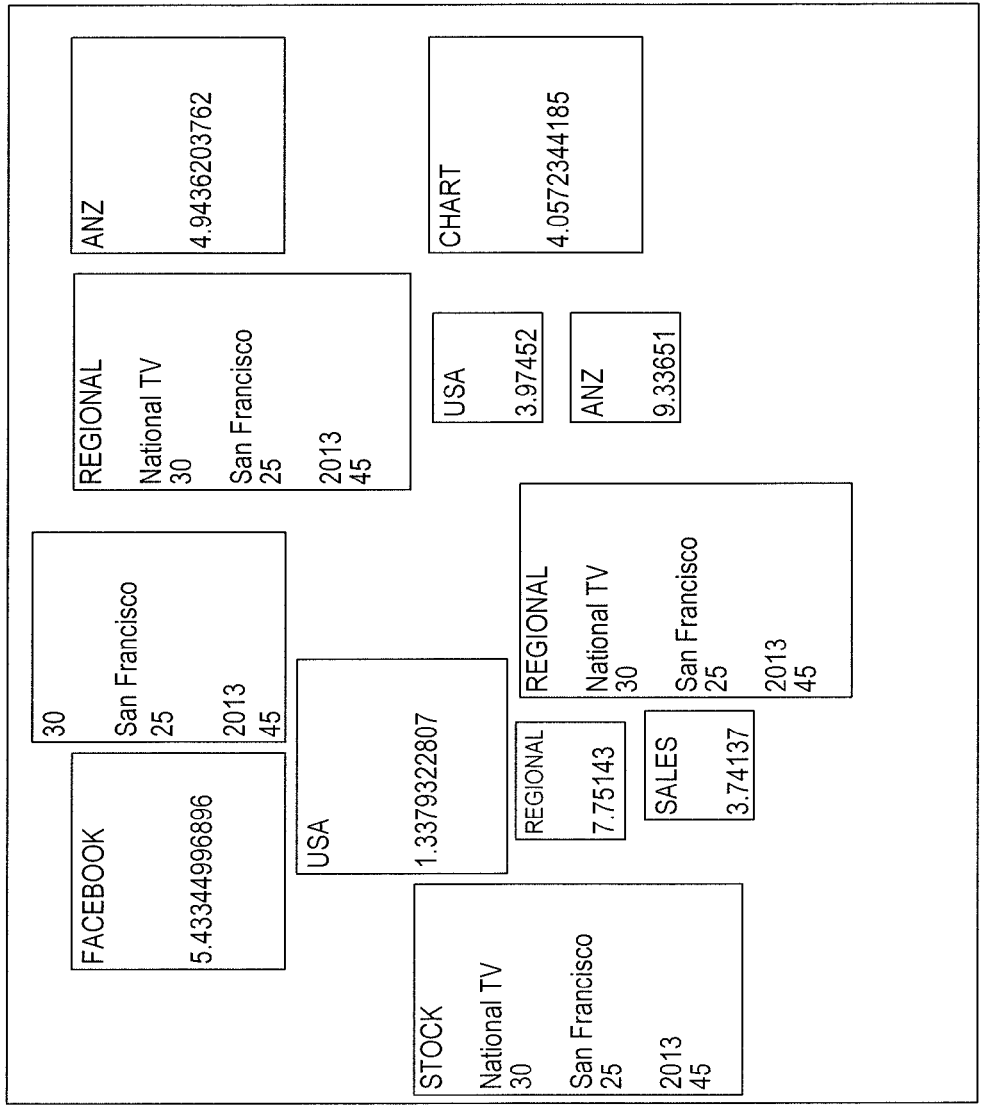
Figure 22B:
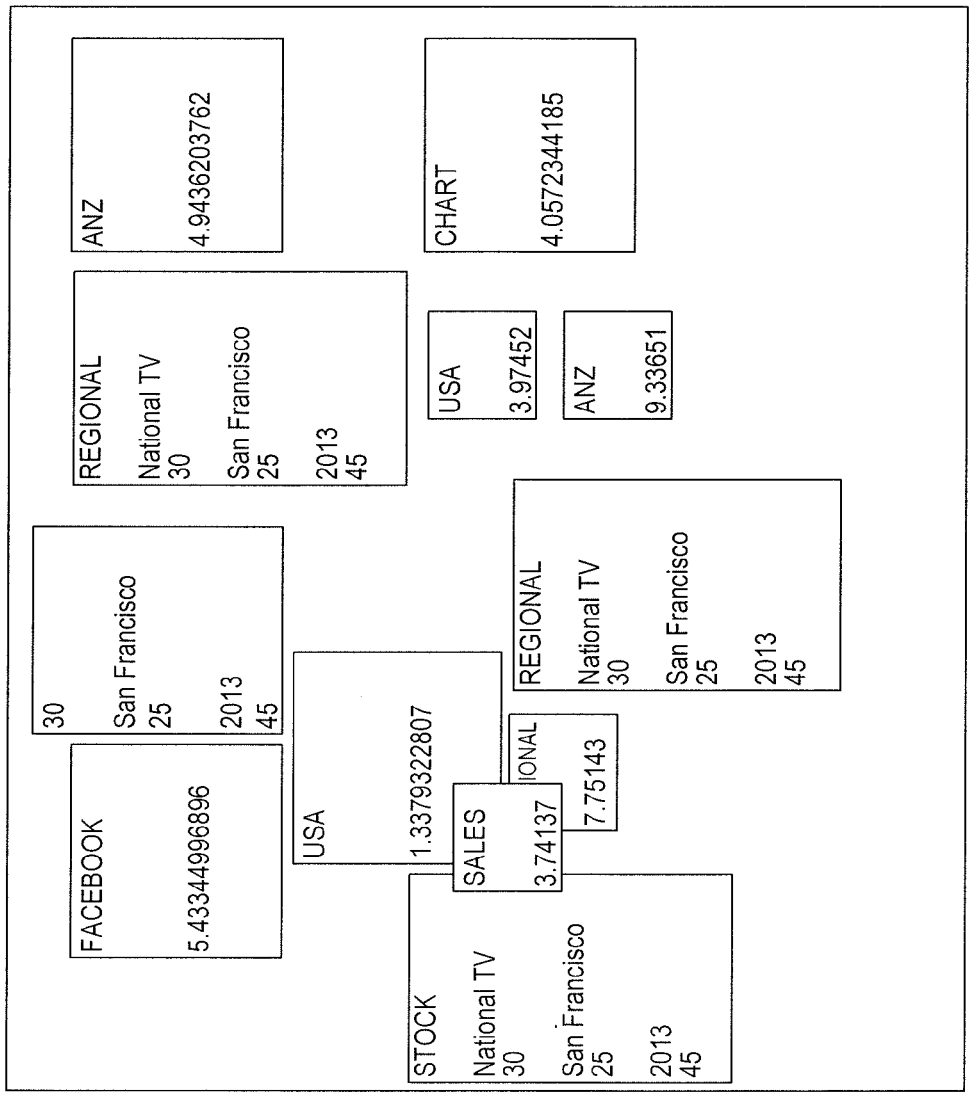
Figure 22C:
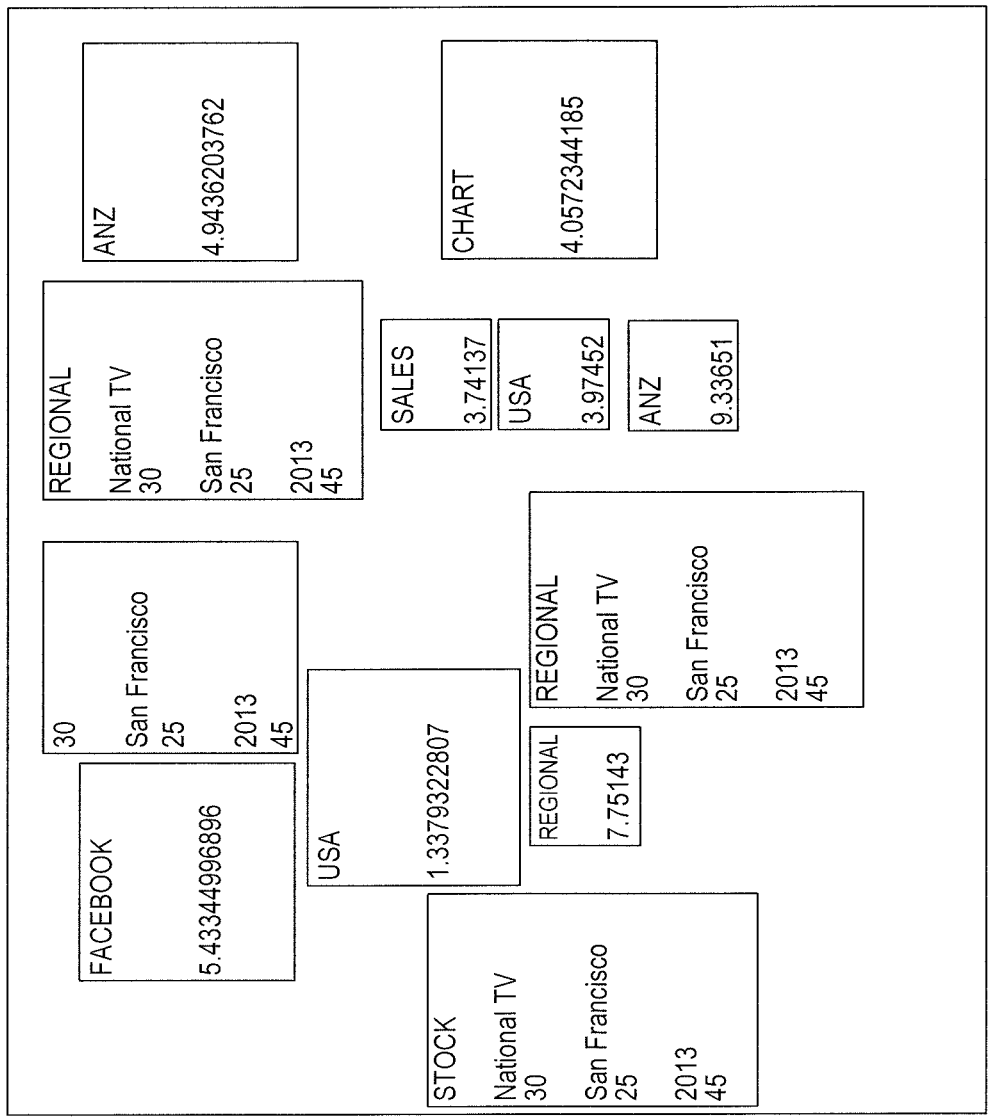
Figure 22D:
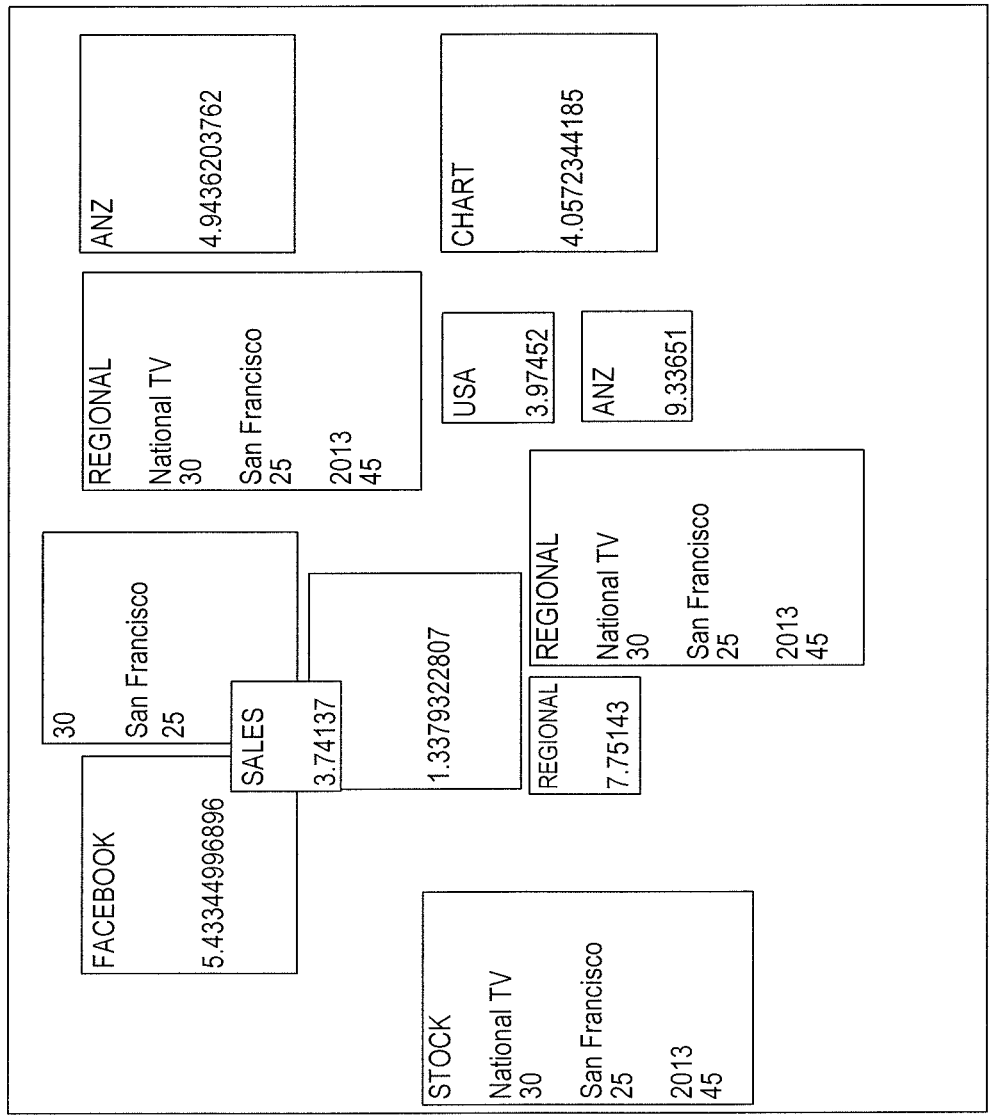
Figure 22E:
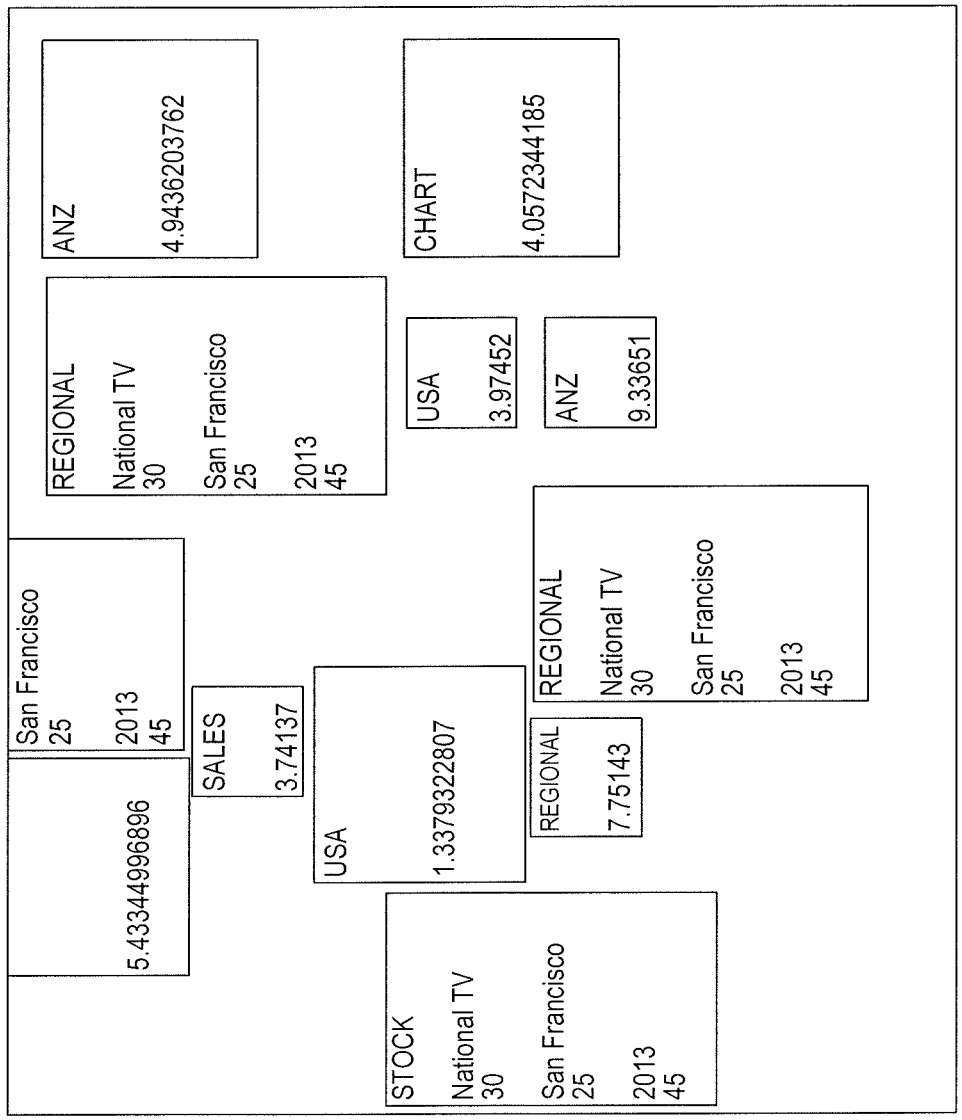
Figure 22F:
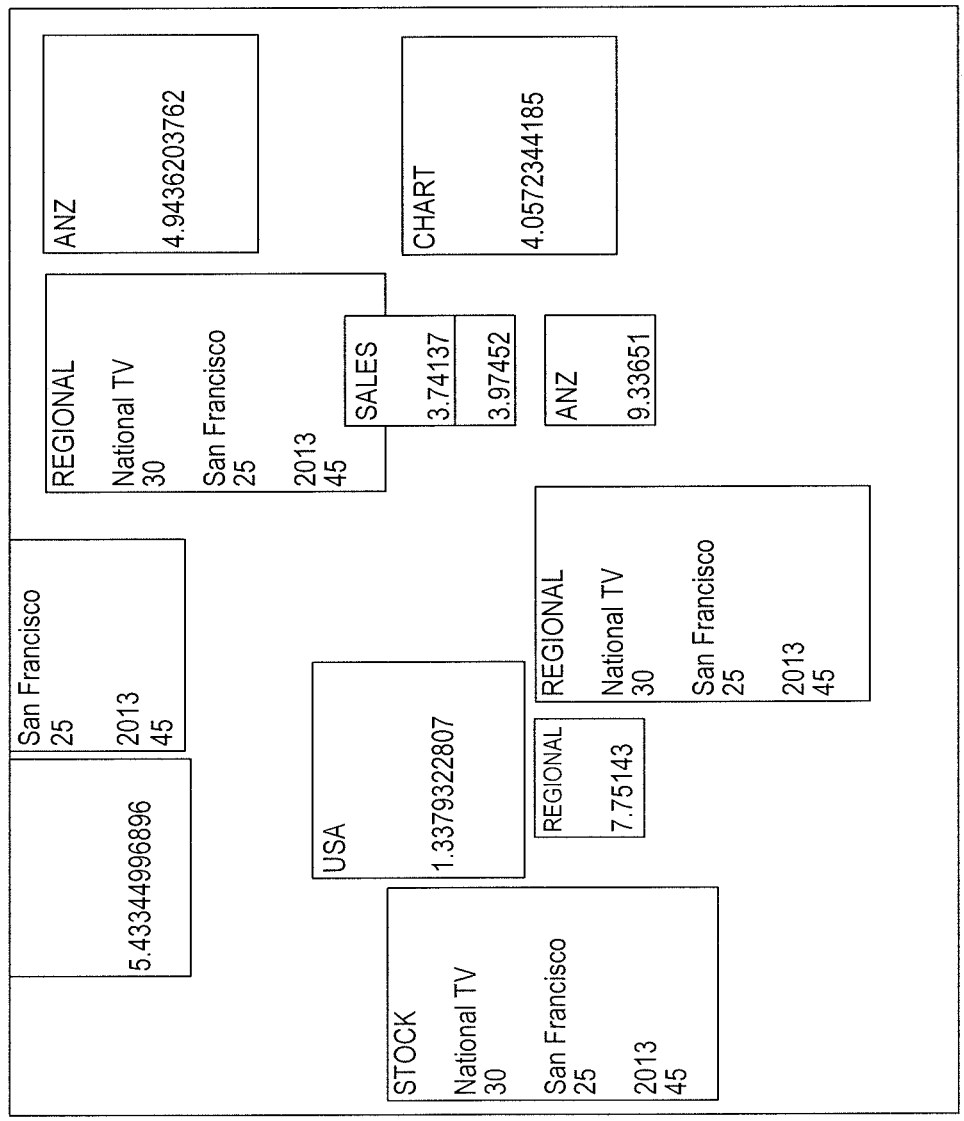
Figure 22G:
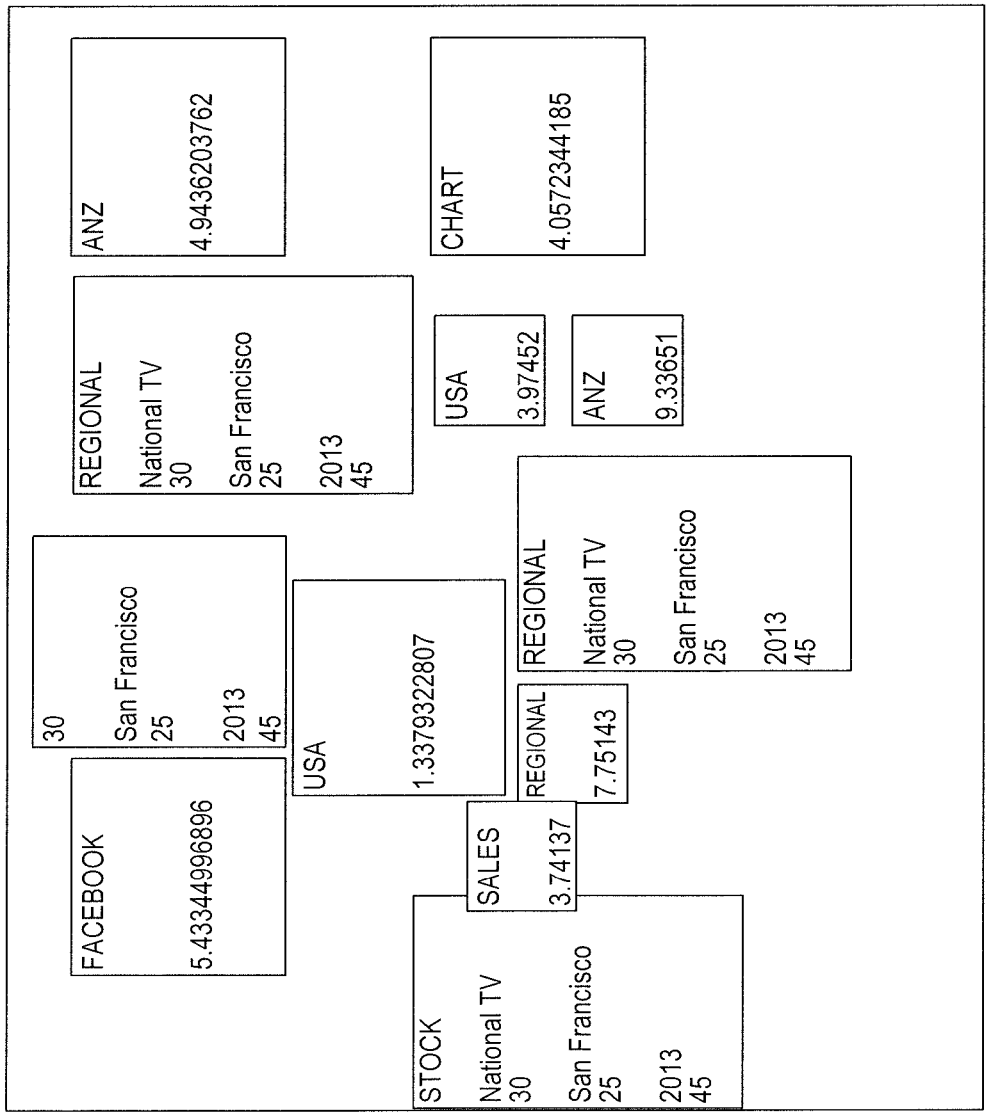

In particular, FIGS. 22A-22G display, in seven snapshots, some basic actions of the reshuffle application. In these snapshots, the user moves the same tile to different locations and, in response to each move, the system shifts the other tiles to reduce or remove the overlaps. Snapshot FIG. 22A shows the initial configuration of the tiles. In snapshot FIG. 22B, the user moves the tile "SALES" to a new location in which it overlaps three other tiles. In snapshot FIG. 22C, the system shifts four tiles to reduce the overlaps. In FIG. 22D, the user moves the "SALES" tile to another location in which it overlaps three tiles. In FIG. 22E, the system shifts five tiles to remove the overlaps. In FIG. 22F, the user moves the "SALES" tile to yet another location in which it overlaps two tiles. In FIG. 22G, the system shifts three tiles to remove the overlaps.

Figure 23A:
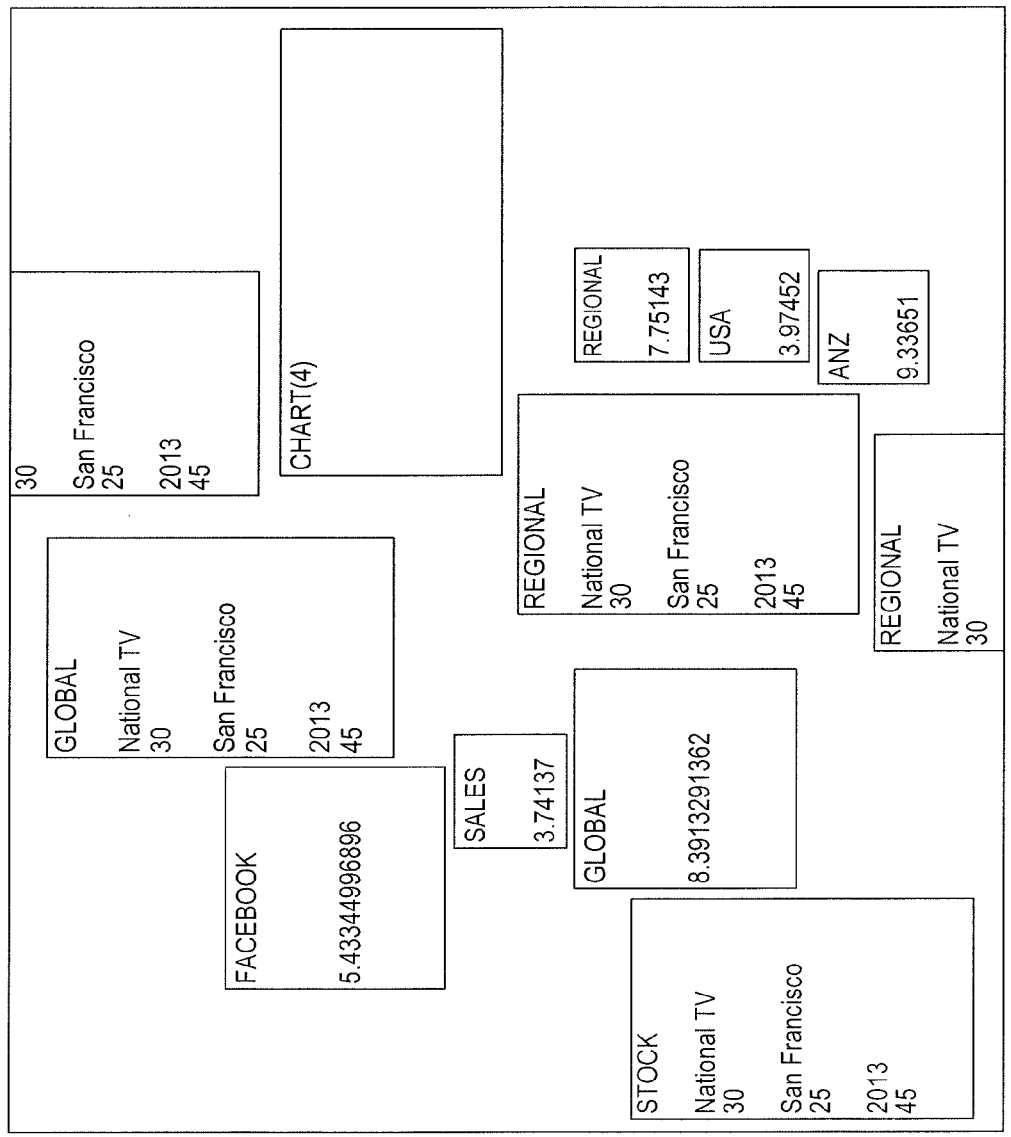
Figure 23B:
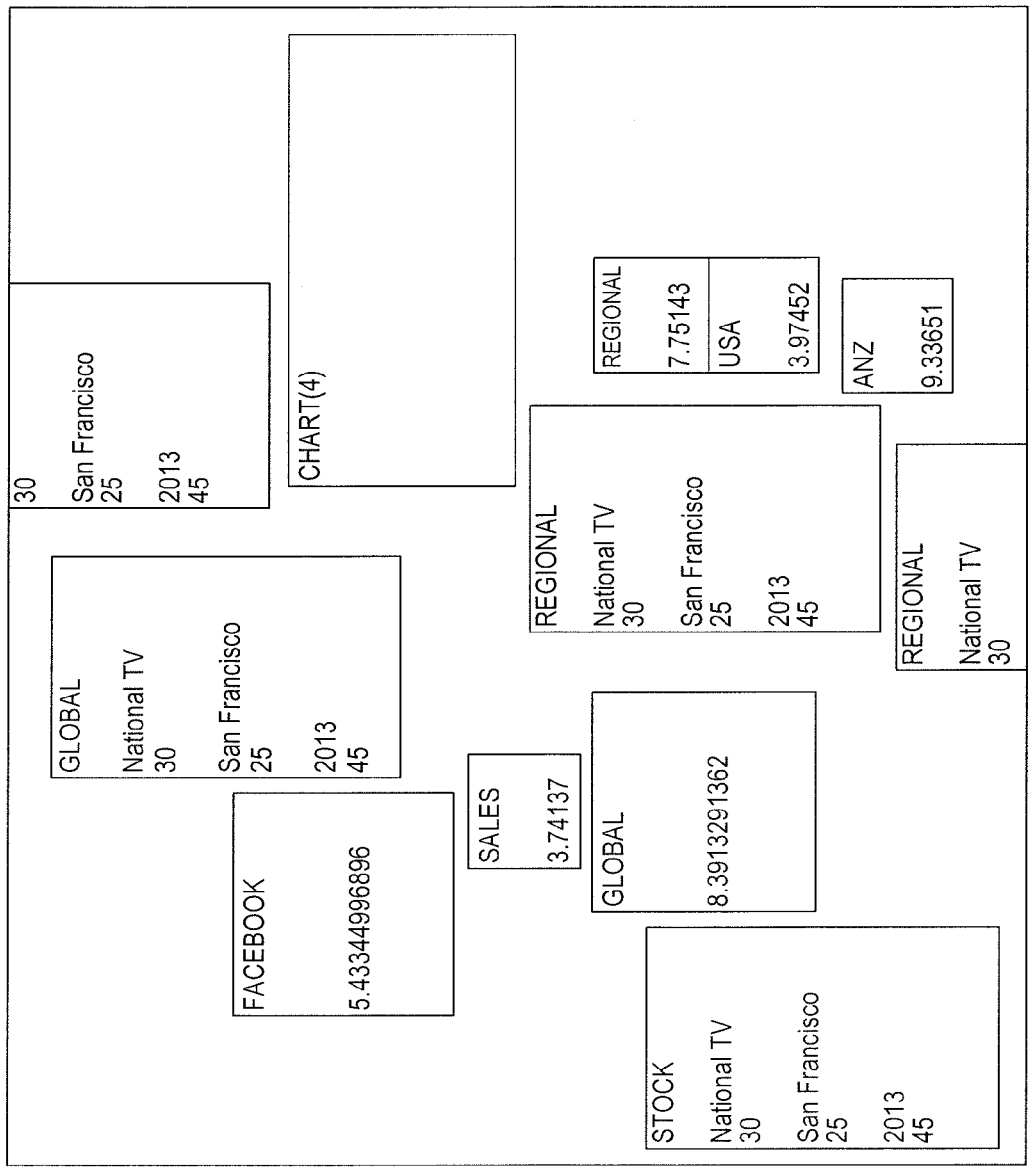
Figure 23C:
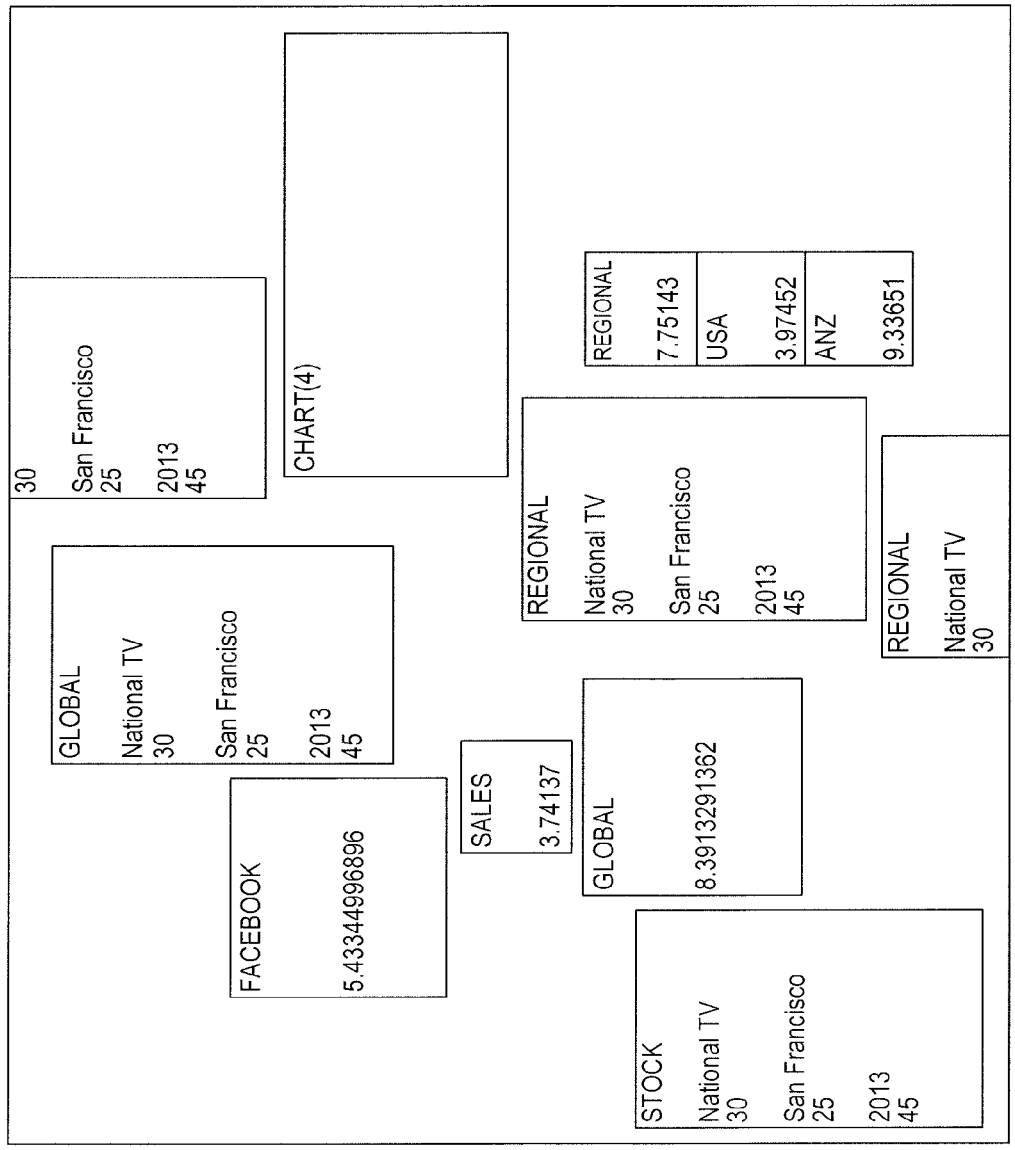
Figure 23D:
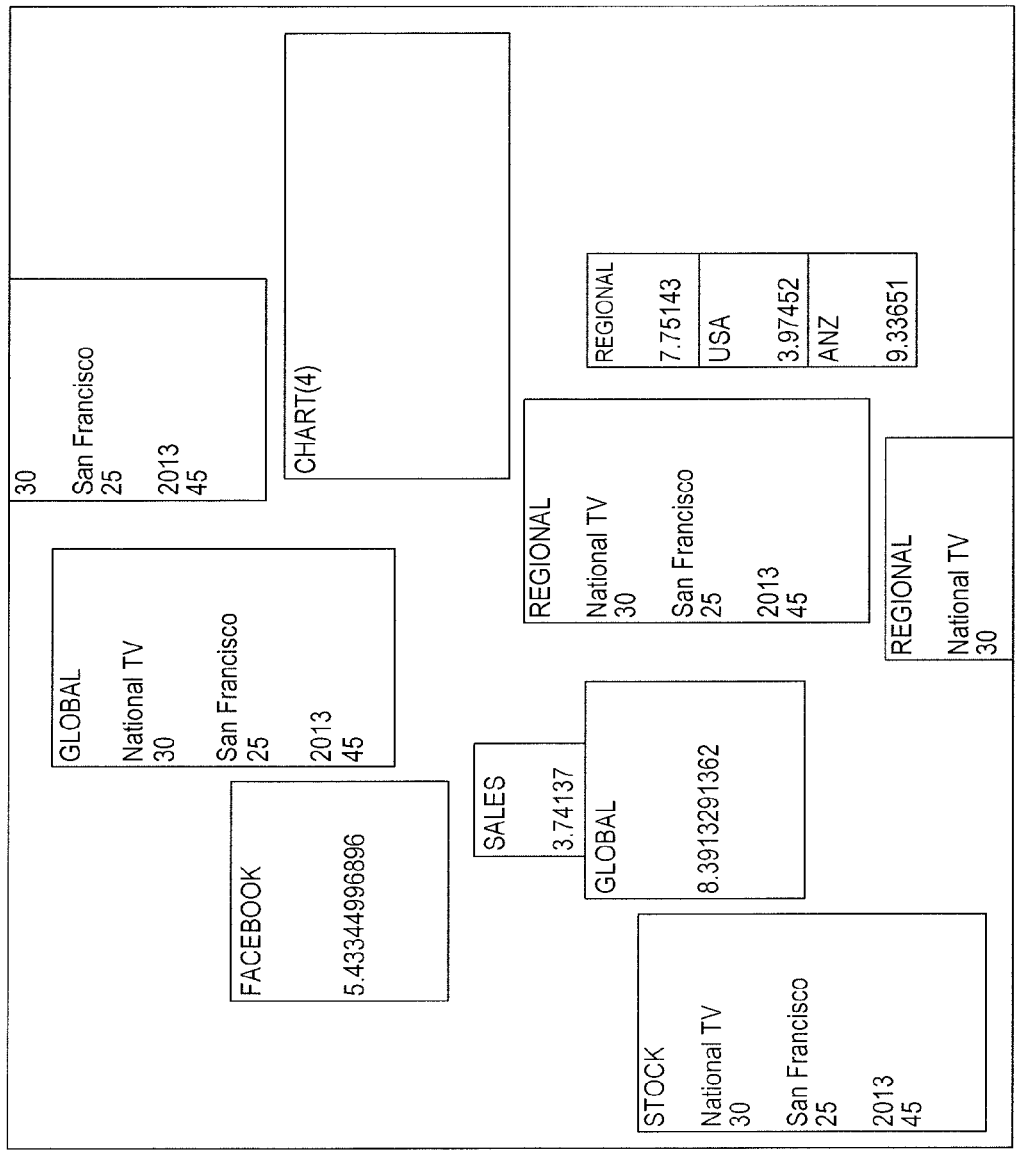
Figure 23E:
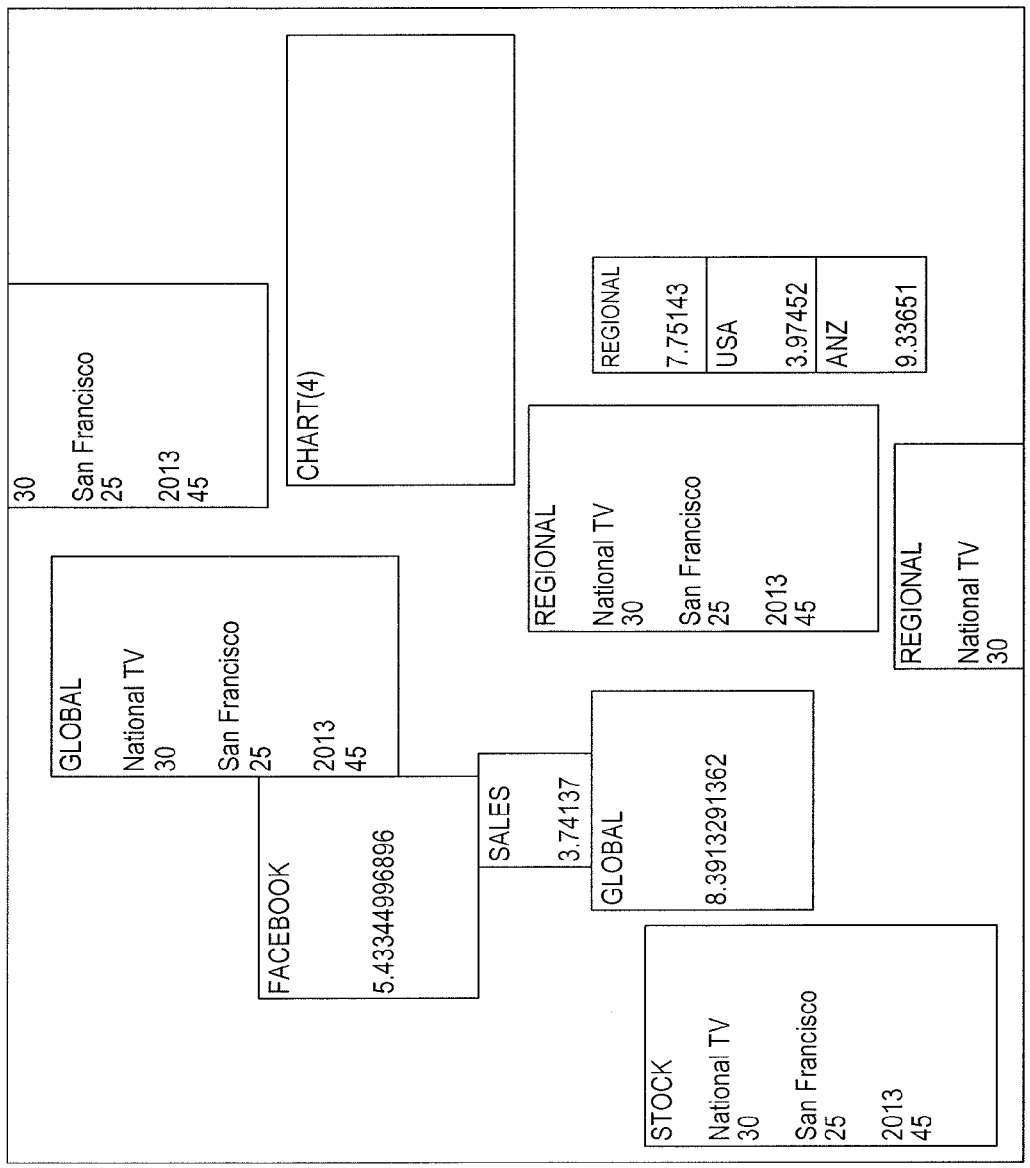
Figure 23F:
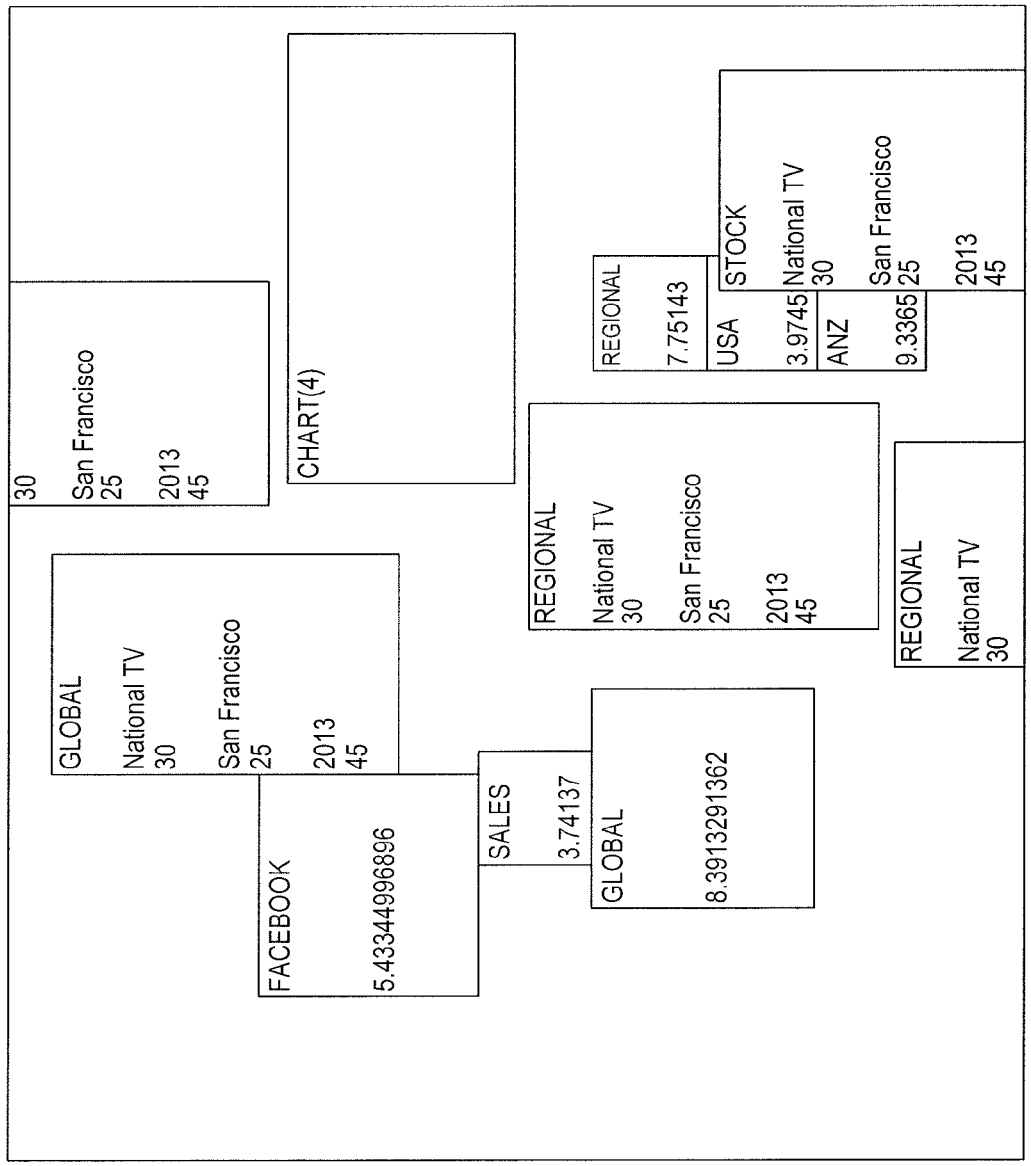
Figure 23G:
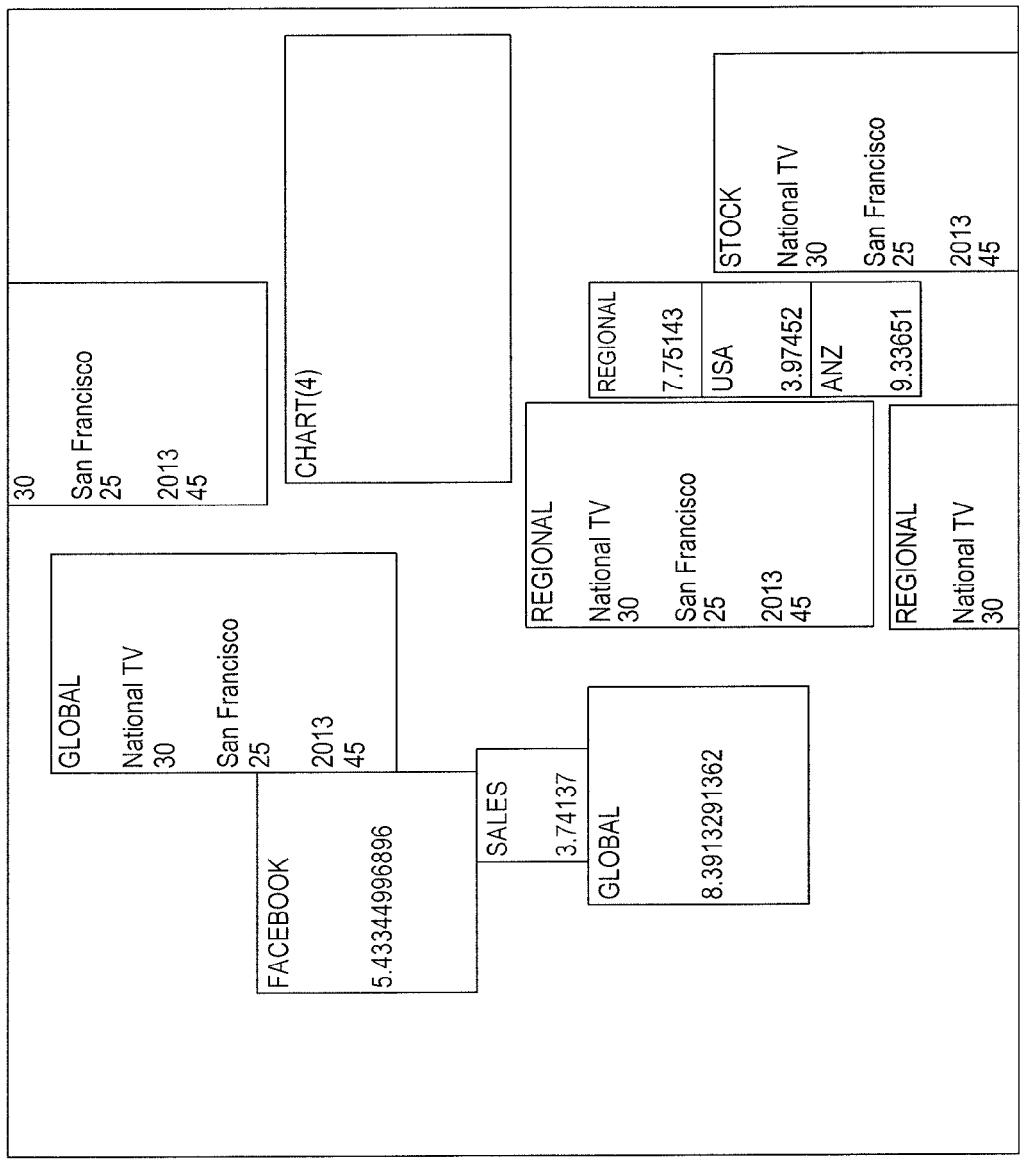
Figure 23H:
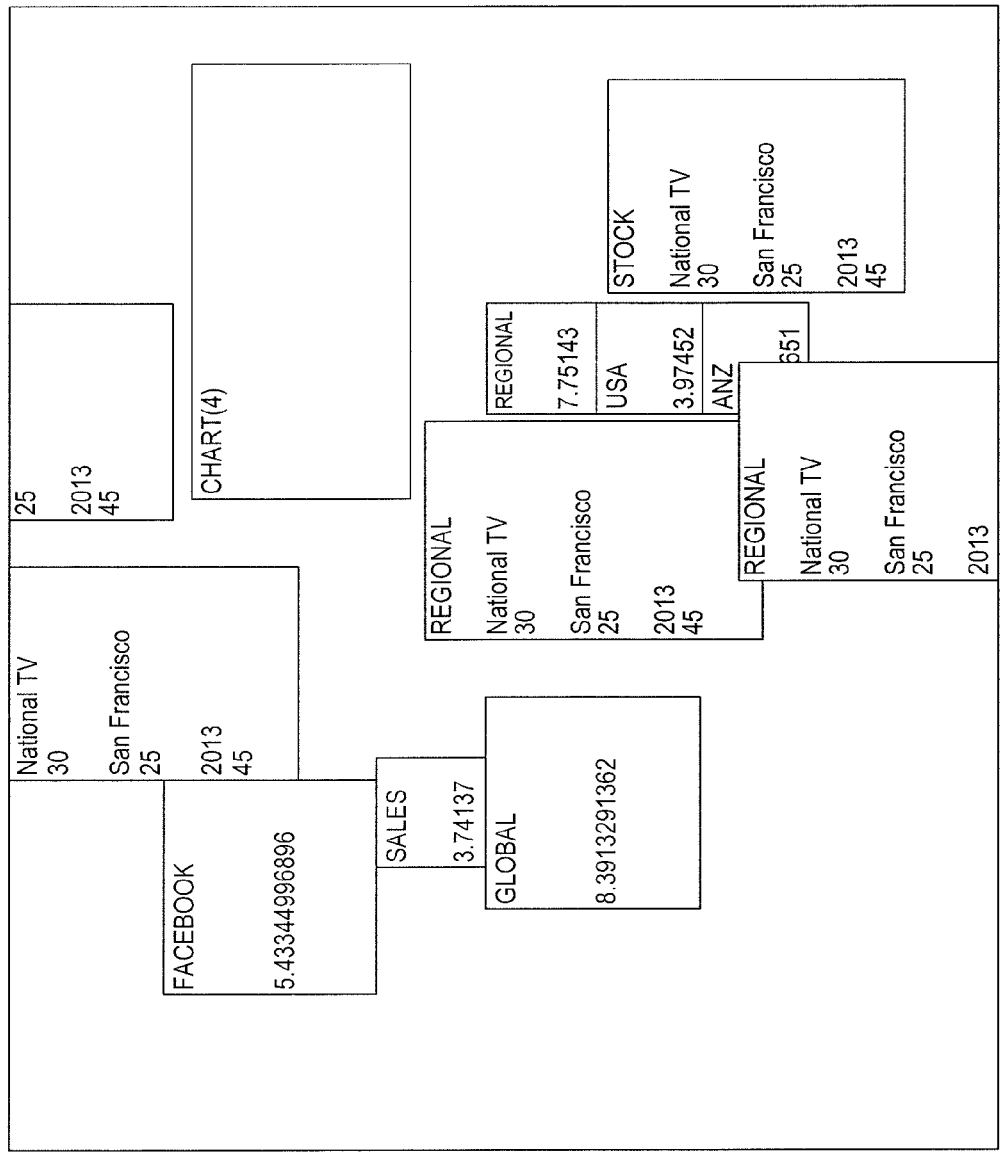
Figure 23I:
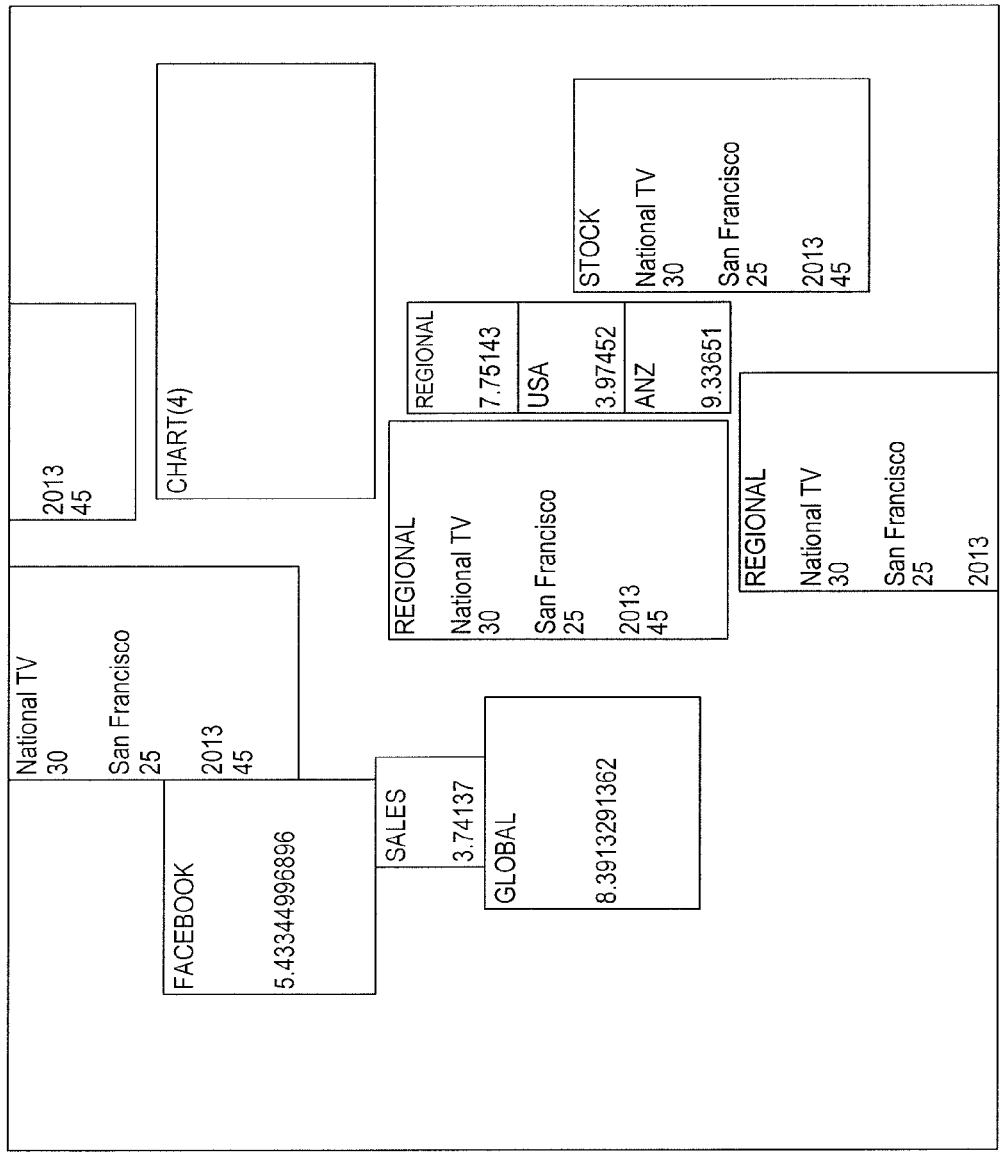
Figure 23J:
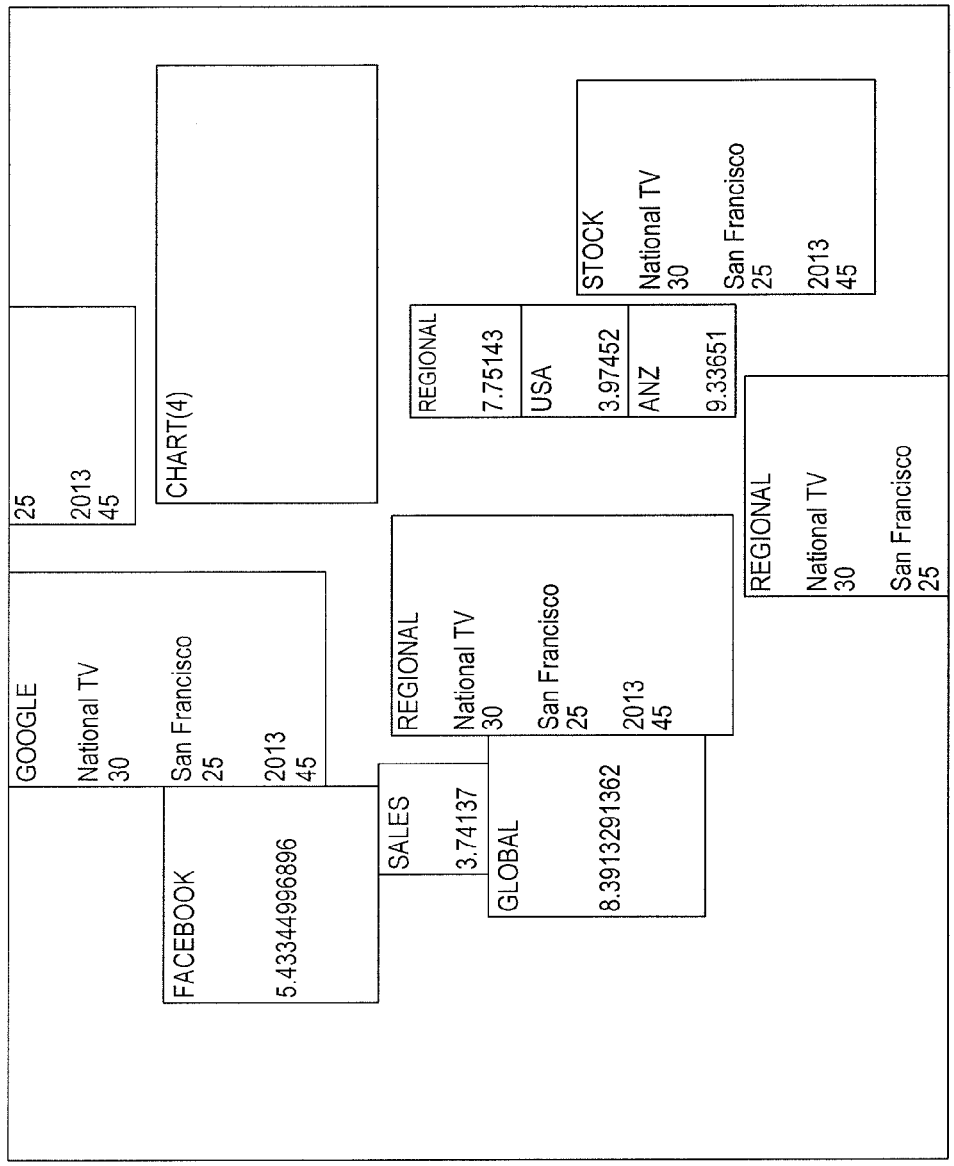
Figure 23K:
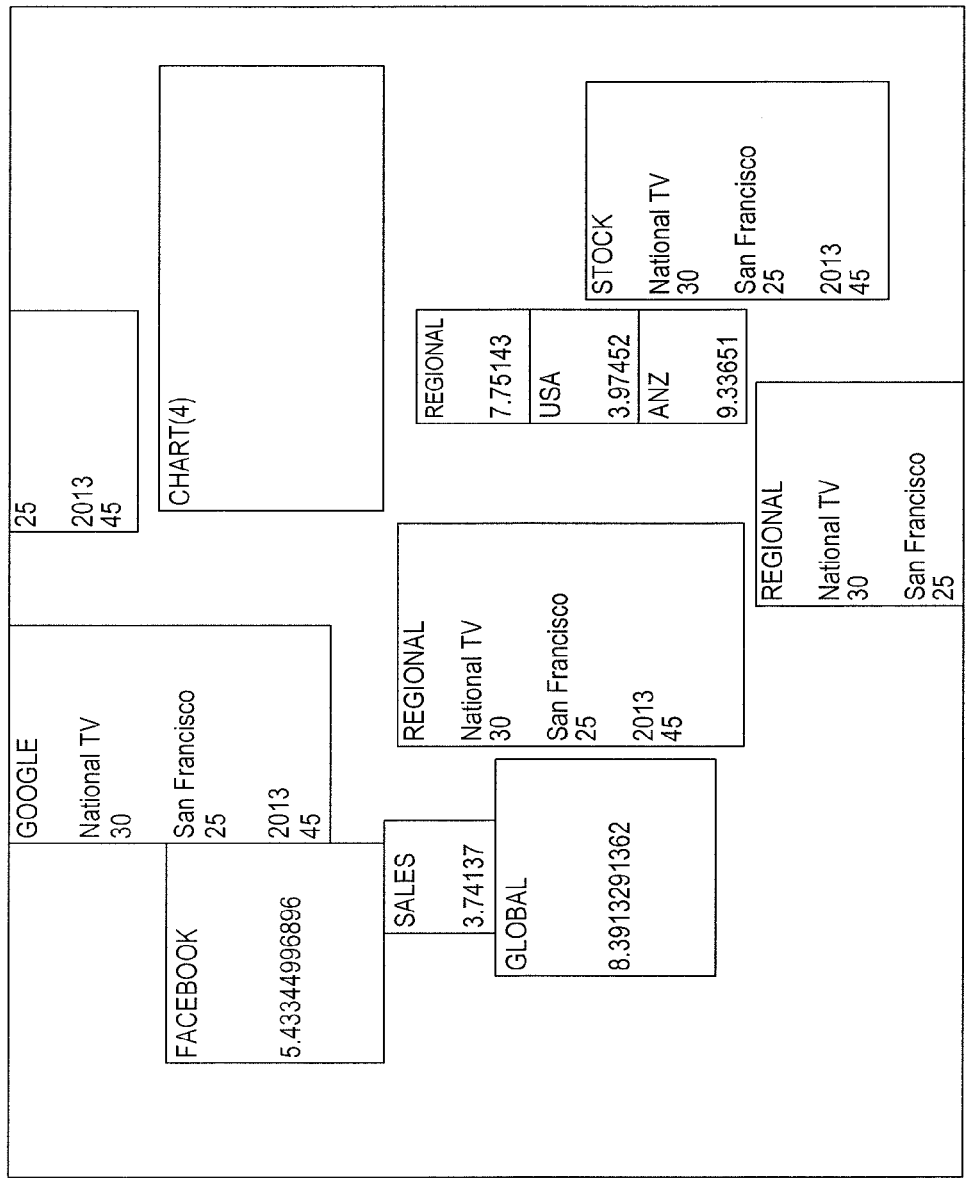
Figure 23L:
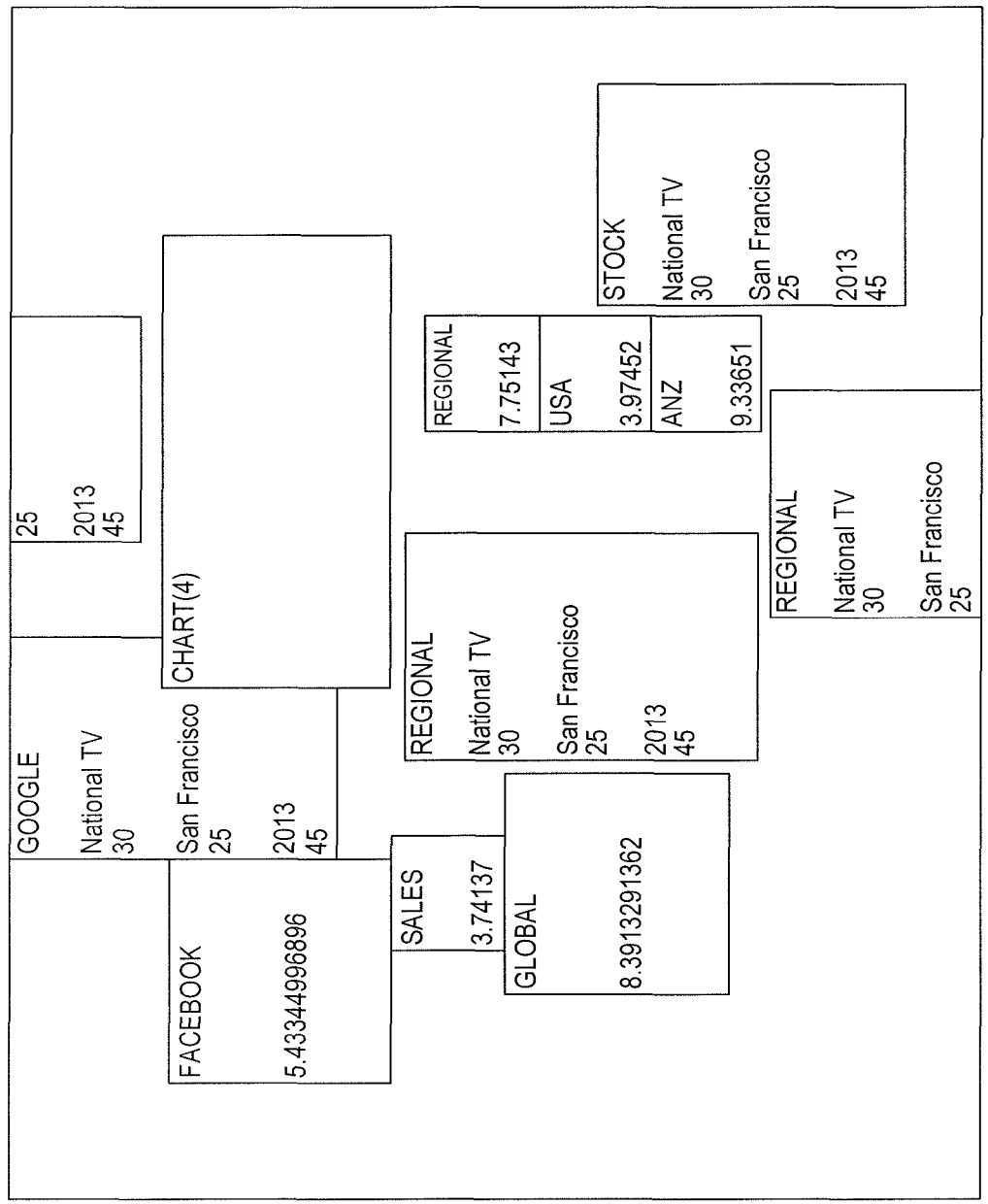
Figure 23M:
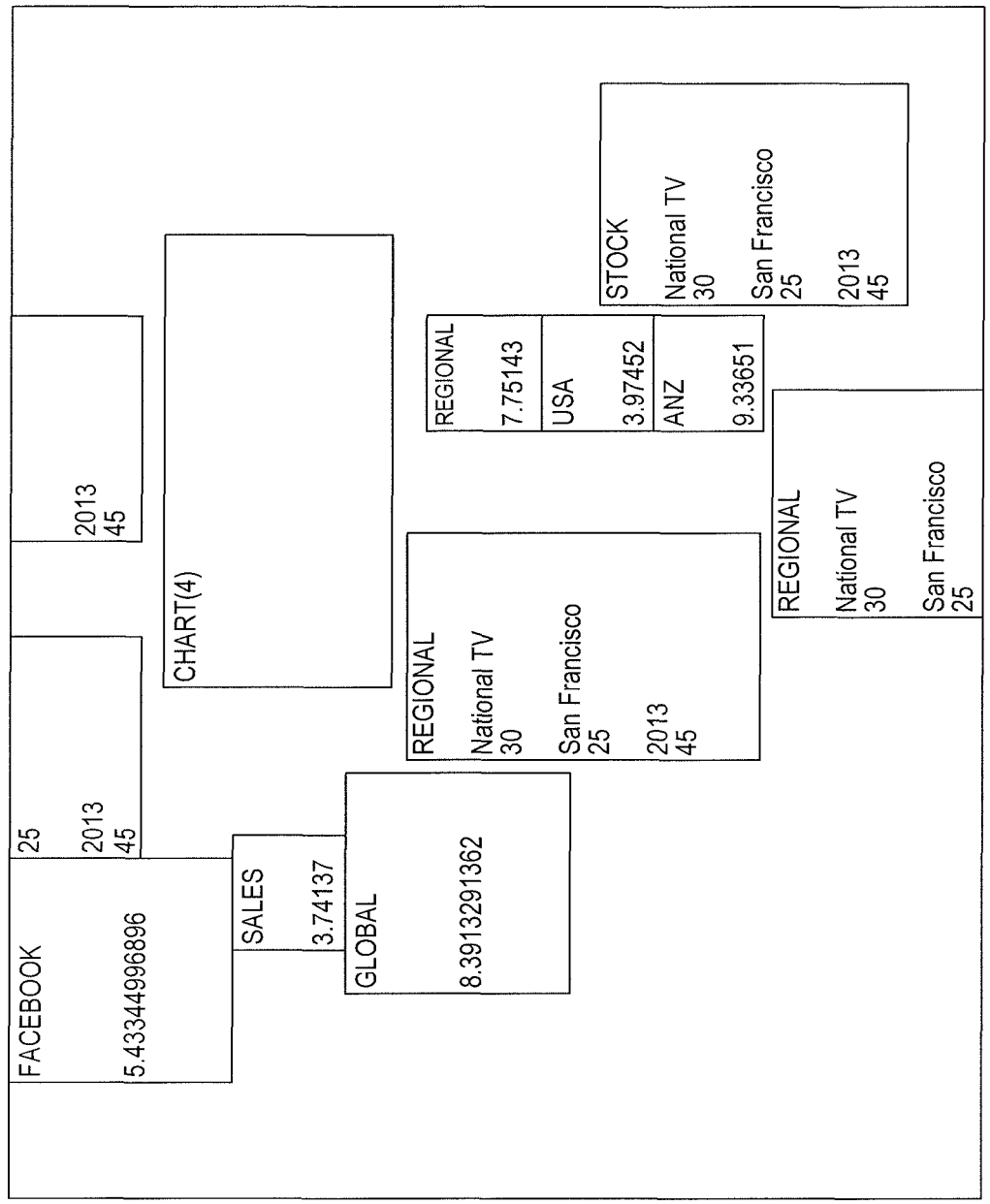
Figure 23N:
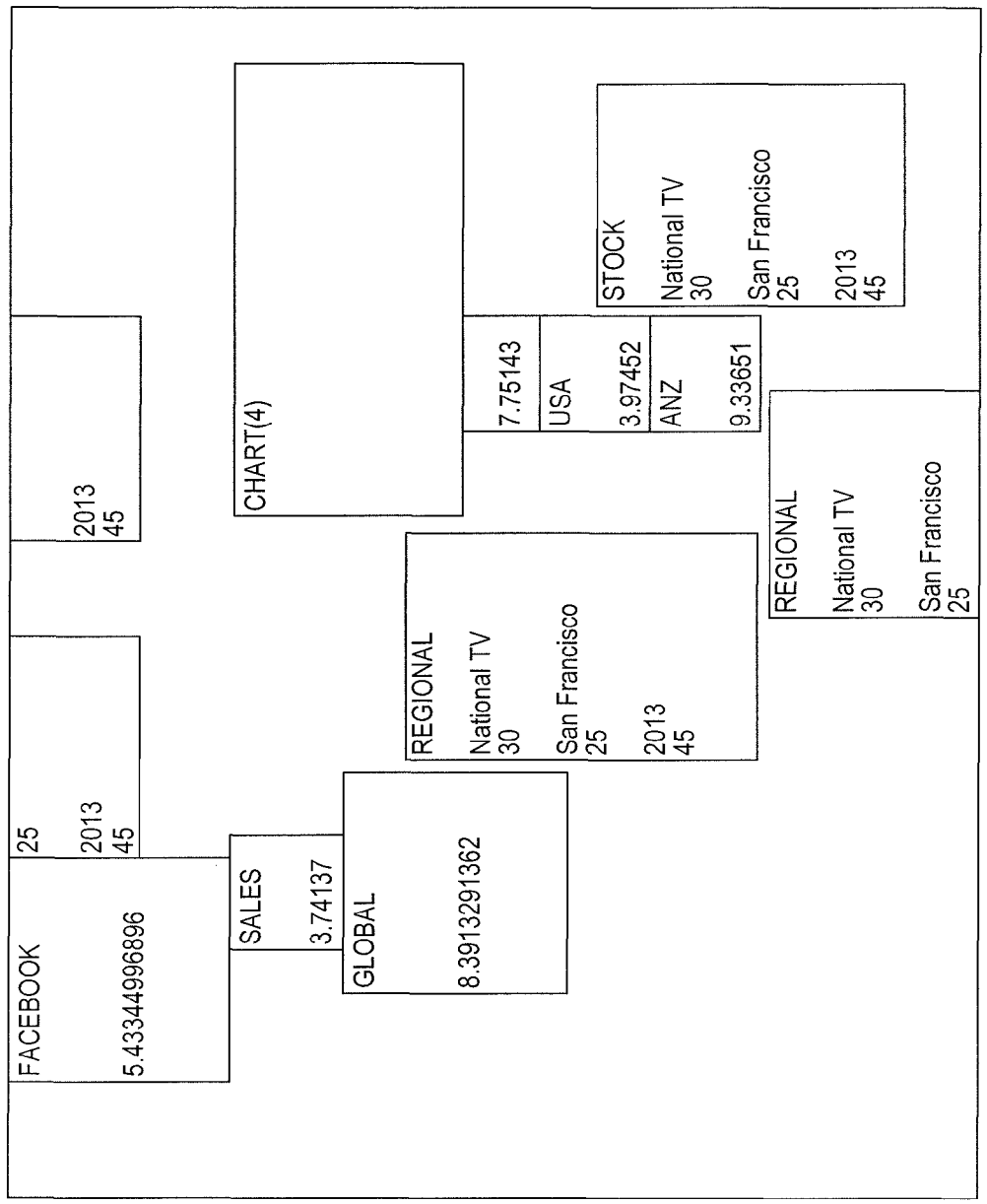
Figure 23O:
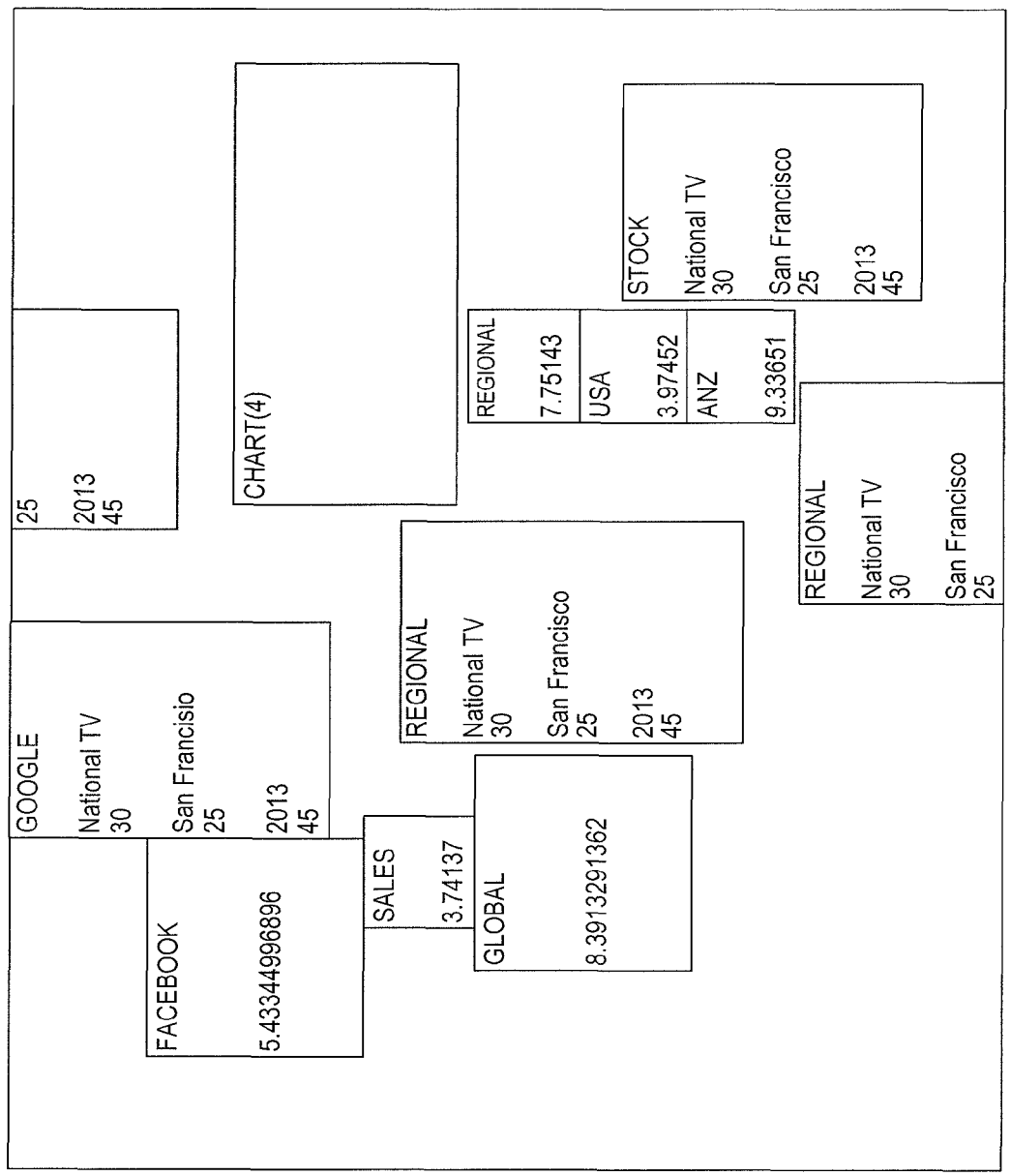

FIGS. 23A-23O show fifteen snapshots in which the reshuffle application utilizes the disclosed group shifting of tiles. Snapshot FIG. 23A shows the initial configuration of the tiles. In FIG. 23B and FIG. 23C, a user slightly moves tiles "USA" and "ANZ" at the lower right of the display, such that together with the square "REGIONAL" tile they form a group of three abutting tiles. Further, in FIG. 23D and FIG. 23E, the user slightly moves tiles "FACEBOOK" and "GLOBAL" at the lower left of the display, such that together with the "SALES" and the rectangular "GLOBAL" tiles they form a second group of four abutting tiles. In FIG. 23F', the user moves the tile "STOCK" from left to right, such that it overlaps the first group of tiles. In FIG. 23G, the system shifts this first group together to the left to remove the overlap and further shifts the rectangular "REGIONAL" the to the left to avoid its overlap with the shifted group. In FIG. 23H, the user moves up the other rectangular "REGIONAL" tile from the bottom, such that it overlaps the first group as well as the first rectangular "REGIONAL" tile. In FIG. 23I, the system shifts the first "REGIONAL" up and also shifts the first group up all together to remove the overlap. Further, the system shifts up two other tiles located above these shifted tiles to avoid overlaps with the shifted tiles. In FIG. 23J, the user moves the first rectangular "REGIONAL" tile to the left such that it overlaps the "GLOBAL" tile in the second group. In FIG. 23K, the system shifts all four tiles in the second group to the left to remove the overlap. In FIG. 23L, the user moves the rectangular blank tile to the left, such that it overlaps the rectangular "GLOBAL" tile in the second group. In FIG. 23M, the system shifts up all four tiles in the second group to remove the overlap. In FIG. 23N, the user moves the blank tile down such that it overlaps the square "REGIONAL" tile in the first group. In FIG. 23O, the system shifts down all three tiles in the first group to remove the overlap.

Figure 24A:
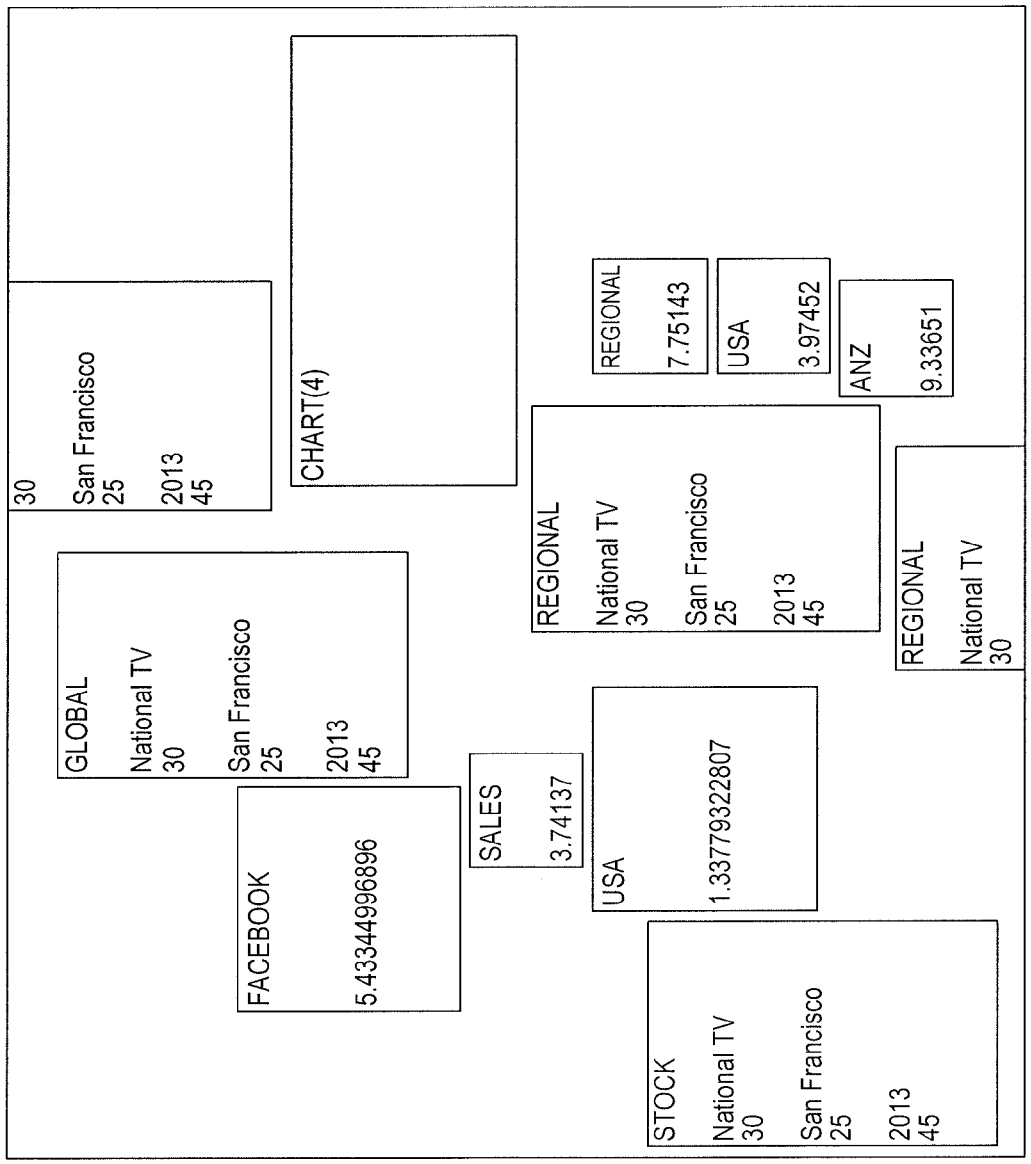
Figure 24B:
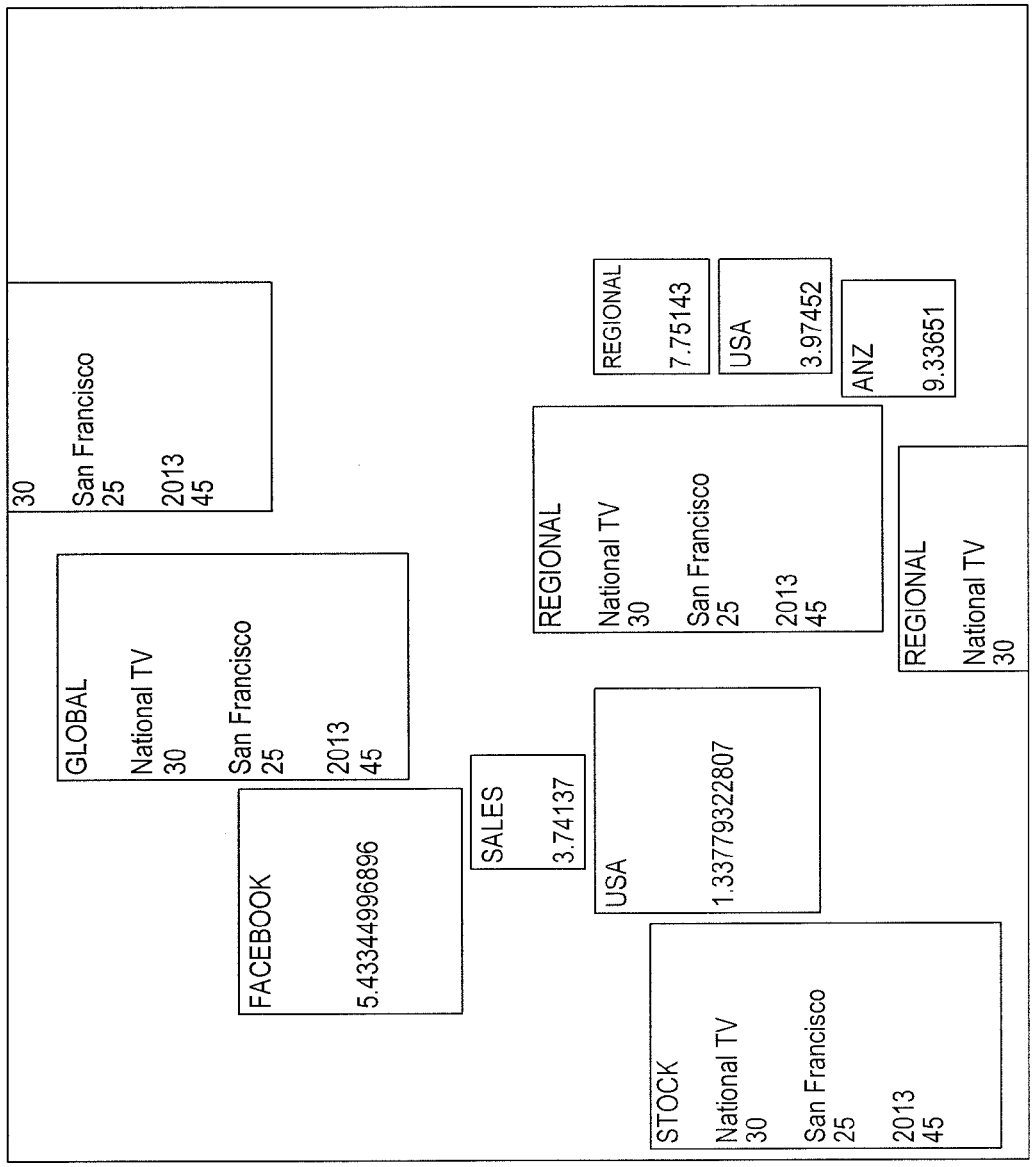
Figure 24C:
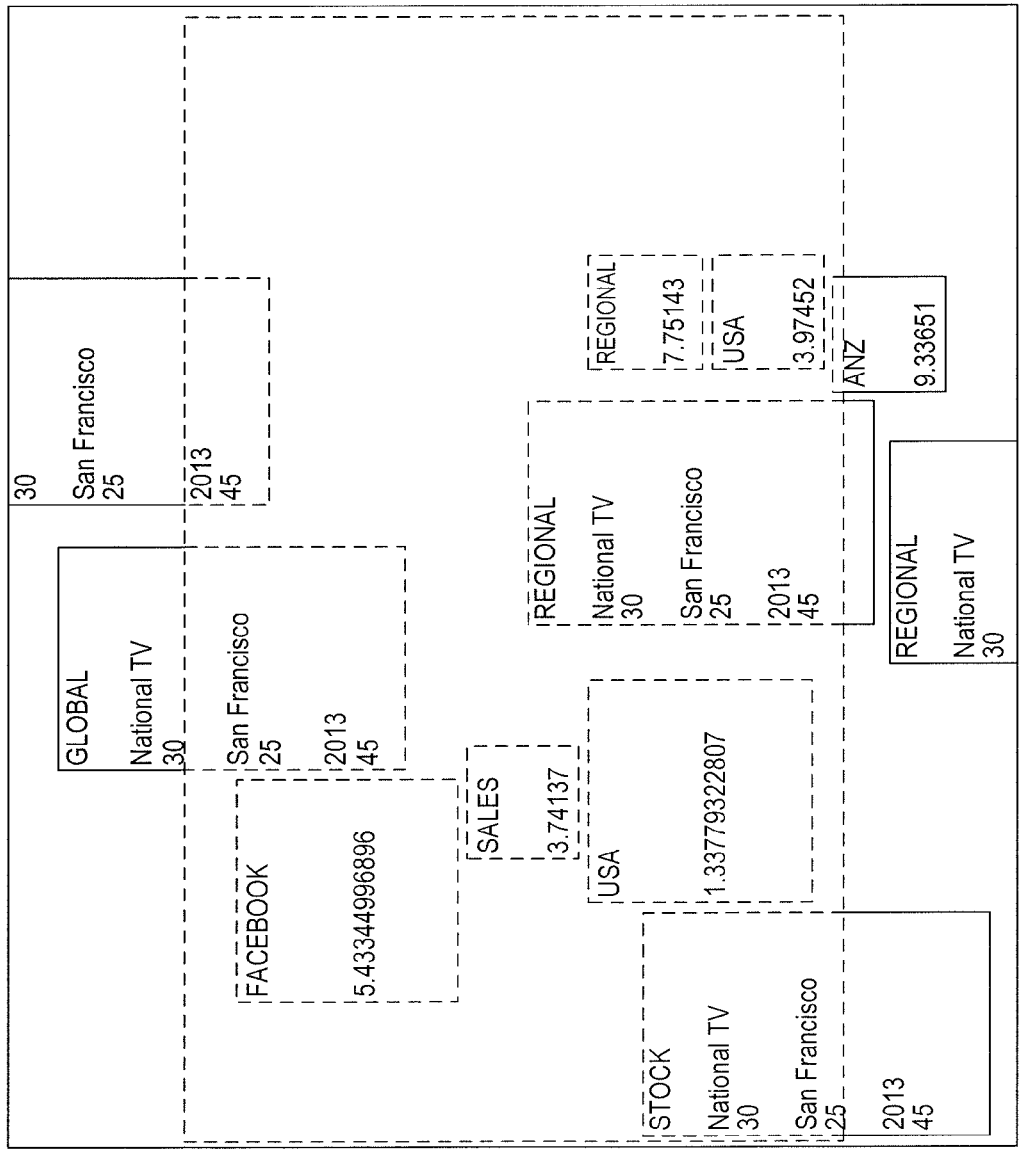
Figure 24F:
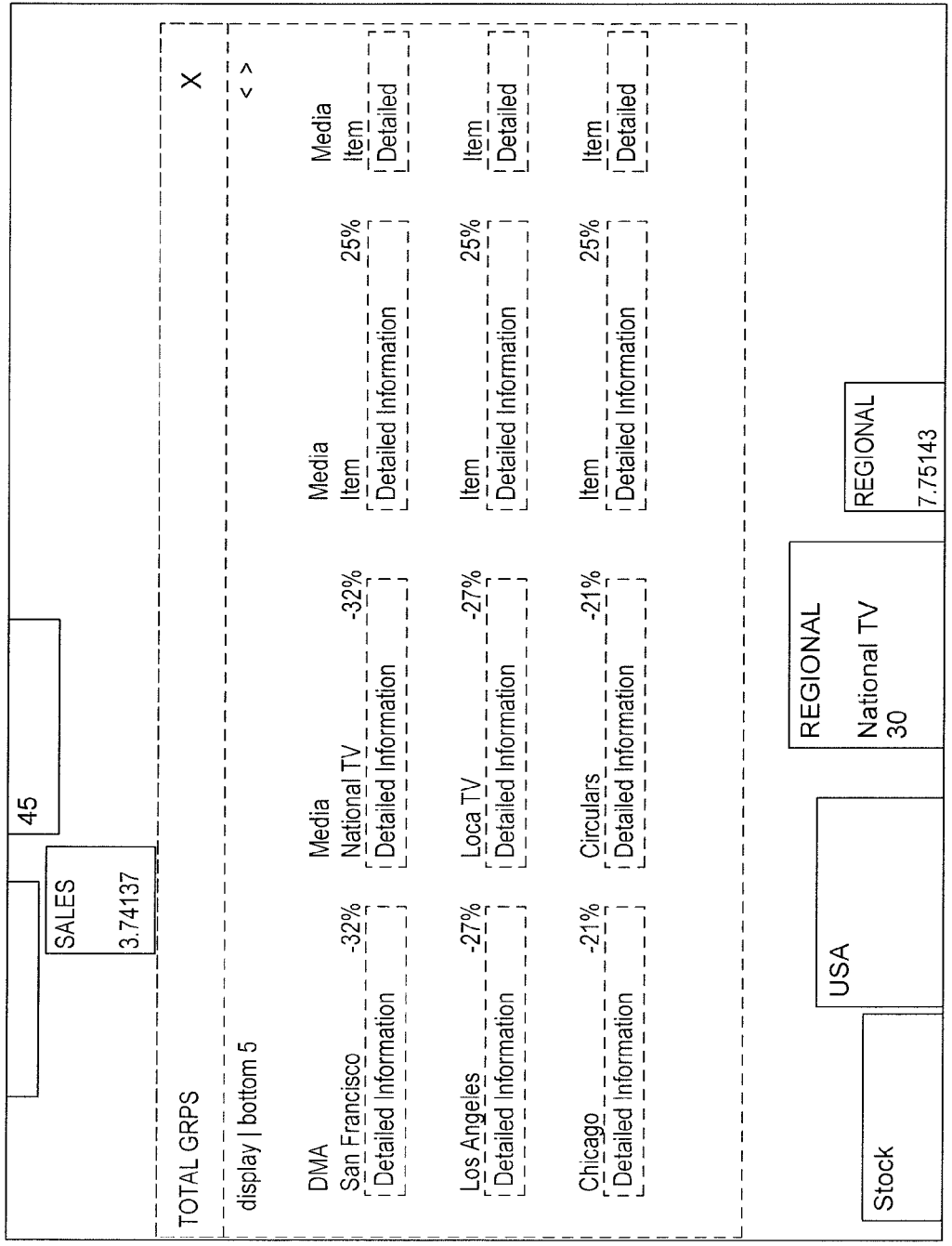
Figure 24G:
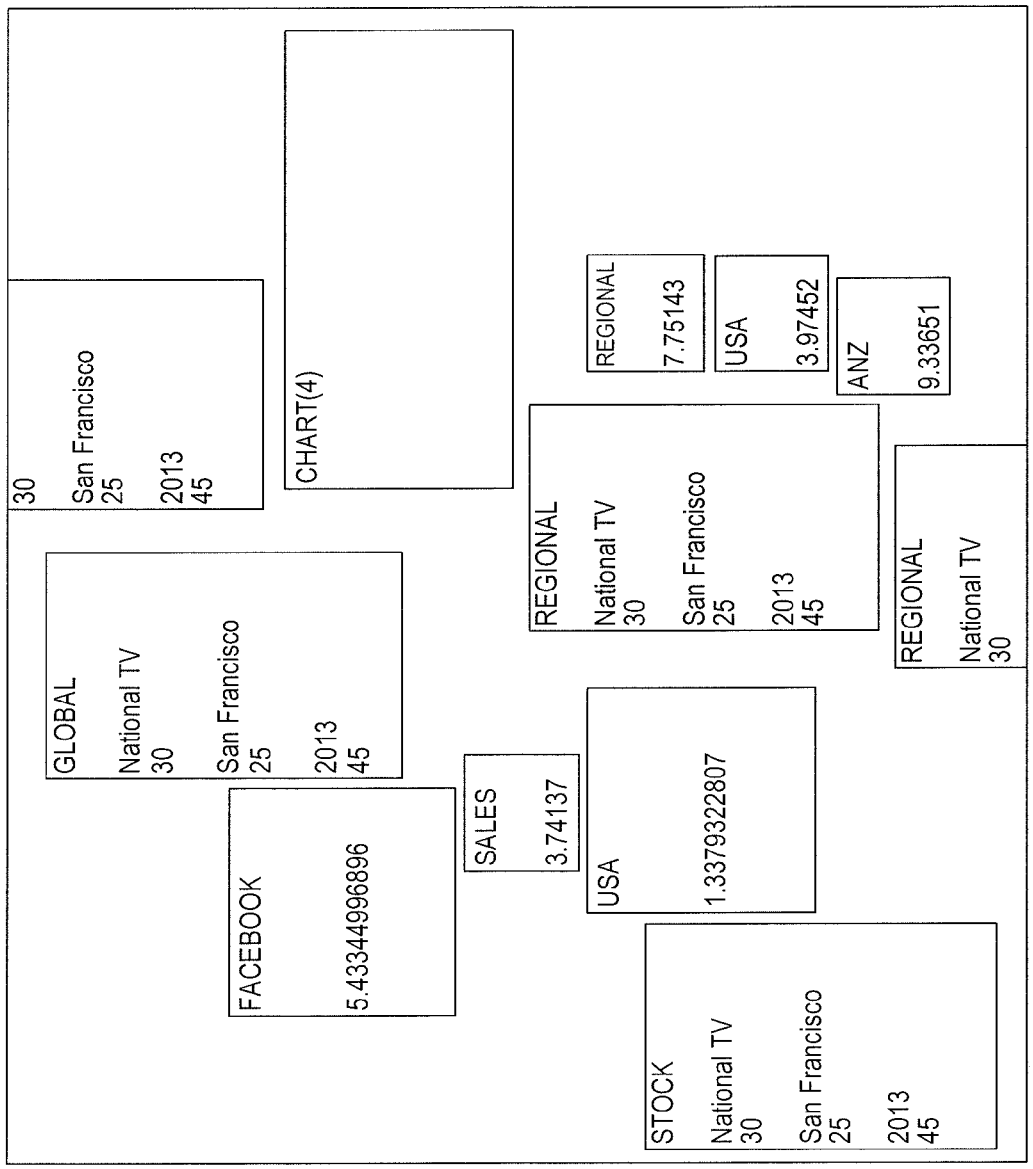

FIGS. 24A-24G illustrate the performance of the reshuffle application in response to expansion of a tile according to some embodiments. FIG. 24A shows the initial configuration. In FIG. 24B, the user has clicked on the blank rectangular tile to expand it. As a result, the blank tile disappears in FIG. 24B and appears as an expanded tile in FIG. 24C and FIG. 24D. The expanded tile shows detailed information about the object associated with the blank tile. Because the tile has expanded, in FIG. 24D it partially overlaps some tiles and fully covers, i.e., embeds some others tiles. In FIG. 24E, the system shifts those objects to bring them out from under the expanded tile or remove the overlaps. In FIG. 24F, the user closes the expanded object. In FIG. 24G, the closed object re-appears as the rectangular blank tile and the remaining objects also shift back to their original locations.

In some embodiments, snapshots of FIGS. 24A-24G occur when the user clicks on the blank tile, moves it to the center, and holds the mouse without releasing the tile, and eventually moving the blank tile back to its original location. The system interprets these actions as expansion of the blank tile without releasing it. The system thus retains the initial state during the whole process. The system thus uses the retained initial state to generate the state in FIG. 24G.

Figure 25A:
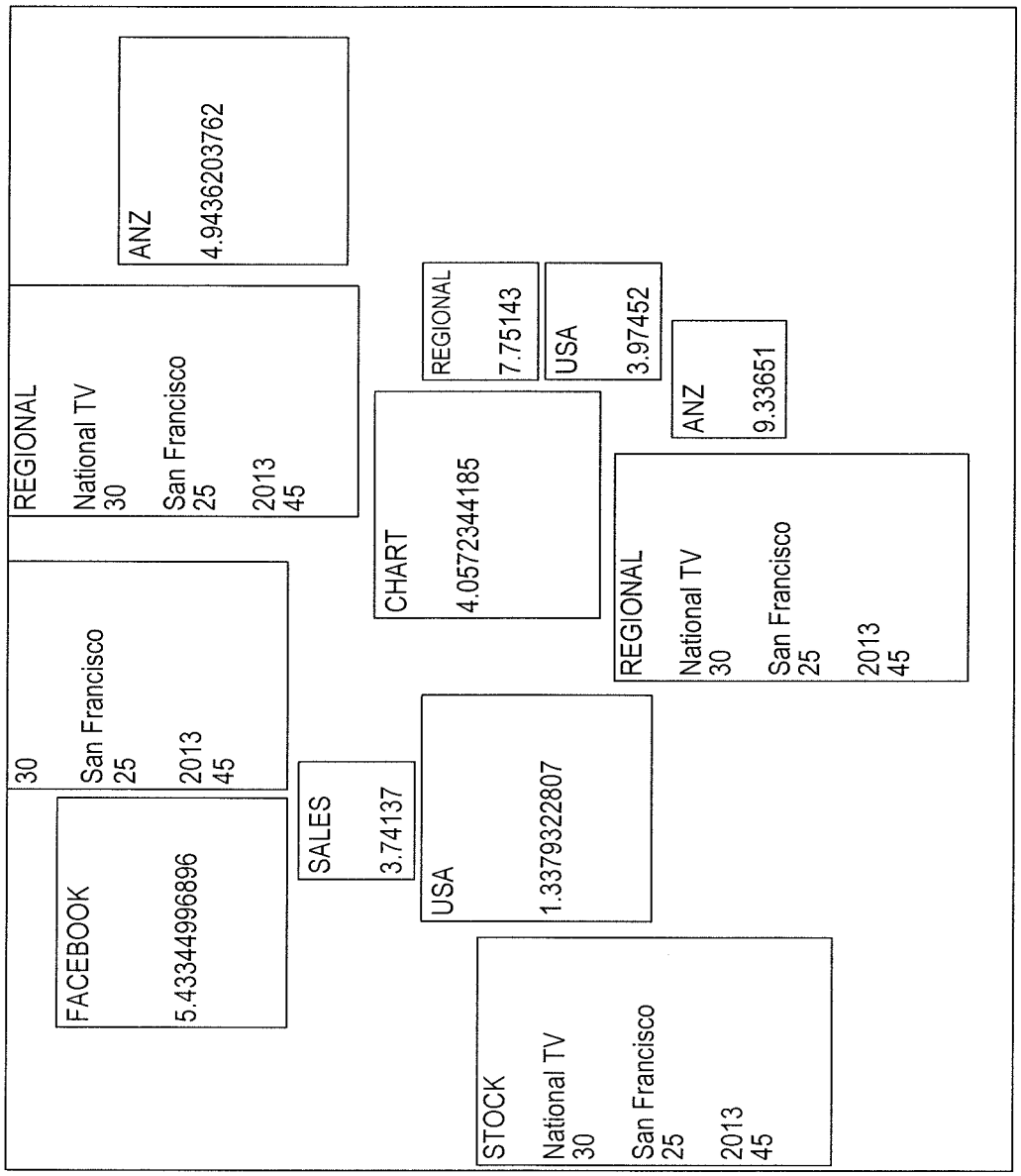
Figure 25B:
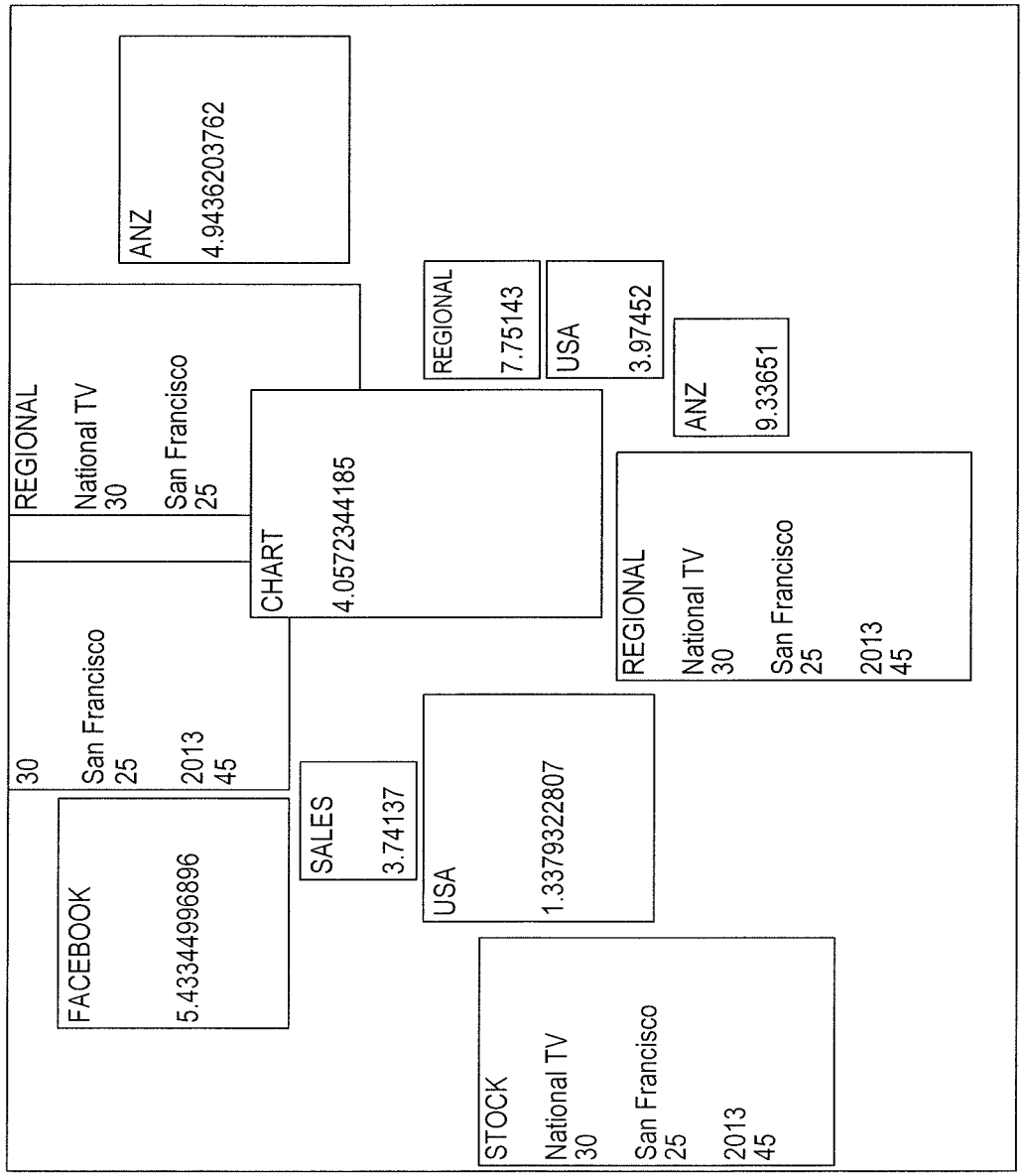
Figure 25C:
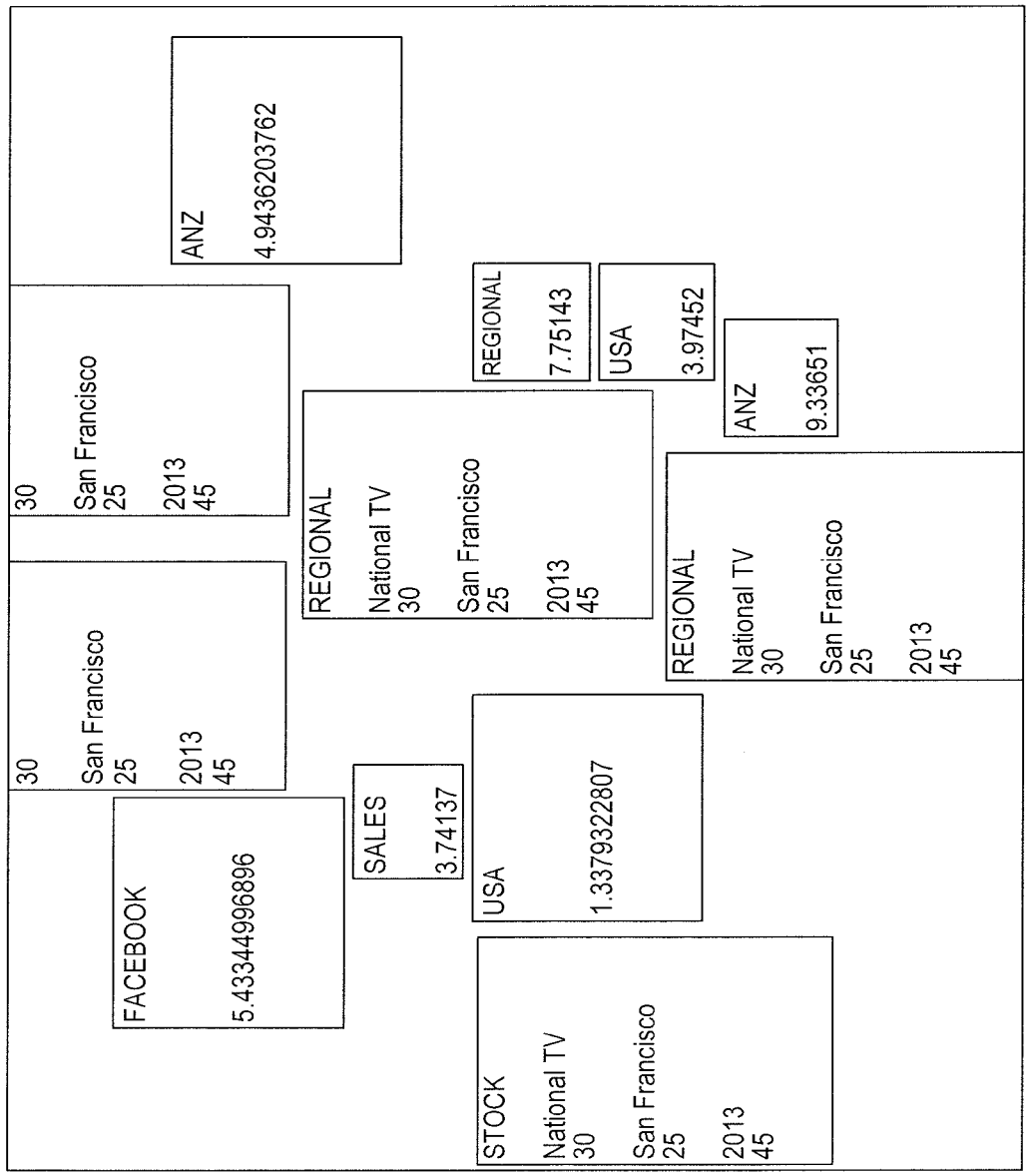

FIGS. 25A-25C illustrate the performance of the reshuffle application in response to resizing of a tile according to some embodiments. FIG. 25A shows the initial configuration. In FIG. 25B, the user has resized the tile "CHART" by stretching it upward. The resized tile overlaps two other tiles. In FIG. 25C, the system has shifted the overlapped tiles to remove the overlap.

In this disclosure, the use of the singular includes the plural unless specifically stated otherwise. In this application, the use of "or" means "and/or" unless stated otherwise. Furthermore, the use of the term "including" as well as other forms such as "includes" and "included" is not limiting. In addition, terms such as "objects", "element", or "component" encompass objects, elements, or components comprising one unit, and objects, elements, and components that comprise more than one subunit, unless specifically stated otherwise. Additionally, the section headings used herein are for organizational purposes only and are not to be construed as limiting the subject matter described.

The foregoing description of the invention, along with its associated embodiments, has been presented for purposes of illustration only. It is not exhaustive and does not limit the invention to the precise form disclosed. Those skilled in the art will appreciate from the foregoing description that modifications and variations are possible in light of the above teachings or may be acquired from practicing the invention. For example, the steps described need not be performed in the same sequence discussed or with the same degree of separation. Likewise various steps may be omitted, repeated, or combined, as necessary, to achieve the same or similar objectives. Similarly, the systems described need not necessarily include all parts described in the embodiments, and may also include other parts not described in the embodiments. Accordingly, the invention is not limited to the above-described embodiments, but instead is defined by the appended claims in light of their full scope of equivalents.

The invention claimed is:

1. A method comprising:
   receiving, by one or more computer processors, an initial state of tiles displayed on a graphical user interface, the initial state including two overlapping tiles;
   deriving, by the one or more computer processors and from the initial state, two or more secondary states of the tiles by rearranging the tiles;
   calculating, by the one or more computer processors and based on an amount of overlap associated with the tiles, a score for the initial state and two or more scores for the two or more secondary states;
   determining, by the one or more computer processors, which score, of the score for the initial state and the two or more scores for the two or more secondary states, is a lowest score;
   determining, by the one or more computer processors, a selected state, from among the initial state and the two or more secondary states, that corresponds to the lowest score; and
   providing, by the one or more computer processors and for display, the selected state to be displayed on the graphical user interface.

2. The method of claim 1, further comprising:
   defining one or more heuristics,
   where calculating the score for the initial state comprises:
      calculating, based on the amount of overlap and the one or more heuristics, the score for the initial state.

3. The method of claim 2, wherein a heuristic, of the one or more heuristics, is based on at least one of an area of overlap, tile displacement, boundary stretch, compression, or embedding of the tiles.

4. The method of claim 1, further comprising:
   generating a child state from a parent state by shifting one or more of the tiles,
   where deriving the two or more secondary states includes:
      deriving the two or more secondary states based on the child state.

5. The method of claim 4, wherein the one or more of the tiles are shifted in the graphical user interface in one or more directions to generate the child state.

6. The method of claim 4, wherein generating the child state includes:
   shifting a first tile in the parent state that overlaps with a second tile in the parent state.

7. The method of claim 4, wherein generating the child state includes:
   shifting a first tile in the parent state that is within a radius of a second tile in the parent state.

8. The method of claim 1, further comprising:
   generating, based on the score for the initial state and the two or more scores for the two or more secondary states, a state list that includes the initial state and the two or more secondary states sorted in increasing order of their scores.

9. The method of claim 8, further comprising:
   generating one or more child states from a parent state that is closest to a head of the state list and that has not been previously used for generating child states.

10. The method of claim 9, further comprising:
    adding the one or more child states to the state list.

11. The method of claim 1, wherein the two or more secondary states include a secondary state that is generated from a parent state by shifting a plurality of tiles of the tiles.

12. The method of claim 11, wherein the tiles include a group of two or more tiles that have overlapping boundaries.

13. The method of claim 1, wherein the lowest score is one of the two or more scores of the two or more secondary states.

14. A system comprising:
    one or more computer processors to:
       receive an initial state of tiles displayed on a graphical user interface,
          the initial state including two overlapping tiles, and
          derive, from the initial state, two or more secondary states of the tiles by rearranging the tiles;
       calculate, based on an amount of overlap associated with the tiles, a score for the initial state and two or more scores for the two or more secondary states;
       determine which score, of the score for the initial state and the two or more scores for the two or more secondary states, is a lowest score;
       determine a selected state, from among the initial state and the two or more secondary states, that corresponds to the lowest score; and
       provide, for display, the selected state to be displayed on the graphical user interface.

15. The system of claim 14, wherein, when deriving the one or more secondary states, the one or more processors are to:
    derive the one or more secondary states by generating a child state from a parent state.

16. The system of claim 15, wherein one or more of the tiles are shifted in the graphical user interface in one or more directions to generate the child state.

17. The system of claim 14, wherein the one or more processors are further to:
    generate a state list that includes the initial state and the two or more secondary states sorted based on increasing order of the score for the initial state and the two or more scores for the two or more secondary states.

18. The system of claim 17, wherein the one or more processors are further to:

generate one or more child states from a parent state that is closest to a head of the state list and that has not been previously used for generating child states.

19. The system of claim 18, wherein the one or more processors are further to:
add the one or more child states to the state list.

20. A non-transitory computer readable medium storing instructions, the instructions comprising:
one or more instructions that, when executed by one or more computers, cause the one or more computers to:
receive an initial state of tiles displayed on a graphical user interface,
the initial state including two overlapping tiles;
derive, based on the initial state and from the initial state, two or more secondary states of the tiles by rearranging the tiles;
calculate, based on an amount of overlap associated with the tiles, a score for the initial state and two or more scores for the two or more secondary states;
determine which score, of the score for the initial state and the two or more scores for the two or more secondary states, is a lowest score;
determine a selected state, from among the initial state and the two or more secondary states, that corresponds to the lowest score; and
provide, for display, the selected state to be displayed on the graphical user interface.

* * * * *